United States Patent
El-Siblani et al.

(10) Patent No.: US 10,589,507 B2
(45) Date of Patent: Mar. 17, 2020

(54) APPARATUS AND METHOD FOR FORMING THREE-DIMENSIONAL OBJECTS USING A CURVED BUILD PLATFORM OR CURVED SOLIDIFICATION SUBSTRATE

(71) Applicant: Global Filtration Systems, Dearborn Heights, MI (US)

(72) Inventors: Ali El-Siblani, Dearborn Heights, MI (US); Alexandr Shkolnik, Los Angeles, CA (US); Chi Zhou, Amherst, NY (US)

(73) Assignee: Global Filtration Systems, Dearborn Heights, MI (US)

( * ) Notice: Subject to any disclaimer, the term of this patent is extended or adjusted under 35 U.S.C. 154(b) by 909 days.

(21) Appl. No.: 15/329,012

(22) PCT Filed: Oct. 8, 2014

(86) PCT No.: PCT/US2014/059611
§ 371 (c)(1),
(2) Date: Jan. 25, 2017

(87) PCT Pub. No.: WO2015/054340
PCT Pub. Date: Apr. 16, 2015

(65) Prior Publication Data
US 2017/0246804 A1    Aug. 31, 2017

Related U.S. Application Data

(63) Continuation of application No. 14/051,810, filed on Oct. 11, 2013, now abandoned.

(51) Int. Cl.
*B29C 64/241* (2017.01)
*B29C 64/245* (2017.01)
(Continued)

(52) U.S. Cl.
CPC ............ *B33Y 10/00* (2014.12); *B29C 64/135* (2017.08); *B29C 64/241* (2017.08);
(Continued)

(58) Field of Classification Search
CPC .................................................... B29D 99/001
See application file for complete search history.

(56) References Cited

U.S. PATENT DOCUMENTS

| | | |
|---|---|---|
| 4,849,910 A | 7/1989 | Jacobs et al. |
| 5,049,901 A | 9/1991 | Gelbart |

(Continued)

FOREIGN PATENT DOCUMENTS

| | | |
|---|---|---|
| DE | 19929199 A1 | 1/2001 |
| DE | 10256672 A1 | 6/2004 |

(Continued)

OTHER PUBLICATIONS

International Search Report and Written Opinion for PCT/US2014/059611 dated Feb. 19, 2015.

(Continued)

*Primary Examiner* — Jeffrey M Wollschlager
*Assistant Examiner* — Armand Melendez
(74) *Attorney, Agent, or Firm* — Hansen IP Law PLLC

(57) ABSTRACT

An apparatus and method for making a three-dimensional object from a solidifiable material using a linear solidification device is shown and described. Either a build platform or a solidification substrate has a curved surface, and each point on the curved surface traverses a trochoidal path during an object solidification operation. The curved surface allows the separation forces between the solidification substrate and the most recently solidified layer of material to be concentrated along a line instead of along a planar section which reduces the overall separation force and the likelihood of damaging a part.

15 Claims, 25 Drawing Sheets

(51) Int. Cl.
  *B33Y 10/00* (2015.01)
  *B29C 64/135* (2017.01)
  *B29L 31/00* (2006.01)

(52) U.S. Cl.
  CPC ....... *B29C 64/245* (2017.08); *B29L 2031/772* (2013.01); *B29L 2031/7739* (2013.01)

(56) References Cited

U.S. PATENT DOCUMENTS

| | | | |
|---|---|---|---|
| 5,104,592 | A | 4/1992 | Hull et al. |
| 5,198,159 | A | 3/1993 | Nakamura et al. |
| 5,447,822 | A | 9/1995 | Hull et al. |
| 5,521,748 | A | 5/1996 | Sarraf |
| 5,631,763 | A | 5/1997 | Park |
| 5,753,171 | A | 5/1998 | Serbin et al. |
| 5,780,070 | A | 7/1998 | Yamazawa et al. |
| 5,876,550 | A | 3/1999 | Feygin et al. |
| 5,885,511 | A | 3/1999 | Heller et al. |
| 5,991,102 | A | 11/1999 | Oono et al. |
| 6,030,199 | A | 2/2000 | Tseng |
| 6,180,050 | B1 | 1/2001 | Arai et al. |
| 6,267,919 | B1 | 7/2001 | Tanaka et al. |
| 6,372,178 | B1 | 4/2002 | Tseng |
| 6,406,658 | B1 | 6/2002 | Manners et al. |
| 6,512,535 | B1 * | 1/2003 | Nagasaka ................ B41J 2/442 347/240 |
| 6,821,473 | B2 | 11/2004 | Hiizumi et al. |
| 7,006,887 | B2 | 2/2006 | Nagano et al. |
| 7,048,528 | B2 | 5/2006 | Ishikawa et al. |
| 7,759,230 | B2 | 7/2010 | Im |
| 7,906,414 | B2 | 3/2011 | Im |
| 8,905,739 | B2 | 12/2014 | Vermeer et al. |
| 2002/0011693 | A1 | 1/2002 | Leyden et al. |
| 2002/0153640 | A1 | 10/2002 | John |
| 2004/0118309 | A1 | 6/2004 | Fedor et al. |
| 2005/0208168 | A1 | 9/2005 | Hickerson et al. |
| 2006/0022379 | A1 | 2/2006 | Wicker et al. |
| 2008/0259228 | A1 | 10/2008 | Henningsen |
| 2010/0262272 | A1 | 10/2010 | Shkolnik et al. |
| 2011/0009992 | A1 | 1/2011 | Shkolnik et al. |
| 2011/0090477 | A1 | 4/2011 | Haga et al. |
| 2012/0165969 | A1 | 6/2012 | Elsey |
| 2012/0195994 | A1 | 8/2012 | El-Siblani et al. |
| 2013/0001834 | A1 | 1/2013 | El-Siblani et al. |
| 2014/0210137 | A1 | 7/2014 | Patterson et al. |
| 2015/0102531 | A1 | 4/2015 | El-Siblani et al. |

FOREIGN PATENT DOCUMENTS

| | | |
|---|---|---|
| EP | 1674243 A2 | 6/2006 |
| EP | 1876012 A1 | 1/2008 |
| EP | 2011631 B1 | 4/2012 |
| JP | 08150662 | 6/1996 |
| WO | 2012021940 A1 | 2/2012 |
| WO | 2015054340 A2 | 4/2015 |

OTHER PUBLICATIONS

Non-final office action for U.S. Appl. No. 14/051,810 dated Sep. 8, 2016.
International Search Report and Written Opinion for PCT/US2012/044398 dated Oct. 26, 2012.
Invitation to Pay Additional Fees and, Where Applicable, Protest Fee for PCT/US2014/059611 dated Dec. 3, 2014.
Yamazawa, Kenji, et al., "High Speed UV Laser Beam Scanning by Polygon Mirror," pp. 223-230, The Institute of Physical and Chemical Research (Riken), (1997).
Opposition to EP 2 011 631, dated Jan. 14, 2013.
European Patent Office (EPO) Notice of Opposition, dated Feb. 25, 2013.
Huang, et al., "Computer Supported Force Analysis and Layer Imagine for Masked Rapid Prototyping System" Department of Mechanical Engineering, National Taiwan University of Science and technology, Taipei, Taiwan.
Patent Abstracts of Japan from: http://www19.ipdl.inpit.go.jp/PA1/result/main/woYeaMaDA408150662P1.htm Jul. 15, 2011.
English translation of DE 10256672 from Lexis Nexis Total Patent.
English translation of DE 19929199 from Lexis Nexis Total Patent.
Huang, et al., "On-line force monitoring of platform ascending rapid prototyping system" Journal of Materials Processing Technology 159 (2005) 257-264.

* cited by examiner

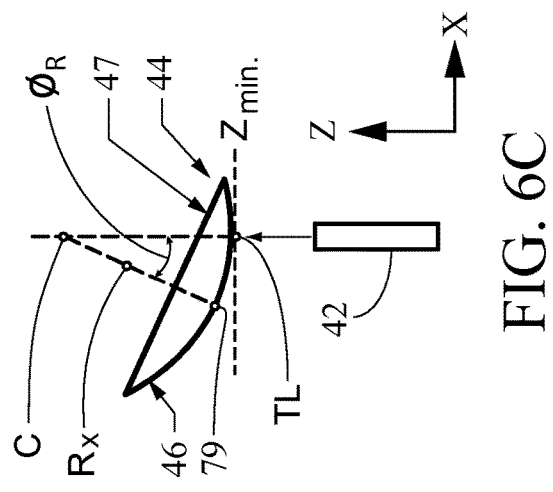
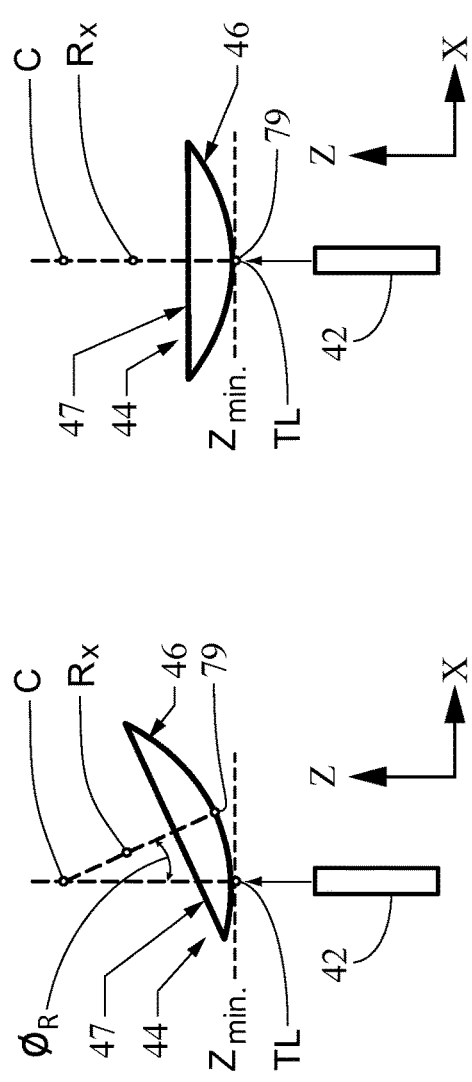
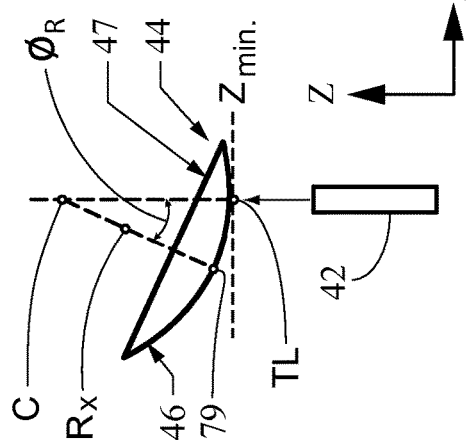
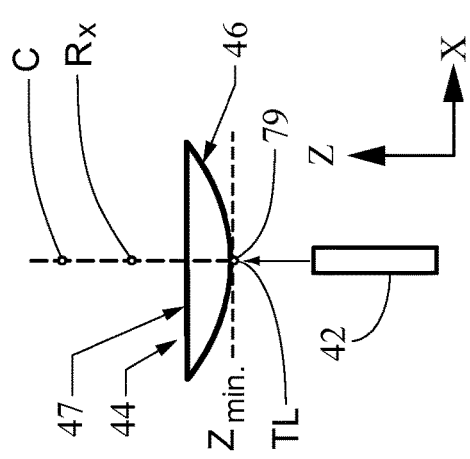
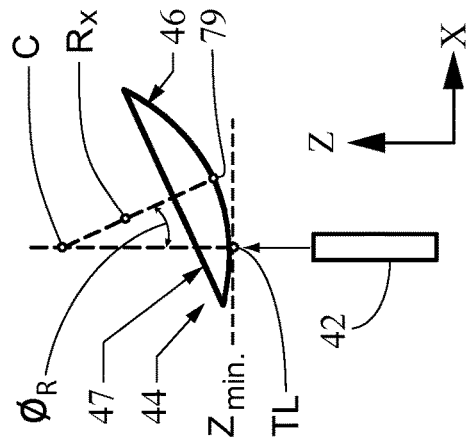
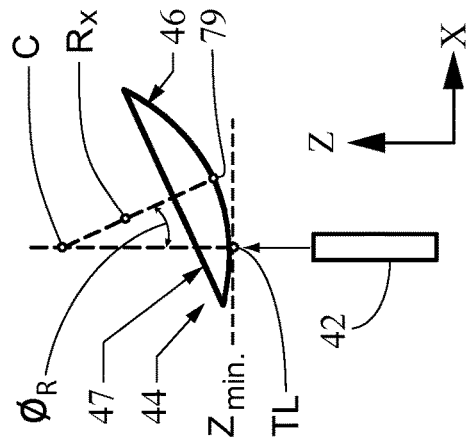
FIG. 6A  FIG. 6B  FIG. 6C
FIG. 6D  FIG. 6E  FIG. 6F

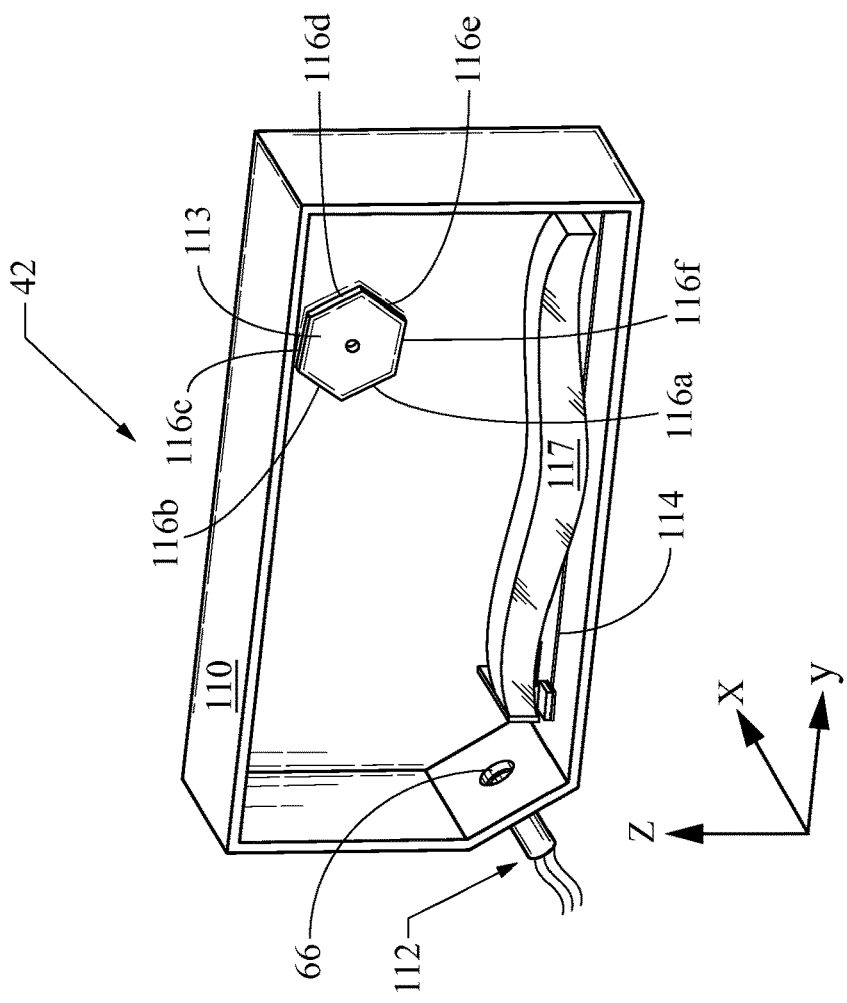
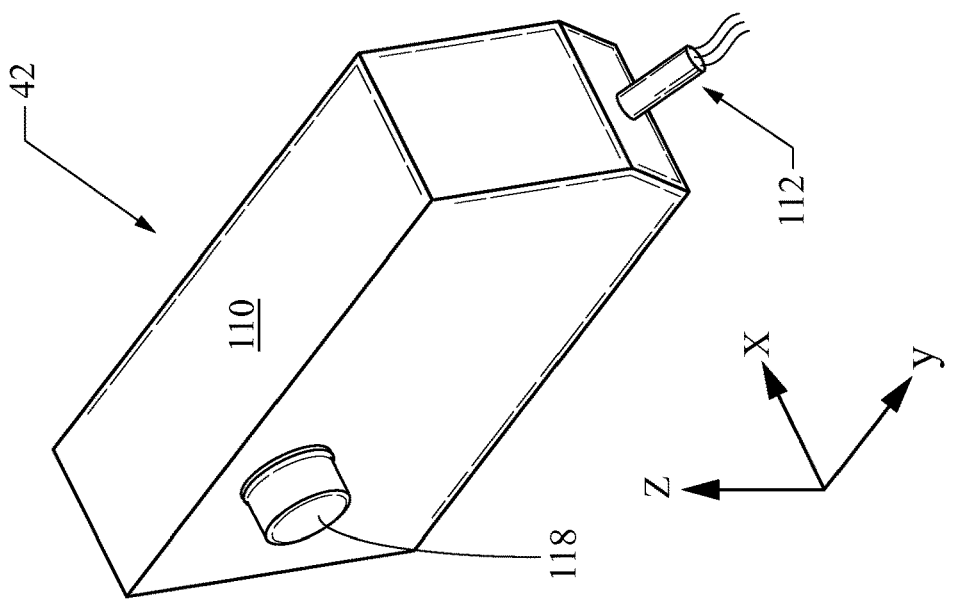
FIG. 7B
FIG. 7A

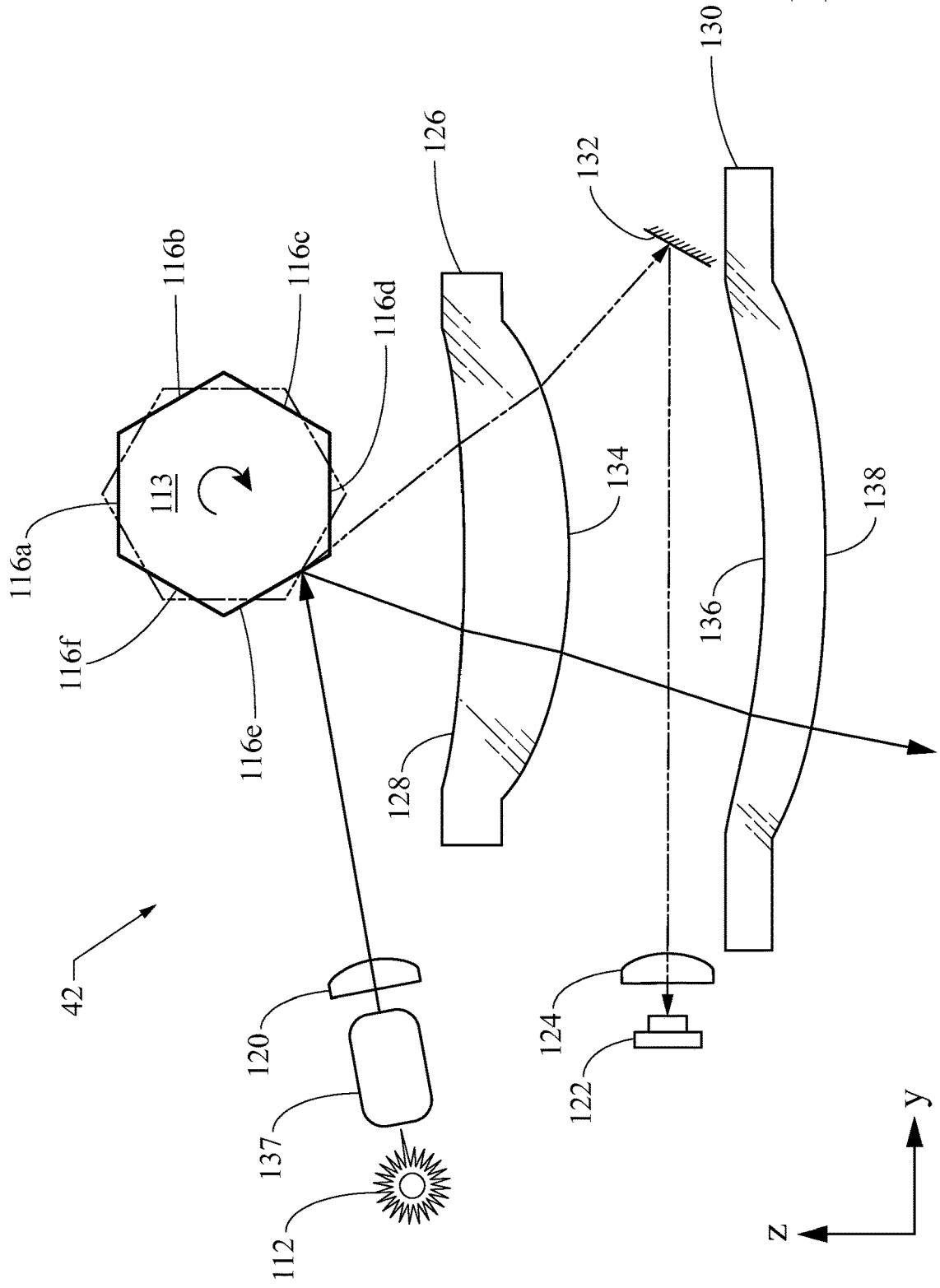

| m (computer memory index) | n (string index) | Data string |
|---|---|---|
|  |  |  |
| 0 | 20 | FFFFFFFF, 20, 22000, 44000 |
| 1 | 21 | FFFFFFFF, 21, 20000, 46000 |
| 2 | 22 | FFFFFFFF, 22, 18000, 48000 |
| . . . | . . . | . . . |
| 6 | 26 | FFFFFFFF, 26, 0, 66000 |
| . . . | . . . |  |
| 10 | 30 | FFFFFFFF, 31, 18000, 48000 |
| 11 | 31 | FFFFFFFF, 32, 20000, 46000 |
| 12 | 32 | FFFFFFFF, 33, 22000, 44000 |

FIG. 11D

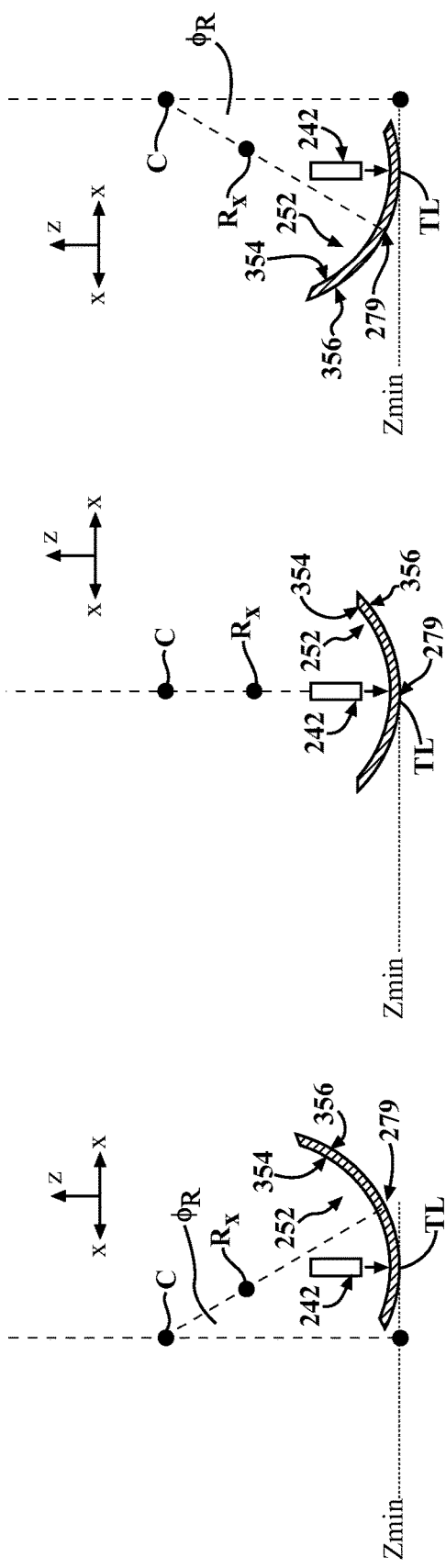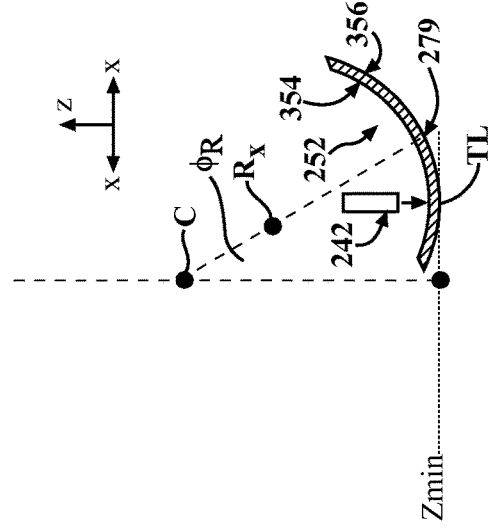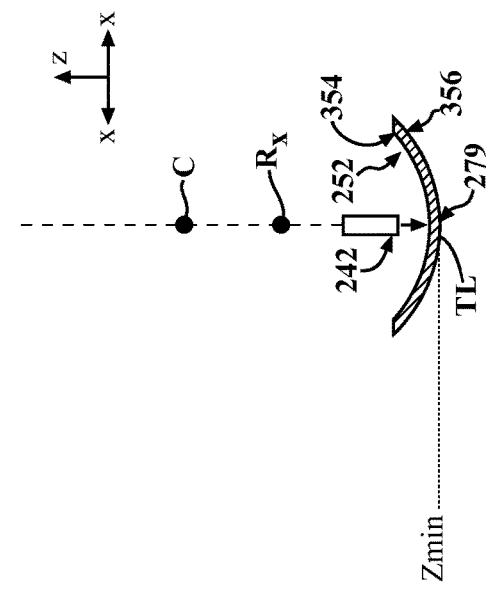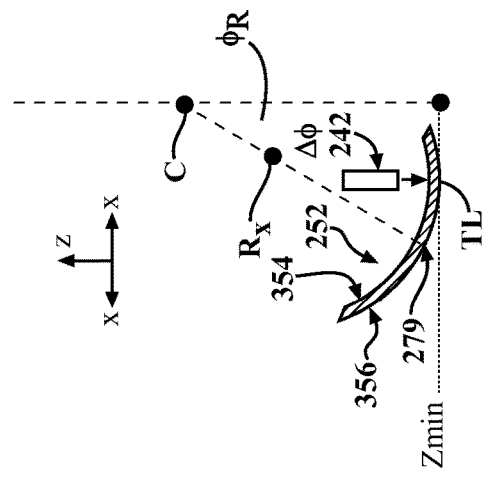

US 10,589,507 B2

APPARATUS AND METHOD FOR FORMING THREE-DIMENSIONAL OBJECTS USING A CURVED BUILD PLATFORM OR CURVED SOLIDIFICATION SUBSTRATE

FIELD

The disclosure relates to an apparatus and method for manufacturing three-dimensional objects, and more specifically, to an apparatus and method for forming three-dimensional objects using a build platform or solidification substrate that is curved and/or which moves in multiple dimensions as solidification energy is supplied to a solidifiable material.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

In certain known methods of making a three-dimensional object, the object is progressively formed as a series of sections on a build platform in a direction along a build axis. After each section is formed, its exposed surface is contacted with fresh solidifiable material which is then solidified in a pattern corresponding to object data that defines the size and shape of the three-dimensional object. In certain processes the solidifiable material is an uncured or partially cured polymeric resin, and the fresh solidified material is supplied between the solidified exposed surface of the partially-formed object and a solidification substrate. The solidification substrate aids in ensuring that a constant layer thickness of solidifiable material is provided to solidify each layer of the three-dimensional object. Following solidification, however, the newly solidified material must be separated from the solidification substrate. In some cases this is done by increasing the distance between the build platform and the solidification substrate. However, many known build platforms and solidification substrates are substantially planar, and the interface between the solidified exposed surface and the solidification substrate defines an area that must be separated. As the interface area increases, so do the required separation forces. If the separation force is too great, the object can break. As a result, in many known three-dimensional object manufacturing methods the build area (the total exposed surface area of the object(s) perpendicular to the build axis) must be limited to regulate the separation force, which reduces either the number and/or surface area of the objects that can be built during an object building process. Thus, a need has arisen for an apparatus and method for making three-dimensional objects which addresses the foregoing issues.

BRIEF DESCRIPTION OF THE DRAWINGS

The disclosure will now be described, by way of example, with reference to the accompanying drawings, in which:

FIGS. 6A-6F are schematic views of the build platform and linear solidification device of the system of FIG. 2 in various positions along the travel axis as the linear solidification device moves in a first direction (FIGS. 6A-6C) and a second direction (FIGS. 6D-6F) along the travel axis;

FIG. 7A is a rear perspective view of an exemplary linear solidification device comprising a solidification energy source and a rotating energy deflector;

FIG. 7B is a front perspective view of the linear solidification device of FIG. 7A with a portion of the housing removed;

FIG. 7C is a schematic view of a first alternate version of the linear solidification device of FIG. 7A in which the housing is removed and which includes a solidification energy synchronization sensor;

FIG. 11D is a table depicting exemplary sets of string data which correspond to the object cross-sectional strip data of FIG. 11C;

FIGS. 16A-16F are schematic views of the rigid or semi-rigid solidification substrate and linear solidification device of the system of FIG. 15 in various positions along the travel axis as the linear solidification device moves in a first direction (FIGS. 16A-16C) and a second direction (FIGS. 16D-16F) along the travel axis.

Like numerals refer to like parts in the drawings.

DETAILED DESCRIPTION

Figure 1:
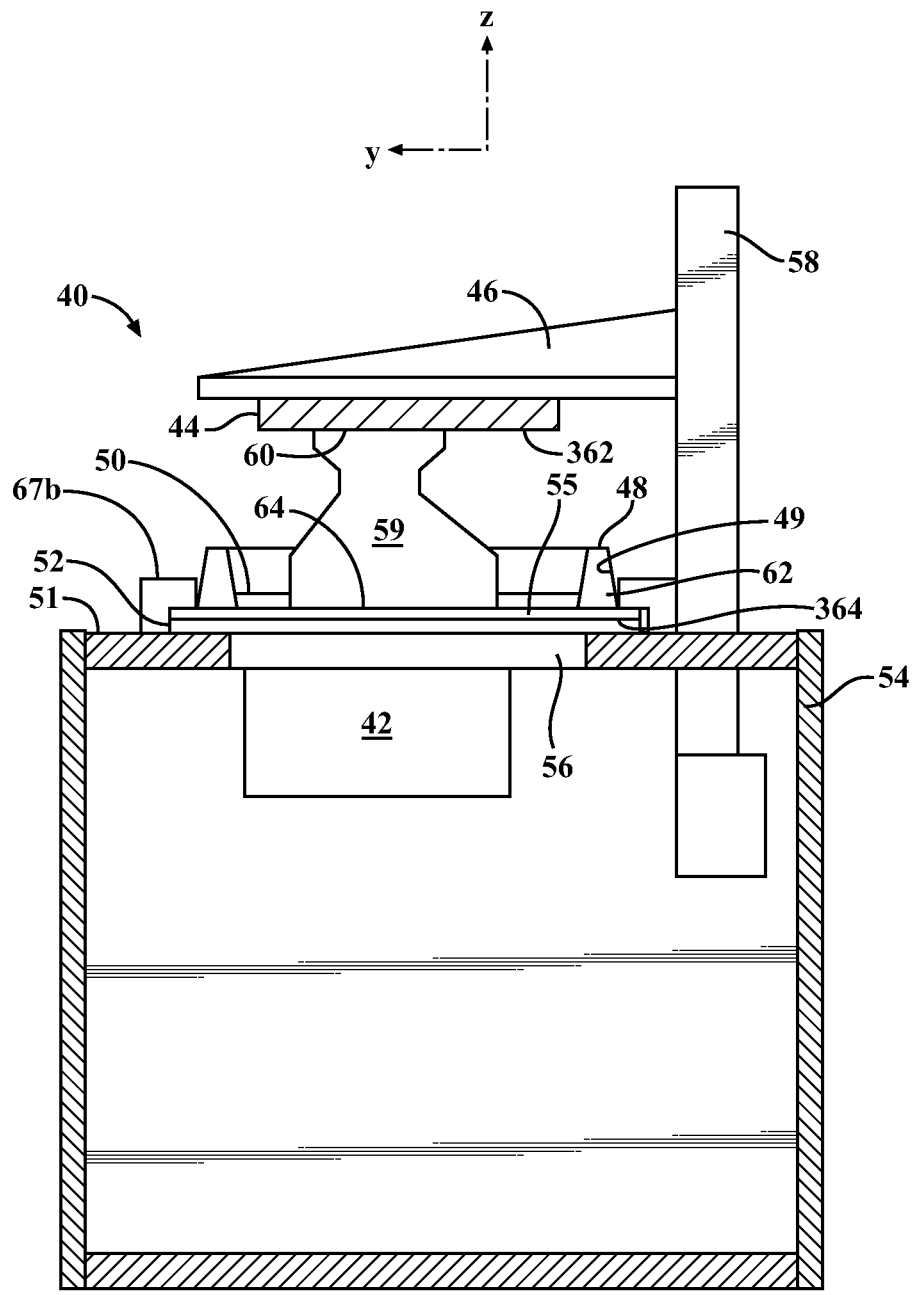
FIG. 1 is a side cross-sectional, schematic view of a system for making a three-dimensional object with a planar build platform that moves only along a build (z) axis during an object building operation.

The Figures illustrate examples of an apparatus and method for manufacturing a three-dimensional object from a solidifiable material. Based on the foregoing, it is to be generally understood that the nomenclature used herein is simply for convenience and the terms used to describe the invention should be given the broadest meaning by one of ordinary skill in the art.

The apparatuses and methods described herein are generally applicable to additive manufacturing of three-dimensional objects, such as components or parts (discussed herein generally as objects), but may be used beyond that scope for alternative applications. In a first aspect, the system and methods generally include a build platform having a surface that is curved along a travel axis direction. The travel axis is defined by the movement of a source of solidification energy that solidifies a solidifiable material into a three-dimensional object based on object data. In a second aspect, the systems and methods include a build platform that moves in multiple dimensions as solidification energy is supplied to a solidifiable material. In certain examples, the build platform is curved along the travel axis and rotates about an axis of rotation that is perpendicular to the travel axis and build axis as the build platform moves along the travel axis and build axis in correspondence with the movement of a linear solidification device along the travel axis.

In accordance with one implementation, the solidifiable material is solidified on the most recently formed exposed surface of the three-dimensional object along a line that extends along the length of the build platform. The line is located at β position along the build platform width (and the travel axis) which corresponds to a rotational orientation between a sagittal plane of the build platform and the build axis. The sagittal plane is a plane of symmetry along a curved surface of the build platform on which a three-dimensional object is built. The intersection of the sagittal plane and the curved surface defines a sagittal line extending along the length of the build platform and perpendicularly to the plane defined by the travel axis and build axis.

In certain preferred examples, the build platform is manipulated so that the build platform sagittal line and the axis of rotation of the build platform travel in trochoidal paths in the plane defined by the travel axis and the build axis. The trochoidal paths are defined by a trochoidal circle having a radius equal to the radius of curvature of the build platform's curved surface. In the same or other examples, the trochoidal paths of the sagittal line and the axis of rotation change with the addition of each layer of solidified material to the partially formed three-dimensional object. In the same or other examples, the relationship between the rotation of the build platform relative to a reference rotational orientation (at which the plane tangent to the sagittal line is perpendicular to the build axis) and the positions of the sagittal line and the axis of rotation along the travel axis change with the addition of each layer of solidified material to the partially-formed three-dimensional object. In certain preferred examples, the operation of motors that translate and rotate the build platform is adjusted so that a point of interest that is fixed relative to the build platform moves in a trochoidal path during object solidification and object separation operations.

In preferred examples, the solidified material at the exposed surface of the object following the addition of a new layer is separated from a solidification substrate or a film such that the separation forces at any one time are concentrated along a line extending along the length of the build platform. Because the instantaneous separation forces are concentrated along a line, the force required to separate a given surface area of the object from the solidification substrate is reduced relative to techniques in which separation occurs within an area. As a result, separation forces do not limit, or at least play a significantly reduced role in determining, the maximum possible area of the object perpendicular to the build axis (i.e., the axis along which the layers are sequentially solidified).

In accordance with another aspect, an apparatus for making a three-dimensional object from a solidifiable material is provided. The apparatus includes a build platform with an object-contacting surface that faces a solidifiable material contacting surface of a rigid or semi-rigid solidification substrate. The rigid or semi-rigid solidification substrate is transparent and/or translucent. The build platform is movable along a build axis to vary a spacing between the build platform and the rigid or semi-rigid solidification substrate along the build axis. One of the build platform object-contacting surface and the solidification substrate solidifiable material contacting surface is curved when viewed along a cross-sectional axis that is perpendicular to the build axis. During an object building operation, points on the curved surface traverse a trochoidal path when viewed along the cross-sectional axis.

In certain exemplary implementations, the solidifiable material contacting surface of the rigid or semi-rigid solidification substrate is the curved surface, and the build platform is located beneath the rigid or semi-rigid solidification substrate in a direction along the build axis. In such implementations, the apparatus uses a "right-side up" build process in which the three-dimensional object is progressively built in the upward direction along the build axis as the build platform progressively moves downward along the build axis. In other exemplary implementations, the build platform object contacting surface is the curved surface. In such implementations, the apparatus uses an "upside down" build process in which the object is progressively built in the downward direction along the build axis as the build platform progressively moves upward along the build axis.

In the same or other implementations, a linear solidification device is provided which moves along a travel axis while selectively projecting solidification energy onto the solidifiable material along a scanning axis that is parallel to the cross-sectional axis. In the same or other implementations, the movement of the linear solidification device along the travel axis is coordinated with the movement of the curved surface along the travel axis.

In certain implementations, the curved surface is operatively connected to at least one motor that is operable to translate the curved surface along the build axis, translate the curved surface along the travel axis, and rotate the curved surface about an axis of rotation that is perpendicular to the travel axis. In certain implementations, the at least one motor includes a build axis translation motor, a travel axis translation motor, and a rotational axis rotational motor. In the same or other implementations, at least one controller comprising a non-transitory computer readable storage medium and a processor is provided, and the computer readable storage medium has computer executable instructions stored thereon, and when the computer executable instructions are executed, the at least one motor is energized such that points on the curved surface traverse a trochoidal path when viewed along the cross-sectional axis.

In the same or other examples, as the curved surface traverses the trochoidal path, successive portions of the curved surface will define a line along the cross-sectional axis which will be positioned at the minimum (lowest) position along the build axis, and the linear solidification device will remain aligned with the minimum build axis position line as the linear solidification device moves along the travel axis. In such examples, the build axis spacing between the exposed surface of the object and the linear solidification device remains substantially constant or constant while an object is being built.

FIG. 1 depicts a simplified, schematic view of a system 40 for making a three-dimensional object 59 from a solidifiable material 50. System 40 includes a housing 54 used to support a solidifiable material container 48, a linear solidification device 42, and a build platform 44. Solidifiable material container 48 comprises sidewalls 62 and a bottom that comprises a rigid or semi rigid solidification substrate 52 that is transparent and/or translucent with a film 55 coating adhered to its upper surface 364. FIG. 1 is provided to illustrate the basic arrangement and relationship of the linear solidification device 42, housing 54, solidifiable material container 48, and build platform 44. However, in FIG. 1, build platform 44 is configured to move only in the build (z) axis direction by virtue of its operative connection to a build axis translation motor (not shown in FIG. 1) and its sliding engagement with a vertical rail support member 58 (which is shown in simplified form in FIG. 1). In contrast to the system of FIG. 1, certain of the build platforms of the present disclosure, as described below, are configured to move in multiple dimensions during an object building operation. In one preferred example, the build platforms described herein are configured to translate along a travel (x) axis, translate along a build (z) axis, and rotate about an axis of rotation $R_x$ perpendicular to the travel (x) and build (z) axis. In the same or other examples, certain of the build platforms described herein include an object contact surface that is curved along the build platform's width direction. In certain illustrative embodiments, the curvature defines a radius of curvature that is substantially constant, or more preferably, constant within standard machining tolerances. In FIG. 1, object 59 includes a build platform contact surface 60 that is adhered to build platform 44. As explained further below, in certain examples, the object 50 comprises a finished object section and a removable object section, wherein the build platform contact surface 60 of object 59 is part of the removable support section. The build platform contact surface 60 is connected to a build platform object contacting surface 362.

Solidification substrate 52 is held in frame sections 67a (not shown in FIG. 1) and 67b so as to be positioned over opening 56 in the upper surface 51 of housing 54. Solidification substrate 52 includes a solidifiable material contacting surface 364, which may or may not be coated with one or more films. In the example of FIG. 1, the solidifiable material contacting surface 64 is adhered to a film 55. During an object building process an exposed surface 64 of the partially-completed three-dimensional object 59 is immersed in solidifiable material 50 so that a desired layer thickness of solidifiable material is provided between the exposed object surface 64 and the film 55 coated on the solidification substrate solidifiable material contacting surface 364 of solidification substrate 52. Solidification energy (e.g., UV or visible light) is projected upwardly along the build axis (z) direction through the solidification substrate 52 and film 55 to solidify the desired layer thickness of solidifiable material in contact with the film 55. As shown in the figure, the solidification substrate solidifiable material contact surface 364 faces the build platform object contacting surface 362, and the two surfaces are movable relative to one another along the build (z) axis.

As discussed herein, a solidifiable material 50 is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids. In one embodiment of a photopolymer paste solidifiable material, a viscosity of between 10000 cP (centipoises) and 150000 cp is preferred.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscosity-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acylphosphine oxides, benzyldimethyl-ketals, α-amino ketones, and α-hydroxy ketones. Examples of suitable metallocenes include Bis (eta 5-2, 4-cyclopenadien-1-yl) Bis [2,6-difluoro-3-(1H-pyrrol-1-yl)phenyl]titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl)phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The apparatuses and methods described herein may include a solidification substrate, such as rigid or semi-rigid, transparent and/or translucent substrate 52, against which a solidifiable material is solidified as an object 59 is built from the solidification material. Alternatively, and as shown in FIG. 1, the substrate 52 may have a film 55 on its upper surface 364 so that the solidifiable material 50 solidifies against film 55. The solidification substrate 52 facilitates the creation of a substantially planar surface of solidifiable material 50 which is exposed to energy provided by linear solidification device 42. The substantially planar surface improves the accuracy of the build process.

The bottom of solidifiable material container 48 is a substantially rigid or semi-rigid transparent and/or translucent substrate 52 that receives solidification energy from linear solidification device 42 and transmits the received solidification energy to solidifiable material 50. Solidification substrate 52 is substantially permeable to the energy supplied by linear solidification device 42. In certain examples, it is preferred that the energy from linear solidification device 42 pass through solidification substrate 52 without a significant diminution in transmitted energy or a significant alteration of the energy spectrum transmitted to the solidifiable material 50 relative to the spectrum that is incident to the lower surface of solidification substrate 52. In the case where the energy from linear solidification device 42 is light (including non-visible light such as UV light), solidification substrate 52 is preferably substantially translucent to the wavelength(s) of light supplied by linear solidification device 42.

One example of a rigid or semi-rigid solidification substrate 52 is a translucent float glass. Another example is a translucent plastic. A variety of different float glasses and plastics may be used. Exemplary plastics that may be used include transparent acrylic plastics supplied by Evonik under the name Acrylite®. The term "translucent" is meant to indicate that substrate 52 is capable of transmitting the light wavelengths (including non-visible light such as UV light) necessary to solidify the solidifiable material and that the intensity of such wavelengths is not significantly altered as the light passes through substrate 52. In the case of photopolymers, a photoinitiator is commonly provided to start the polymerization/cross-linking process. Photoinitiators will have an absorption spectrum based on their concentration in the photopolymer. That spectrum corresponds to the wavelengths that must pass through solidification substrate 52 and which must be absorbed by the photoinitiator to initiate solidification. In one example wherein solidification energy source 112 is a blue laser light diode, Irgacure 819 and Irgacure 714 photoinitiators may preferably be used.

Figure 2:
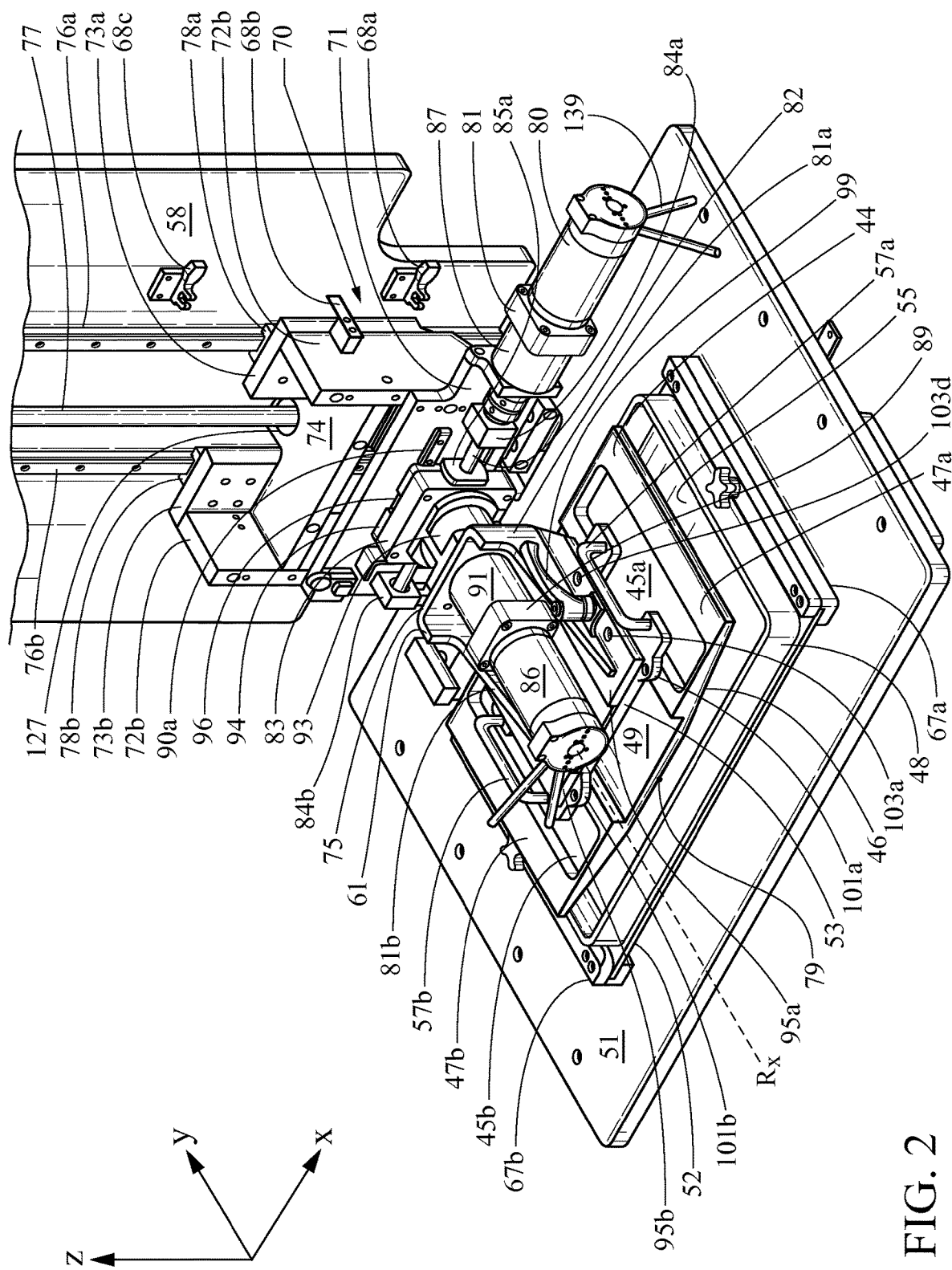
FIG. 2 is a detailed perspective view of a modified portion of the system of FIG. 1 with a build platform having a curved lower surface and which is translatable along a travel axis and build axis and rotatable about an axis of rotation.

Referring to FIG. 2 a more detailed view of a modified portion of system 40 of FIG. 1 is provided with a portion of the housing 54 removed. The system of FIG. 2 provides a build platform 44 that is curved along its width and along an axis of travel (the travel axis or "x" axis) along which linear solidification device 42 moves during an object solidification operation and during an object separation operation. The system of FIG. 2 also provides a build platform 44 that is movable in multiple dimensions during an object solidification operation and an object separation operation. Specifically, build platform 44 can translate in the travel (x) axis direction and build (z) axis direction as well as rotate about an axis of rotation $R_x$ parallel to the y axis.

The system of FIG. 2 includes two frame sections 67a and 67b which are spaced apart from one another in the travel (x) axis direction and which hold solidification substrate 52 within opening 56 (FIG. 1) in the upper surface 51 of housing 54. As shown in the figure, build platform 44 includes a lower surface 46 that is curved along its width and the travel (x) axis and which is the object contacting surface of the build platform 44. In preferred examples, the lower surface 46 has a substantially constant radius of curvature that is preferably constant within standard machining tolerances. When build platform 44 is viewed along the y-axis, the lower surface 46 defines an arc. The upper surface of build platform 44 comprises end portions 47a and 47b which are spaced apart from one another along the travel (x) axis and which are separated by a center recessed portion 49. The end portions 47a and 47b each have corresponding recesses 45a and 45b, which are spaced apart from center recessed portion 49 along the travel (x) axis. A build platform rotational motor 86 is supported by a rotational motor platform 53 that is attached to the end portions 47a and 47b of build platform 44 by suitable fasteners 101a, 101b, 101c (not shown) and 101d (not shown).

Figure 4:
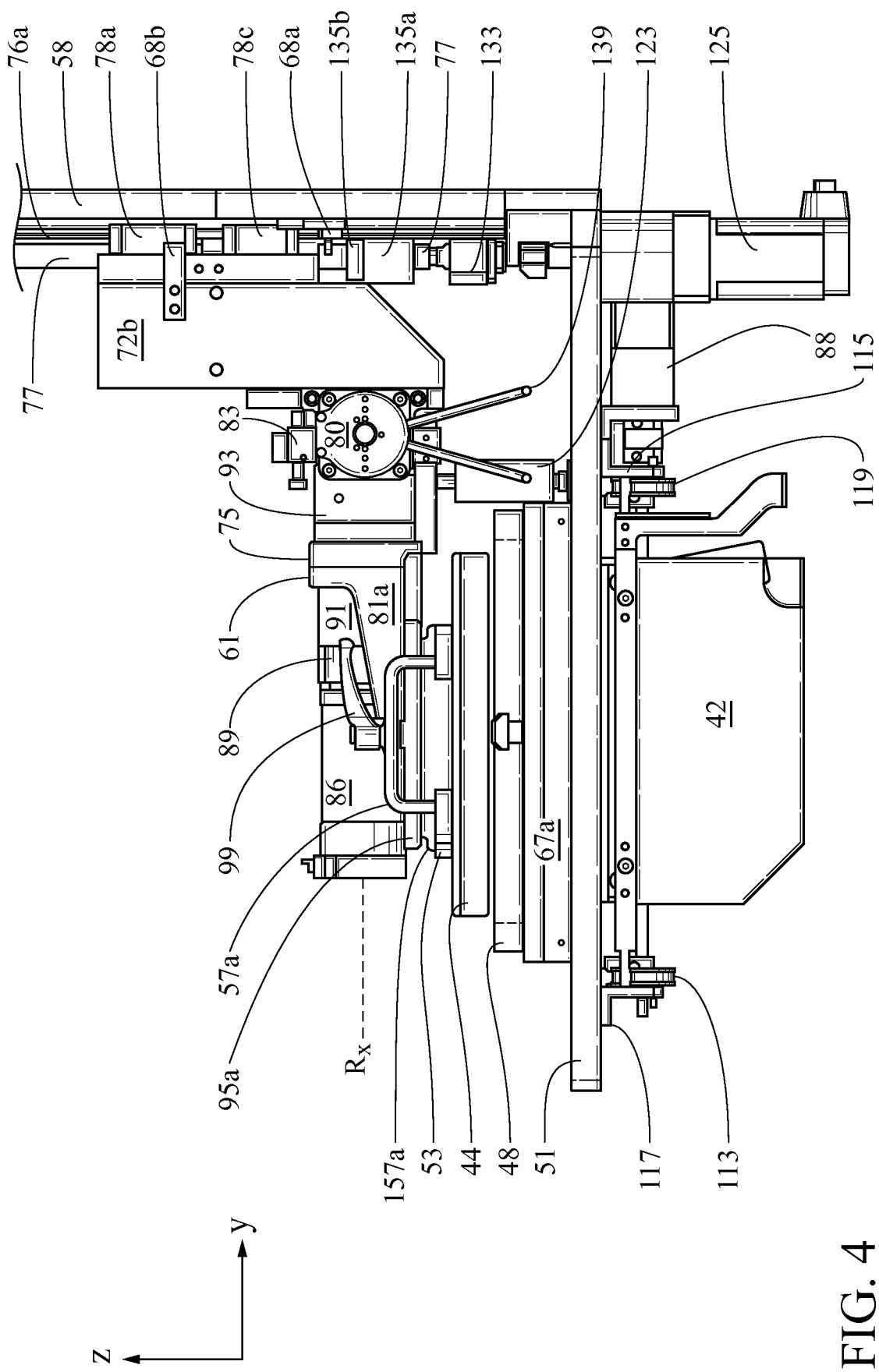
FIG. 4 is a side elevational view of the system of FIG. 2.

In the example of FIG. 2, build platform rotational motor 86 is disposed within a build platform holder 61. Build platform holder 61 comprises a rear wall 75 connected on each of its ends to side walls 81a and 81b. Sidewalls 81a and 81b are spaced apart from one another along the travel (x) axis and slope downward along the build (z) axis in a direction along the y axis moving away from the rear wall 75. Build platform rotational motor 86 is disposed in a recess created by rear wall 75 and sidewalls 81a and 81b. The build platform holder 61 also includes base portions 95a and 95b which lie in a plane parallel to the x-y plane on top of the rotational motor platform 53. Fasteners 103a-d (only 103a and 103d are shown) attach the base portions 95a and 95b of the build platform holder 61 to slides (not visible) attached to the underside of the build platform holder base portions 95a and 95b. The slides include grooves that face inwardly toward one another along the travel (x) axis. As shown in FIG. 4, the rotational motor platform 53 includes a pair of engaging projections 157a and 157b (not shown) that can be slidably inserted into the grooves. Handle 99 is operative to tighten the slides and pull them closer to the underside of the base portions 95a and 95b, thereby locking the build platform 53 into place. Rotational motor platform 53 includes handles 57a and 57b which are spaced apart from one another and on opposite sides of build platform rotational motor 86 along the travel (x) axis. The assembly defined by the rotational motor platform 53 and the build platform 44 can be slidably inserted into the grooves of the slides and releasably connected to the base portions 95a and 95b of build platform holder 61 by using handle 99.

Build platform rotational motor 86 is connected to a mounting flange 89 which is in turn connected to cylindrical gear box 91. Build platform rotational motor 86 has an axis of rotation that defines the axis of rotation $R_x$ of build platform 44 (FIG. 2). Cylindrical gear box 91 is connected to a junction cover 93 through an opening in the rear wall 75 of build platform holder 61. Build platform holder 61 operatively connects build platform rotational motor 86 to build platform 44 so that when build platform rotational motor 86 rotates about rotational axis $R_x$, the build platform holder 61 also rotates, causing the rotational motor platform 53 and build platform 44 to rotate therewith. Mounting flange 89 and junction cover 93 also rotate with build platform rotational motor 86. Level sensor 123 (FIG. 4) is provided to detect the level of solidifiable material in solidifiable material container 43 and feedback the detected level to a level control system that supplies solidifiable material to container 43.

As mentioned previously, build platform 44 has a lower surface 46 that is curved along the platform width and along the travel (x) axis. In preferred examples, the lower surface 46 defines a cylindrical segment with a radial direction parallel to the x-z plane and a length parallel to the y-axis. In preferred examples, the mid-point of lower surface 46 of build platform 44 (i.e., the location that is equidistant from the edges of the end portions 47a and 47b of the build platform 44) defines a sagittal plane that bifurcates the lower surface 46 into two equal halves and which intersects the lower surface 46 at a line 79 extending along the y-axis (referred to as the "sagittal line" hereinafter). The sagittal line 79 is parallel to the rotational axis $R_x$ and traverses a trochoidal path during object building operations and object separation operations (i.e., during the separation of the most recently solidified exposed surface of the object from a solidification substrate or film that the solidifiable material solidifies against).

As indicated previously, in the example of FIGS. 2-5, build platform 44 is configured to move in multiple dimensions during an object solidification operation and an object separation operation. In addition to rotating about the rotational axis $R_x$, build platform 44 is configured to translate along the travel (x) axis during object solidification operations and object separation operations. Travel axis translation motor 80 (FIGS. 2-4) is provided to translate build platform 44 along the travel (x) axis. Cables 139 are provided to supply power to travel axis translation motor 80.

Figure 3:
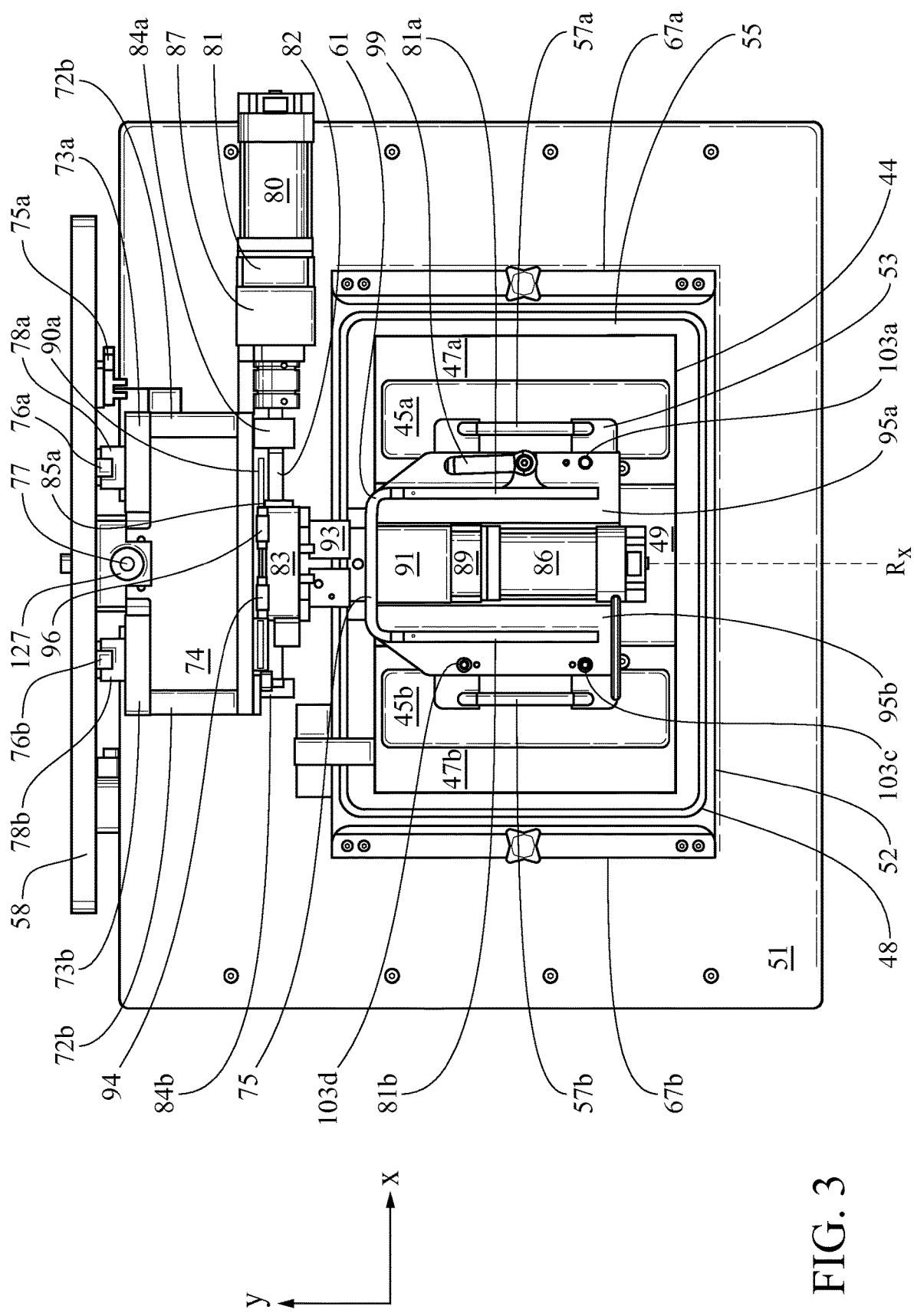
FIG. 3 is a top plan view of the system of FIG. 2.

As shown in FIGS. 2-3, travel axis translation motor 80 is connected to and rotates ball screw 82 when motor 80 is energized. Ball screw 82 engages complementary threads in threaded nuts 85a and 85b (not shown). Threaded nuts 85a and 85b are mounted on opposite sides of a travel axis carriage 83 and are spaced apart from one another along the travel (x) axis direction. Travel axis carriage 83 includes a through-bore which allows ball screw 82 to pass from one side of the carriage 83 to another side along the travel (x) axis. The threaded engagement of ball screw 82 and the threaded nuts 85a and 85b causes the travel axis carriage 83 to translate along the travel (x) axis as the ball screw 82 rotates about its longitudinal axis.

Build platform rotational motor 86 is operatively connected to build platform travel axis translation motor 80 so that when the travel axis translation motor 80 is energized, the build platform 44 translates along the travel (x) axis as the travel axis carriage 83 translates along the travel (x) axis direction. The build platform rotational motor 86 also translates along the travel (x) axis when travel axis translation motor 80 is energized. In the example of FIGS. 2-5, travel axis carriage 83 is connected to build platform holder 61 by a series of rods or posts (not shown). The rods are positioned on either side of the junction cover 93 along the travel x-axis and have lengths along the y-axis. In certain preferred examples, the travel axis carriage 83 does not rotate as the build platform rotational motor 86 rotates. In accordance with such examples, the rods are of sufficient length to maintain a y-axis gap between the junction cover 93 and the travel axis carriage 83 so that the junction cover 93 can rotate relative to the travel axis carriage 83.

Travel axis carriage 83 is vertically supported on first linear slide 90a and a second linear slide 90b (not shown) spaced apart from first linear slide 90a along the build (z) axis. The linear slides 90a and 90b are attached to a vertical mounting plate 71 that is attached to a build axis support assembly 70. Linear bearings 94 and 96 are mounted on a surface of travel axis carriage 83 and slidingly engage linear slides 90a and 90b. A lower pair of linear bearings (not shown in FIG. 2) engages the second linear slide (also not shown). Thus, rotation of ball screw 82 causes the travel axis carriage 83 to translate along the travel (x) axis as the linear bearings 94 and 96 slidingly engage the linear slide 90a (and as another pair of linear bearings engages slide 90b). Pillow blocks 84a and 84b include pressed ball bearings and are provided to improve the stability of the ball screw 82 and travel axis carriage 83. Pillow blocks 84a and 84b do not rotate with the ball screw 82. Instead, the ball screw 82 rotates relative to the pillow blocks 84a and 84b. As the foregoing indicates, energizing both travel axis translation motor 80 and build platform rotational motor 86 causes the build platform 44 to translate in the travel (x) axis direction while simultaneously rotating about the rotational axis $R_x$.

In certain examples, build platform 44 is also translatable along the build (z) axis while translating along the travel (x) axis and rotating about the rotational axis $R_x$. As shown in FIG. 4, a build axis motor 125 is operatively connected to build platform 44 to cause the build platform 44 to translate along the build (z) axis when build axis motor 125 is energized. In the particular exemplary system of FIGS. 2-5, the build axis motor 125 is energizable to cause both the build platform rotational motor 86 and the travel axis translation motor 80 to translate along the build (z) axis. Vertical mounting plate 71 (FIG. 2) is attached to build axis support assembly 70 by suitable fastening mechanisms. The build axis support assembly 70 includes a vertical end supports 72a and 72b placed in facing opposition to one another and spaced apart from one another along the travel (x) axis. Vertical end supports 72a and 72b are also attached to respective linear bearing mounting brackets 73a and 73b, each of which is attached to two respective linear bearing 78a/78c and 78b/78d (only 78a and 78b are visible in FIG. 2). The linear bearings 78a-78d slidingly engage vertical rails 76a and 76b mounted on vertical rail support member 58. In the example of FIGS. 2-5, the vertical mounting plate 71 on which the translation motor linear slides 90a and 90b (not shown) are mounted is attached to the vertical end supports 72a and 72b in order to connect the vertical mounting plate 71 to the build axis support assembly 70. Vertical end supports 72a and 72b are connected to another via horizontal support member 74. A lower end of travel switch 68a is mounted on the vertical rail support member 58 as is an upper end of travel switch 68c which is spaced apart from the lower end of travel switch along the build (z) axis. A contact 68b is attached to vertical end support 72a and moves along with the vertical end support 72a in response to the operation of build platform build axis motor 125. Thus, as the build platform 44 moves along the build (z) axis in the upward direction, the contact 68b will eventually reach and make contact with switch 68c, thereby generating a signal indicating that the end of travel has been reached in the upward direction along the build (z) axis. This signal can be provided to a controller or microcontroller operating motor 125 to reverse its operation so that the build platform 44 moves in the downward build (z) axis direction thereafter. As the build platform 44 moves along the build (z) axis in the downward direction, the contact 68b will eventually reach and make contact with lower end of travel switch 68a, thereby generating a signal indicating that the end of travel has been reached in the downward direction along the build (z) axis. The signal can be provided to a controller or microcontroller operating motor 125 to reverse its operation so that build platform 44 moves in the upward build (z) axis direction thereafter.

Although not shown in detail in the figures, build axis motor 125 is configured similarly to translation axis motor 80. Build axis motor 125 is connected to a ball screw 77 via the motor shaft and a coupling (not shown). Ball screw 77 is connected to first pillow block 133 which is packed with ball bearings that allow the ball screw 77 to rotate about its longitudinal axis relative to pillow block 133 (FIG. 4). Ball screw 77 also extends through second pillow block 135a which is also packed with ball bearings and relative to which ball screw 77 also rotates about its longitudinal axis. Threaded nut 135b is internally threaded and engages external threads of ball screw 77 such that when ball screw 77 rotates, threaded nut 135b translates along the build (z) axis. Threaded nut 135b is operatively connected to build axis support assembly 70 so that when the build axis motor 125 is energized, ball screw 77 rotates, causing the threaded nut 135b and build axis support assembly 70 to translate along the build (z) axis.

When the build axis motor 125 is energized, the build axis support assembly 70 and travel axis translation motor 80 translate along the build (z) axis. In addition, the build platform rotational motor 86, build platform holder 61, rotational motor platform 53 and build platform 44 translate along the build axis when build axis motor 125 is energized. Thus, the build platform travel axis translation motor 80, build platform rotational motor 86, and build platform build axis translation motor 125 provide three independent degrees of freedom for build platform 44, allowing it to simultaneously translate along the travel (x) and build (z) axes as it rotates about the rotational axis $R_x$.

Figure 5:
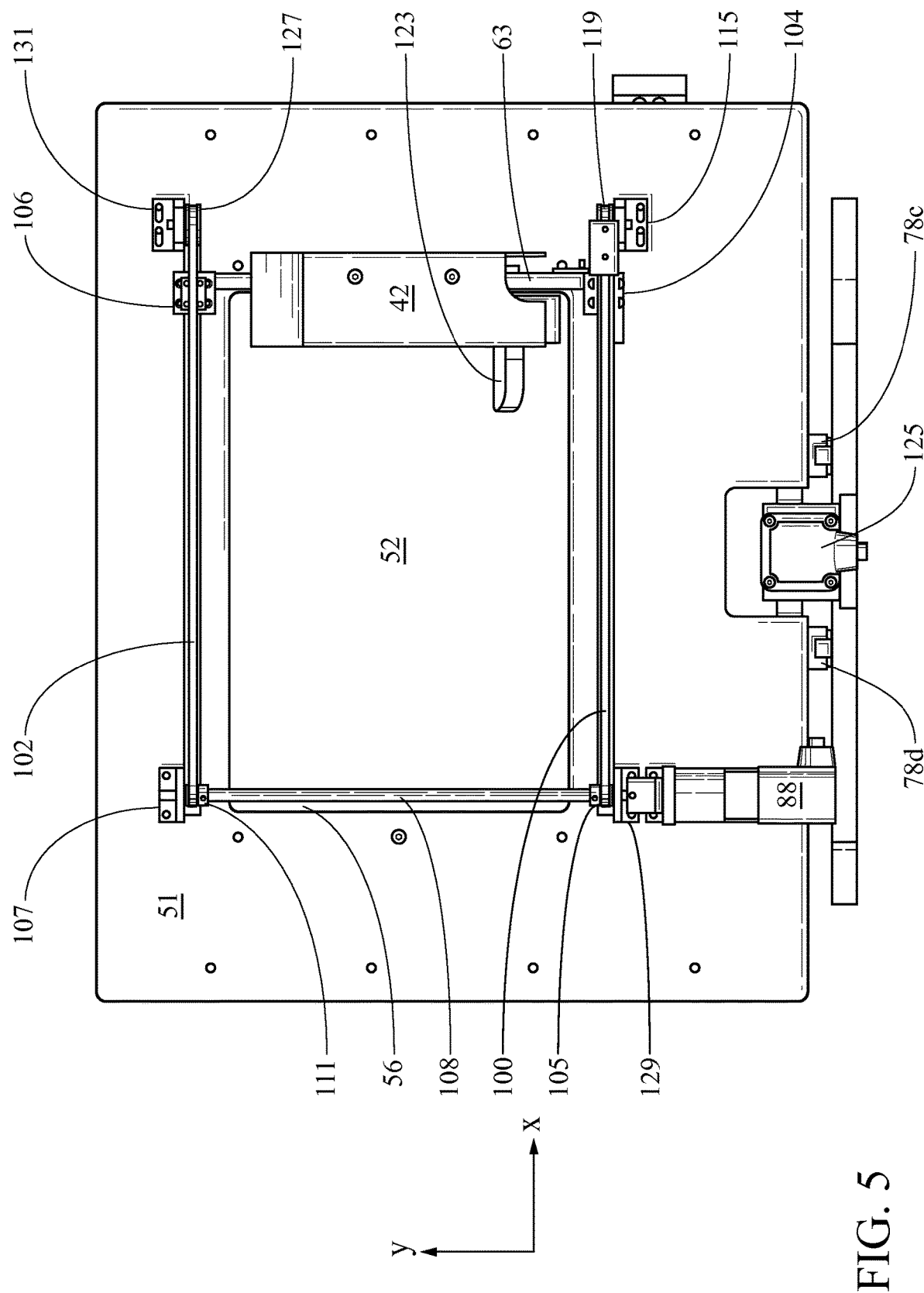
FIG. 5 is a bottom plan view of the system of FIG. 2.

Referring now to FIGS. 4 and 5, during an object building operation, linear solidification device 42 moves along the travel (x) axis as it selectively projects solidification energy upward along the build (z) axis and progressively along the scanning (y) axis. In certain examples, the linear solidification device 42 selectively projects solidification energy upward along the build axis and progressively along the scanning (y) axis only while it moves in a first direction along the travel (x) axis. The linear solidification device 42 then moves in a second direction along the travel (x) axis that is opposite the first direction without projecting solidification energy. In certain preferred examples, the movement of the linear solidification device 42 in the second direction along the travel (x) axis occurs during an object separation operation wherein the most recently solidified exposed surface 64 of object 59 (see FIG. 1) is separated from solidification substrate 52 (or film 55 if provided). When the linear solidification device 42 moves in the first direction along the travel (x) axis, it selectively supplies solidification energy to regions along the scanning (y) axis and upward along the build (z) axis in a manner that corresponds to data that represents the three-dimensional object being built. At the same time, or in other examples, the linear solidification device 42 moves in a coordinated fashion with the build platform 44, and in particular, with a tangent line (TL) of the build platform 44. As illustrated in FIGS. 6A-6I and described further below, the tangent line TL extends along the length (y-axis) direction of the build platform 44. However, the tangent line TL is not at a fixed location along the width (x-axis) of the build platform 44. Rather, it is a line located at the travel (x) axis position at which the lower build platform surface 46 (or the exposed object surface 64 if portions of the object have been formed on surface 46) is at the lowest build (z) axis position $z_{min}$. When no object is present on the build platform, the tangent line TL is defined by the intersection of a plane that is tangent to the lower build platform surface 46 and perpendicular to the build (z) axis. When a portion of the object is present on the build platform, the tangent line TL is defined by the intersection of a plane that is tangent to the exposed surface of the partially-formed object and perpendicular to the build (z) axis. In accordance with this definition, the tangent line TL remains perpendicular to the travel (x) and build (z) axes and moves along the travel (x) axis during an object build operation and during an object separation operation. In certain preferred examples, the tangent line TL moves along the travel axis at the same travel axis velocity ($v_x$) as the linear solidification device 42. In the same or other examples, the travel (x) axis position of the linear solidification device 42 remains aligned with the travel (x) axis position of the tangent line TL as the linear solidification device 42 moves along the travel (x) axis. In preferred examples, the coordinated movement of the tangent line TL and the linear solidification device 42 during a solidification operation causes solidification to occur in a linear pattern along the tangent line TL. In the same or other preferred examples, separation of a recently solidified object section from a solidification substrate during an object separation process occurs substantially, or preferably only, along the tangent line TL. As a result, the instantaneous separation forces required to separate a layer of a three-dimensional object from a solidification substrate are reduced relative to methods and systems in which the instantaneous separation forces occur along an area. Exemplary techniques of providing object data are described further below with respect to FIGS. 9-10 and 11A-11D.

FIG. 5 depicts the underside of the system of FIG. 2 and components for translating linear solidification device 42 along the travel (x) axis. Linear solidification device translation motor 88 is connected to shaft 108. Shaft 108 is connected to pulleys 111 and 105 which are spaced apart from one another along the y-axis. Pulley mounting brackets 107 and 129 are attached to the underside of the housing upper surface 51 and rotatably mount corresponding pulleys 111 and 105. Brackets 115 and 131 mount pulleys 119 and 127 to the underside of upper surface 51 of housing 54. Pulleys 119 and 127 are spaced apart from one another along the y-axis. Pulley 111 is spaced apart from pulley 127 along the travel (x) axis. Pulley 105 is spaced apart from pulley 119 along the travel (x) axis. Linear solidification device 42 is attached to a transverse support member 63. Transverse support member 63 is connected to timing belt brackets 106 and 104 as well as to linear bearings (not shown) that slidingly engage linear slides (not shown) mounted on the underside of upper surface 51. When motor 88 is energized, shaft 108 rotates about its longitudinal axis causing pulleys 105 and 111 to rotate. The rotation of pulleys 105 and 111 causes timing belts 100 and 102 to circulate and pulleys 119 and 127 to rotate. As the timing belts 100 and 102 circulate, the linear solidification device transverse support member 63 moves along the travel (x) axis, and the linear bearings (not shown) connected to transverse support member 63 slidingly engage linear slides positioned between the timing belts 100 and 102 and the underside of housing upper surface 51. Fan 123 (FIG. 5) is also provided to dissipate any heat generated during the solidification process.

As mentioned previously, in certain preferred examples of the system 40, build platform 44 has a lower surface 46 that is in the shape of a partial cylinder with a radial direction parallel to the x-z plane and a length direction parallel to the x-y plane. When viewed along the scanning (y) axis, the lower surface 46 and its end points define a circular segment as shown in FIGS. 6A-6F in which the lower surface 46 is curved along the width dimension of the build platform 44 and along the travel (x) axis direction. A sagittal plane bisects the lower surface 46 into two halves and intersects the lower surface 46 along sagittal line 79. Lower surface 46 preferably has a substantially constant radius of curvature, or more preferably, a constant radius of curvature within standard manufacturing tolerances.

As best seen in FIG. 2, the actual upper surface of the build platform may not be planar and may, for example, include recesses such as recesses 45a and 45b and center recessed portion 49. However, for purposes of understanding the movement of the build platform 44 using the methods described herein, it is convenient to describe the cross-sectional view of the build platform 44 when viewed along the y-axis by defining a circular segment in which the ends of the lower surface 46 are connected by a planar surface 47 (which may be imaginary) as shown in FIGS. 6A-6F. As indicated above, it is also convenient to define a sagittal line 79 (which appears as a point when build platform 44 is viewed along the y-axis) that extends along the lower surface 46 in the scanning (y) axis direction at the mid-point along the direction of curvature of the lower surface 46. A plane tangent to the sagittal line 79 would therefore also be parallel to the planar upper surface 47 that can be defined for build platform 44.

As mentioned previously, during object building and/or object separation operations, the build platform 44 moves along the travel (x) axis and rotates about a rotational axis $R_x$ parallel to the y-axis. In one particular implementation, the build platform moves such that fixed points on the build platform, such as the sagittal line 79, traverse trochoidal paths in the x-z plane during the formation and separation of each layer of solidified material. In addition, other points that remain fixed in space relative to the build platform will also traverse trochoidal paths. For example, the rotational axis $R_x$ defined by rotational motor 86 will traverse trochoidal paths in the x-z plane during object solidification and separation processes. A "trochoid" is a curve described by a point that is fixed in space relative to a circle (the "trochoidal circle") as the circle rolls along a planar surface. In accordance with the implementation, the sagittal line 79 and the rotational axis $R_x$ traverse specific, and respective trochoidal paths during the solidification of each layer used to form three-dimensional object 59, but the respective trochoidal paths of both sagittal line 79 and rotational axis $R_x$ will vary between different layers of the three-dimensional object. In the same or other implementations, movement of the tangent line TL along the travel (x) axis is based on the movement of the linear solidification device 42 along the travel (x) axis. In a preferred example, the angular speed of rotation ω of the rotational motor 86 about rotational axis $R_x$, and hence, the angular speed of rotation ω of sagittal line 79 about rotational axis $R_x$ are held constant during an object solidification process and/or an object separation process. In the same or other examples, the angular speed of rotation ω corresponds to the velocity $v_x$ of the linear solidification device 42 along the travel (x) axis and the radius of curvature of the lower build platform surface 46. In preferred examples, the tangent line TL and the linear solidification device 42 remain aligned along the travel (x) axis as the linear solidification device 42 moves along the travel (x) axis. During the formation of the first layer of a three-dimensional object, the tangent line TL will intersect the lower surface 46 of build platform 44 (FIGS. 6A-6C). During the formation of subsequent layers, the tangent line TL will intersect the exposed surface of the most recently formed object layer (FIGS. 6H and 6I).

In addition, in certain examples, as the linear solidification device 42 moves along the travel (x) axis, the build platform 44 is manipulated so that the portion of the exposed surface of the object being formed which was most recently solidified lies at a constant distance along the build (z) axis from the linear solidification device 42 ($\Delta z_{fixed}$ in FIGS. 6H and 6I) and from the bottom of solidifiable material container 48. This configuration provides for a consistent thickness of unsolidified solidifiable material, and therefore, a consistent thickness of solidified material for each layer that is formed.

FIGS. 6A-6F depict an example of a build platform 44 that moves in multiple dimensions during an object solidification and an object separation process. As the figures indicate, the radius of curvature of the lower surface 46 of build platform 44 defines a trochoidal circle (not shown) having a center C and a radius a that equals the distance between Center C and the sagittal line 79. The build platform 44 is manipulated to simulate the rolling of the trochoidal circle on a tangent plane perpendicular to the build (z) axis. In FIGS. 6A-6C, the tangent line TL is defined by the intersection of the tangent plane and the lower surface 46 of the build platform 44 because no solidified object has yet been formed on the lower build platform surface 46. However, in general, the tangent plane is tangent to the most recently formed exposed surface of the three-dimensional object and perpendicular to the build (z) axis, and the tangent line is the intersection of the tangent plane with that most recently formed exposed surface. See FIGS. 6H and 6I.

As the figures indicate, the tangent line TL moves in alignment with the linear solidification device 42 in a first direction along the travel (x) axis during an object solidification process (FIGS. 6A-6C). The tangent line TL also moves in alignment with the linear solidification device 42 in a second direction along the travel (x) axis during an object separation process (FIGS. 6D-6F). However, the alignment of the linear solidification device 42 and the tangent line TL are not critical during an object separation process. Nevertheless, it is often convenient to program a control computer or microcontroller that guides the movement of linear solidification device 42 and build platform 44 so that the linear solidification device 42 and tangent line TL remain aligned along the travel (x) axis direction regardless of whether solidification or separation is occurring.

In FIGS. 6A-6C, the sagittal line 79 and axis of rotation $R_x$ move in first respective trochoidal paths in the x-z plane. In FIGS. 6D-6F (which depict the movement after a first layer of the three-dimensional object is formed), the sagittal line 79 and axis of rotation $R_x$ move in second respective trochoidal paths in the x-z plane (the first layer of solidified material is not visible in FIGS. 6D-6F but would be present on the lower surface 46 of build platform 44). In FIGS. 6A and 6F, the linear solidification device 42 is at a first build axis boundary within a build envelope (described further below with respect to FIG. 11B). In FIGS. 6C and 6D, the linear solidification device 42 is at a second build axis boundary within the build envelope. The first and second build axis boundaries are spaced apart along the travel (x) axis and define the maximum travel (x) axis dimension of the three-dimensional object which can be constructed. Thus, sagittal line 79 and rotational axis $R_x$ move along the travel (x) axis, the build (z) axis, and rotate in the x-z plane during the object solidification process of FIGS. 6A-6C the object separation process of FIGS. 6D-6F.

In order to describe the build platform 44 movement in accordance with this example, it is convenient to define a trochoidal circle having a radius equal to the radius of curvature of the build platform lower surface 46. The trochoidal circle is considered to roll along the tangent plane that intersects the exposed object surface at the tangent line (see FIGS. 6H and 6I). If x represents the position of the fixed point along the planar surface and z represents the distance of the point from the surface as the circle rolls, the x and z positions relative to a starting position at 0, 0 which is in contact with the tangent plane surface (i.e., x=0 and z=0 is a point on the circle to which the plane along which the circle rolls is tangent) can be described as follows:

$$x = a\varnothing - b \sin(\varnothing) \quad (1)$$

$$z = a - b \cos(\varnothing) \quad (2)$$

where, a=the length of the radius of the trochoidal circle;
b=the distance between the point of interest that is fixed relative to the trochoidal circle and the center of the trochoidal circle in the radial direction; and
ø is the angle of rotation from a starting angle of 0 when x and z are 0.

In certain preferred examples, the movement of build platform 44 is based on a trochoidal path in which the radius of curvature a remains constant during the build process while the distance b changes during the build process. In certain preferred examples, after each layer of the three-dimensional object is built, the build platform 44 is elevated in the build (z) axis direction by an amount equal to the layer thickness, thereby reducing the value of b by an amount equal to the layer thickness (Δb).

The movement of any point that lies at a fixed distance b from the center C of the trochoidal circle can be described using equations (1) and (2). For purposes of understanding the motion of build platform 44 it is convenient to describe the movement of the rotational axis $R_x$ defined by the rotational motor 86 and the sagittal line 79. In equations (1) and (2), the movement of each of these lines $R_x$ and 79 (which appear as points when viewed in cross-section, as in FIGS. 6A-6F), will be based on the radius a defined by the radius of curvature of the lower build platform surface 46. In addition, the values of b used for both the sagittal line 79 and the rotational axis $R_x$ will change by a layer thickness (Δb) with the formation of each layer. However, the initial values of b will differ. With respect to the sagittal line 79, the initial value of b will equal the radius of curvature a of the lower build platform surface 46. With respect to rotational axis $R_x$, the initial value of b will equal the difference between the length of radius a and the distance d between the rotational axis $R_x$ and the sagittal line 79 in the radial direction defined by lower build platform surface 46. Thus, during the formation of a given layer of solidifiable material, the values of b applicable to the rotational axis $R_x$ and the sagittal line 79 will remain constant. However, they will not be the same. Instead, the value of b for the rotational axis $R_x$ will be smaller than the value of b for the sagittal line 79 by an amount equal to the distance between the rotational axis $R_x$ and the sagittal line 79 along the radial direction defined by the lower build platform surface 46. The value of the radius of curvature a is the same for the sagittal line 79 and the rotational axis $R_x$ and remains constant throughout the process of making a three-dimensional object.

Referring again to FIGS. 6A-6F, it is convenient to define a reference rotational orientation of the build platform 44 as the orientation at which a plane tangent to lower surface 46 at sagittal line 79 is perpendicular to the build (z) axis and parallel to the x-y plane as illustrated in FIGS. 6B and 6E. Equations (1) and (2) are defined for a trochoidal circle that rolls along a plane (the "tangent plane") that is perpendicular to the build (z) axis and tangent to the most recently formed exposed surface of the three-dimensional object (or for the first layer, the plane that is perpendicular to the build (z) axis and tangent to the lower build platform surface 46). In the reference orientation, the sagittal plane is parallel to the y-z plane and perpendicular to the x-y plane. Equations (1) and (2) are based on a trochoidal circle that rolls from a starting point at which the center C of the trochoidal circle and the rotational axis $R_x$ define a line that is parallel to the build (z) axis. A trochoidal circle starting at that position would roll in the clock-wise direction by 2π radians to reach the reference rotational orientation of FIG. 6B. As a result, when build platform 44 is in the reference rotational orientation, the angle ø in equations (1) and (2) is 360 degrees or 2π radians because the point of interest (e.g., the sagittal line 79 or rotational axis $R_x$) is rotated 360° Or radians) from the reference position.

As the linear solidification device 42 moves a distance $\Delta x_{LD}$ in the travel (x) axis direction, the tangent line TL moves by the same amount ($\Delta x_{TL}$) via the operation of build platform travel axis translation motor 80. The angular rotation of the build platform about rotational axis $R_x$ can be related to the distance Δx as follows:

$$\Delta\varnothing = -(1/a)\Delta x_{TL} \quad (3)$$

where, $\Delta\varnothing = \varnothing_2 - \varnothing_1$ is the change in the angle of rotation of the sagittal plane on which rotation axis $R_x$ and sagittal line 79 lie as the tangent line TL moves a distance $\Delta x_{TL}$ along the travel (x) axis; and $\Delta x_{TL} = x_2 - x_1$ is the change in travel (x) axis position of the tangent line TL, which also equals the change in travel (x) axis position of linear solidification device 42.

In equation (3), $\Delta x_{TL}$ is positive when moving in a first direction (e.g., left to right in FIGS. 6A-6C) along the travel (x) axis and negative when moving in a second direction (e.g., right to left in FIGS. 6D-6F) along the travel (x) axis. Sagittal plane angles of rotation ø that are counter-clockwise from the tangent line TL and the y-z plane are positive, and sagittal plane angles of rotation ø that are clockwise from the tangent line TL and the y-z plane are negative. As mentioned above, the angle ø is the angle of rotation of a trochoidal circle defined by the radius of curvature a of the lower build platform surface 46 relative to a starting position at which the sagittal plane is perpendicular to the tangent plane that defines the tangent line TL. It is convenient to define the angular position of the sagittal line 79 and the rotation axis $R_x$ relative to the build platform reference positions of FIGS. 6B and 6E, in which the plane tangent to the sagittal line 79 is perpendicular to the build (z) axis. In the reference orientation of FIGS. 6B and 6E, ø=360°=2π radians. Thus, the angle of rotation (in radians) relative to the reference orientation can be defined as follows:

$$\o_R = 2\pi - \o \quad (4)$$

where, ø is the angular rotation of a trochoidal circle of radius a from a starting position at which the sagittal plane of the build platform 44 is perpendicular to the tangent plane on which the trochoidal circle rolls.

In equation (4), angular positions that are counterclockwise from the tangent line TL and the y-z plane are positive, while those that are clockwise from the tangent line TL and the y-z plane are negative. Thus, in FIG. 6A $\o_R$ is positive, while in FIG. 6C, $\o_R$ will have a negative value.

A change in the relative angular orientation $\o_R$ can be defined as follows:

$$\Delta\o_R = \o_{R2} - \o_{R1} \quad (5)$$

where, $\o_{R2}$ is a second rotational orientation relative to the reference rotational orientation of FIGS. 6B and 6E and $\o_{R1}$ is a first rotational orientation relative to the reference rotational orientation of FIGS. 6B and 6E.

The build platform 44 is rotated about rotational axis $R_x$ (FIG. 2) via the operation of build axis rotation motor 86 such that the rotational orientation of the sagittal plane on which sagittal line 79 and rotation axis $R_x$ lie changes by an amount $\Delta$ø in accordance with equation (3) and an amount $\Delta\o_R$ in accordance with equation (5). As it rotates from the rotational orientation of FIG. 6A, the build platform 44 eventually reaches the reference rotational orientation of FIG. 6B. As the linear solidification device 42 continues to move in the travel (x) axis direction, the build platform 44 continues to translate along the travel (x) axis and to rotate about the rotational axis $R_x$ until reaching the rotational orientation of FIG. 6D, at which point the linear solidification device 42 has completed its traversal of the build envelope 342 (FIG. 11B) in the travel (x) axis direction. As FIGS. 6A-C indicate, at each position along the travel (x) axis, the linear solidification device 42 remains aligned with the minimum build axis position ($z_{min}$) defined by the tangent line TL (which appears as a point in FIGS. 6A-6C because the length of the line is along the y-axis). During the formation of the first layer of the three-dimensional object, the linear solidification device 42 remains aligned with the part of the build platform lower surface 46 that has the lowest build (z) axis position, $z_{min}$. During the formation of subsequent layers, the linear solidification device 42 remains aligned with the portion of the exposed object surface that has the lowest build (z) axis position, $z_{min}$ (FIGS. 6H and 6I). In preferred examples, the minimum build axis position $z_{min}$ of the trochoidal circle defined by the radius of curvature a of the lower build platform surface 46 is maintained at a fixed distance from the bottom of the solidifiable material container 48 during an object building operation, which ensures that the thickness of unsolidified solidifiable material at the location of solidification remains constant during the formation of each part of a layer and each layer of an object. In the same or other examples, the spacing along the z-axis between the linear solidification device 42 and the most recently solidified exposed surface 64 of the object 59 (FIG. 1) is also held constant.

In FIGS. 6D-6F, the motion of the build platform 44 is reversed and the build platform travels in a second direction along the travel (x) axis that is opposite the first direction in which it travels in FIGS. 6A-6C. In the example of FIGS. 6D-6F, linear solidification device 42 does not supply solidification energy to the solidifiable material 50 when traveling in the second direction. FIGS. 6D-6F define a separation operation (although the object is not visible) in which solidified object material is separated from the solidification substrate 52 and film 55. Because of the trochoidal path of sagittal line 79, the separation forces at each moment are concentrated along tangent line TL of the trochoidal circle. Because the separation forces are concentrated along a line instead of a larger surface area of the object being built, separation forces will not tend to limit the x-y area of the object that can be built.

Referring to FIGS. 6H and 6I, the linear solidification device 42 is depicted in two different rotational orientations and two different locations along the travel (x) axis. The trochoidal circle defined by the radius of curvature of the lower surface 46 of build platform 44 is shown in dashed lines and labeled as "TC." The solidified object 59 is shown on the build platform 44. As the figures indicate, the exposed surface 64 of the most recently formed object layer lies on the circumference of trochoidal circle TC. The linear solidification device 42 remains aligned along the travel (x) axis with the tangent line TL, which is located at the minimum build (z) axis position of the trochoidal circle on which the most recently formed, exposed object surface 64 lies. The trochoidal circle rolls on the plane (the tangent plane) that is perpendicular to the build (z) axis and tangent to the most recently solidified, exposed object surface 64. The tangent line TL is defined by the intersection of the exposed object surface 64 and the tangent plane.

In FIGS. 6H and 6I, the initial value of b for the trochoidal point of interest (e.g., the sagittal line 79 or rotational axis $R_x$) has been reduced by the number of layers comprising object 59 multiplied the thickness of the layers (which is the same for all layers comprising the object in this particular example). The trochoidal circle rotates in a clockwise direction on the tangent plane from an initial rotational orientation in FIG. 6H at which the sagittal plane (a plane through the center C of the trochoidal circle that symmetrically divides the lower build platform surface 46 into two sections) is oriented at an angle $\o_{R1}$ relative to the build (z) axis to a subsequent rotational orientation at which the sagittal plane is oriented at an angle $\o_{R2}$ relative to the build (z) axis.

Equations (1) and (2) can be modified to use the angular rotation relative to the non-rotated position of FIGS. 6B and 6E (i.e., to use $\o_R$) and to calculate the distance that the sagittal line 79 travels along the travel (x) axis as the sagittal line 79 is rotated from a first angular position $ø_{R1}$ to a second angular position $ø_{R2}$ as follows:

$$\Delta x = a[ø_{R1} - ø_{R2}] + b[\sin(2\pi - ø_{R1}) - \sin(2\pi - ø_{R2})] \quad (6)$$

wherein, $\Delta x$=change in position of the sagittal line 79 along the travel (x) axis from a first position $x_1$ to a second position $x_2$;

$ø_{R1}$=the angle of rotation of the build platform 44 when the sagittal line is at the first position $x_1$ relative to a reference rotational orientation (FIGS. 6B and 6E) in which the sagittal plane is parallel to the y-z plane and perpendicular to the x-y plane;

$ø_{R2}$=the angle of rotation of the build platform 44 when the sagittal line is at the second position $x_2$ relative to the reference angular orientation (FIGS. 6B and 6E) in which the sagittal plane is parallel to the y-z plane and perpendicular to the x-y plane;

a=the length of the radius of curvature of lower surface 46 of the build platform 44;

b=the distance between the sagittal line 79 and the center of the circle of radius a along the radial direction.

In equation (6), the center of the circle of radius a remains at a fixed position along the build (z) axis during the formation of each layer of a three-dimensional object. Thus, the value of a will remain constant for the formation of each layer, and the initial value of b for sagittal line 79 will equal the length of radius a. Each subsequent value of b will be one layer thickness less than the previous value of b. When the build platform 44 is rotated counter-clockwise relative to the x-y plane, the sagittal plane will be rotated counterclockwise relative to the tangent line TL and the y-z plane, and $ø_R$ will be positive (FIGS. 6A and 6F). When the build platform 44 is rotated clock-wise relative to the x-y plane, the sagittal plane will be rotated clockwise relative to the tangent line TL and the y-z plane, and $ø_R$ will be negative (FIGS. 6C and 6D).

Equation (6) can be modified to describe the trochoidal path of other fixed points of interest. For example, the equation can be used to describe the travel (x) axis path of the rotation axis $R_x$. In that case, the value of b would be the distance from the center of the trochoidal circle of radius a to the axis of rotation $R_x$ along the radial direction. The length of a will again equal the length of the radius of curvature of lower build platform surface 46 during the formation of each layer of the three-dimensional object.

In certain examples of making a three-dimensional object herein, the values of $\Delta x$ calculated from equation (6) are used to guide the movement of the build platform travel axis translation motor 80. As indicated in FIG. 2, the build platform travel axis translation motor 80 is configured so that the movement of ball screw 82 by a certain amount $\Delta x$ along the travel (x) axis causes the axis of rotation $R_x$ to move by the same amount along the travel (x) axis. When the system is configured in this manner, it is preferable to calculate the trochoidal path of the rotational axis $R_x$ not the sagittal line 79 so that the value of $\Delta_x$ obtained from equation (6) can be directly used to guide the operation of build platform travel axis translation motor 80. Thus, in preferred examples, the trochoidal point of interest lies on the intersection of rotational axis $R_x$ and the axis of translation of build platform travel axis translation motor 80.

Figure 6G:
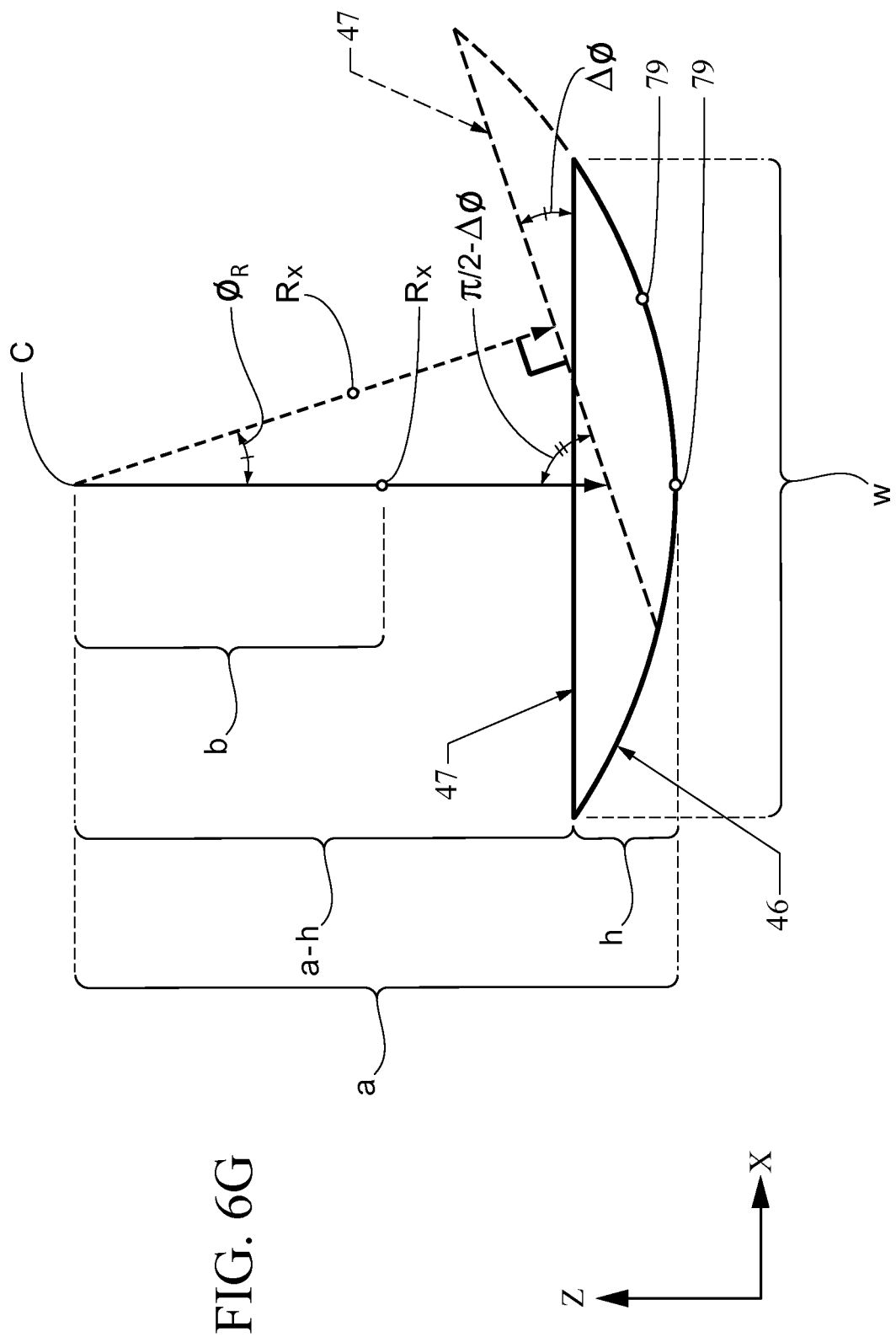
FIG. 6G is a schematic view of two rotational positions of the build platform of the system of FIG. 2 used to illustrate the rotational relationship between the movement of a point on a trochoidal circle and the rotational orientation of the build platform.
Figures 6H, 6I:
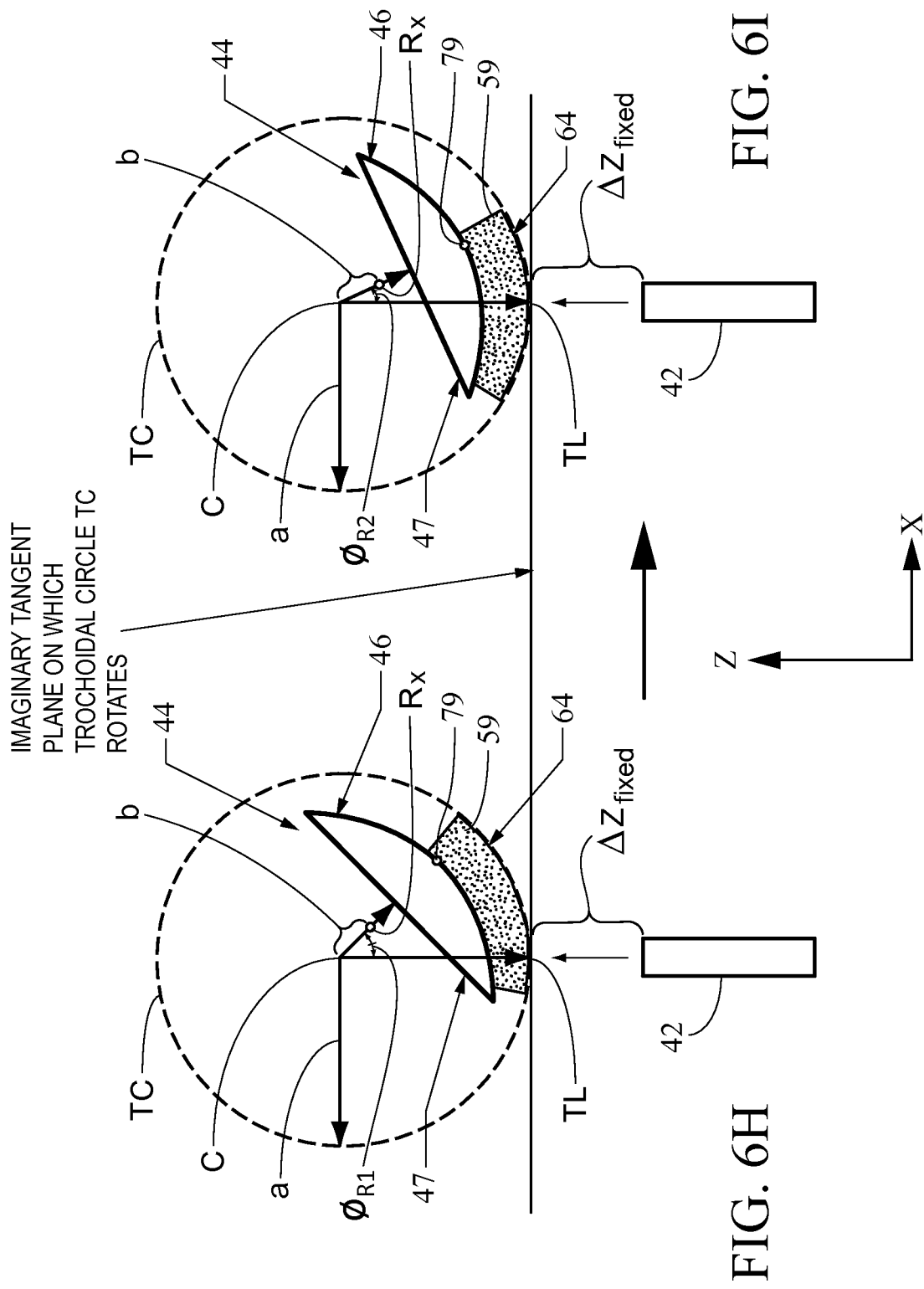
FIG. 6H is a schematic view of a build platform with a partially formed object built thereon in a first position along a travel axis and in a first rotational orientation about an axis of rotation during an object building operation.
FIG. 6I is a schematic view of a build platform with a partially formed object built thereon in a second position along a travel axis and in a second rotational orientation about an axis of rotation during an object building operation.

FIG. 6G illustrates the relationship between the angle of rotation $\Delta ø_R$ of the sagittal plane relative to the y-z plane and the rotation of the build platform 44 relative to the non-rotated reference orientation of FIG. 6B. The sagittal plane bifurcates the lower build platform surface 46 and includes the center C of the trochoidal circle as well as the sagittal line 79 and the rotation axis $R_x$. The build platform 44 is shown in the reference (non-rotated) orientation in solid lines and in a rotated orientation in dashed lines. The build platform rotates about the rotational axis $R_x$ such that the upper surface 47 of the build platform 44 is rotated by an amount $\Delta ø$ relative to the reference orientation. As the figure illustrates, the change in rotational position of the build platform relative to the x-y plane ($\Delta ø$) equals the angle of rotation ($ø_R$) of the sagittal plane (on which rotation axis $R_x$ and sagittal line 79 lie) relative to the y-z plane. Thus, the angle of rotation predicted by the equations of a trochoid can be used to determine the rotation of the rotational motor 86.

If the sagittal line 79 traverses a trochoidal path in the x-z plane, equation (2) can be modified to determine the change in build (z) axis position of the sagittal line as the build platform rotates from one angular position relative to the reference position (FIGS. 6B and 6E) to another angular position relative to the reference position:

$$\Delta z = b[\cos(2\pi - ø_{R1}) - \cos(2\pi - ø_{R2})] \quad (7)$$

wherein, $\Delta z$=the distance traveled by the sagittal line 79 along the build (z) axis from an initial position to a second position, wherein the distance upward along the build (z) axis and away from the solidifiable material container 43 is defined as being positive;

$ø_{R1}$=the angle of rotation of the build platform (in radians) relative to a non-rotated reference position (FIGS. 6B and 6E) in which the sagittal plane is parallel to the y-z plane and perpendicular to the x-y plane;

$ø_{R2}$=the angle of rotation of the build platform (in radians) relative to a non-rotated reference position (FIGS. 6B and 6E) in which the sagittal plane is parallel to the y-z plane and perpendicular to the x-y plane;

a=the length of the radius of curvature of lower surface 46 of build platform 44; and b is the distance between the sagittal line 79 and the center of the circle of radius a along the radial direction.

In equation 7, the center of the circle of radius a remains at a fixed position along the build (z) axis during the formation of each layer of a three-dimensional object. Thus, the value of a remains constant during the formation of each layer of the three-dimensional object, and initial value of b for the sagittal line 79 will equal the radius a. Each subsequent value of b will be one layer thickness less than the previous value of b. As with equation (6), when the build platform 44 is rotated counter-clockwise relative to the x-y plane, the sagittal plane will be rotated counterclockwise relative to the tangent line TL and the y-z plane, and the value of $ø_R$ in equation (7) will be positive (FIGS. 6A and 6C). When the build platform 44 is rotated clock-wise relative to the x-y plane, the sagittal plane will be rotated clockwise relative to the tangent line TL and the y-z plane, and the value of $ø_R$ in equation (7) will be negative (FIGS. 6C and 6D).

As with equation (6), equation (7) can be modified to determine the change in the rotational axis $R_x$ position as the build platform rotates from $ø_{R1}$ to $ø_{R2}$. In that case, the initial value of b would equal the difference between the length of radius a and the distance between the axis of rotation $R_x$ and the sagittal line 79 in the radial direction. In preferred implementations, the trochoidal point of interest used in equation (7) is selected so that the calculated value of $\Delta z$ equals the distance of translation of ball screw 77 along the build (z) axis so that the calculated value of $\Delta z$ can be used to guide the operation of build platform build axis motor 125. In the system of FIGS. 2-5, the axis of translation of the build platform build axis translation motor 125 is perpendicular to a plane in which the rotational axis $R_x$ and the axis of translation of build axis translation motor 80 lie. Thus, the trochoidal path of rotational axis $R_x$ would preferably be used to calculate Δz in equation (7) and then to guide the movement of the build platform build axis motor 125.

Referring again to FIG. 6G, the radius a used in equations (1) to (4) is the radius of curvature of the lower surface 46 of the build platform 44. The radius a can be determined from the sagittal height h defined by the lower surface 46 and the width w of the build platform along the direction of curvature (i.e., the width w is the chord length defined by lower surface 46):

$$a=(h^2+0.25w^2)/2h \quad (8)$$

where, h=the sagittal height h defined by the lower surface 46;
w=the width of the build platform 44 defined by the width of the lower surface 46.

In FIG. 6A, the sagittal line 79 is at an initial position corresponding to the position of linear solidification device 42 at which solidification may first begin along the travel axis (i.e., linear solidification device 42 and tangent line TL are at the build envelope border 343 of FIG. 11B as discussed further below). At this initial position, the upper surface 47 and the plane tangent to the sagittal line 79 are rotated counter-clockwise by an angle $ø_R$ relative to the reference orientation of FIG. 6B. The angle $ø_R$ is also the angle of rotation of the trochoidal circle of radius a in the orientation of FIG. 6A relative the orientation of FIG. 6B. Thus, in FIG. 6A, $ø_R$ is positive and equals 2π–ø.

In FIG. 6B, the build platform 44 is in the non-rotated orientation at which $ø_R$ is zero and ø=2π. The position of tangent line TL along the travel (x) axis is the mid-point of the build envelope 342 length in the travel (x) axis direction (FIG. 11B). In FIG. 6C, the build platform 44 has completed its traversal in the travel (x) axis direction. The value of $ø_R$ is negative in the orientation of FIG. 6C and equals 2π–ø.

As discussed previously, the system 40 of FIGS. 1-5 includes a linear solidification device 42. The linear solidification device 42 may be configured in a number of ways. In certain examples, the linear solidification device 42 progressively exposes portions of the solidifiable material to solidification energy in a scanning (y) axis direction as the linear solidification device 42 device moves along the travel (x) axis direction. In other examples, a generally, or preferably substantially, linear pattern of solidification energy is applied in a single exposure along one direction as the device moves in another direction. The solidification energy may comprise electromagnetic radiation. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application. In preferred embodiments, linear solidification device 42 includes a linear scanning device, and solidification energy is "scanned" in a scanning direction that defines a scanning axis (i.e., the y-axis) as the linear solidification device 42 moves in a direction along the travel (x) axis. Preferably, the linear solidification device 42 is not itself moved in the y-direction as this occurs. The sequential linear scans in the scanning axis direction may be referred to as "linear scanning operations" herein.

An example of a linear solidification device 42 is depicted in FIGS. 7A and 7B. Linear solidification device 42 comprises a solidification energy source 112, a scanning device, and a housing 110. In FIGS. 7A and 7B, the linear solidification device 42 is depicted upside down relative to the orientation of FIGS. 1-5. In FIGS. 1-5, the solidifiable material is above the linear solidification device 42 along the build (z) axis so that the linear opening 114 is positioned between the rotating energy deflector 113 and the solidification substrate 52 along the build (z) axis.

In the embodiment depicted in FIGS. 7A and 7B, the scanning device is a rotating energy deflector 113. In other examples of a linear solidification device 42, the scanning device is a laser scanning micromirror that is used in place of rotating energy deflector 113. Thus, it should be understood throughout that a laser scanning micromirror may be used in place of a rotating energy deflector 113 in the exemplary embodiments described herein.

Suitable laser scanning micromirrors include magnetically-actuated MOEMS (micro-opto-electromechanical systems) micromirrors supplied under the name LSCAN by Lemoptix SA of Switzerland. A linear scanning micromirror comprises a silicon chip with a fixed part and a movable mirror part. The mirror is electrically or magnetically actuated to tilt relative to the fixed part to a degree that corresponds to the actuating signal. As the mirror tilts, received solidification energy is scanned via deflection from the tilting mirror. Thus, the degree of tilt or tilt angle corresponds to the position along the scanning (y) axis at which the deflected solidification energy strikes the surface of the solidifiable material.

Linear solidification device housing 110 is a generally polygonal structure. As depicted in FIGS. 7A and 7B, housing 110 has an open face, but the face may instead be closed. Rotating energy deflector 113 is spaced apart from solidification energy source 112 along both the z-axis and the y-axis, and may be slightly offset from solidification energy source 112 along the x-axis as well. Rotating energy deflector 113 is rotatably mounted to housing 110 so as to rotate substantially within a plane that may preferably be oriented substantially perpendicularly to the y-z plane. Solidification energy source port 66 is provided for mounting solidification energy source 112 (e.g., a laser diode) such that it is in optical communication with at least one facet 116a-116f of rotating energy deflector 113 at one time. Lens 117 (described further below) is spaced apart and below from rotating energy deflector 113 in the height (z-axis) direction and is located above housing linear opening 114 in FIG. 7B but below linear opening 114 when installed in system 40, as indicated by FIGS. 1 and 4.

Motor 118 is mounted on a rear surface of housing 110 and is operatively connected to rotating energy deflector 113. Motor 118 is connected to a source of power (not shown). When motor 118 is energized, rotating energy deflector 113 rotates in the y-z plane, bringing the various facets 116a-116f sequentially into optical communication with solidification energy source 112. A control unit (not shown) may also be provided to selectively energize motor 118, solidification energy source 112 and/or motor 88. Either or both of motors 88 and 118 may be stepper or servo motors. In certain examples, either or both of the motors 118 and 88 are driven by continuous energy pulses. In the case of motor 118, in certain preferred embodiments, it is driven by continuous energy pulses such that the timing of each pulse corresponds to a fixed rotational position of a facet 116(*a*)-(*f*) of rotating energy deflector 113. As the motor is pulsed, each of the facets 116(*a*)-(*f*) will sequentially come into optical communication with solidification energy source 112, and the particular facet 116*a*-*f* that is in optical communication with solidification energy source 112 will have a fixed rotational position that corresponds to the timing of the pulse.

In certain implementations, the rotational position of rotating energy deflector 113 may repeatably correspond to the timing of each energy pulse of motor 118 without being known by the operator. The fixed association of the motor 118 energy pulse and the rotational position of the facets 116*a*-116*f* allows the motor pulse timing to be used to synchronize the transmission of a synchronization solidification energy signal from solidification energy source 112 so that a synchronization solidification energy signal is issued for each facet 116(*a*)-(*f*) at some defined rotational position while it is in optical communication with solidification energy source 112.

In certain implementations, it is desirable to provide a y-axis scanning speed (i.e., a speed at which solidification energy moves along the exposed surface of the solidifiable material) that is significantly greater than the travel (x) axis speed at which the linear solidification device 42 moves. Providing this disparity in y-axis and x-axis speeds helps to better ensure that the scanned energy pattern is linear and orthogonal to the travel (x) axis, thereby reducing the likelihood of object distortion. In certain examples, the scanning speed in the y-axis direction is at least about 1000 times, preferably at least about 2000 times, more preferably at least about 4000 times, still more preferably at least about 6000 times, and even more preferably at least about 8000 times the speed of movement of linear solidification device 42 along the travel (x) axis. In one example, linear solidification device 42 moves at a speed of about 1 inch/second along the travel (x) axis, and the y-axis scanning speed is about 10,000 inches/second. Increasing the scanning speed relative to the speed of movement of linear solidification device 42 along the travel axis increases the resolution of the scanning process by increasing the number of scan lines per unit of length along the travel (x) axis.

The scanning speed (in number of scans per unit time) at which solidification energy is progressively applied to selected areas of a solidifiable resin along the scanning (y) axis corresponds to the rotational speed of rotating energy deflector 113 multiplied by the number of facets 116*a*-*f*. In certain examples, the rotational speed is from about 1,000 to about 10,000 rpm, preferably from about 2,000 to about 8,000 rpm, and more In certain preferred examples, and as shown in FIG. 7B, lens 117 is provided between the rotating energy deflector 113 and a bottom surface of housing 110 to focus deflected solidification energy and transmit it through linear opening 114 and toward the solidifiable material. In the example of FIG. 7B, lens 117 is preferably a flat field lens. In certain examples, the lens 117 is a flat field lens that is transparent to violet and ultraviolet radiation. In additional examples, the lens 117 also has a focal distance that is longer on the ends of the lens relative to the middle (referring to the y-axis scanning direction along which the lens length is oriented) to compensate for different solidification energy beam travel distances from the rotating energy deflector 92 to the solidifiable material. In certain implementations, lens 117 includes an anti-reflective coating such that the coated lens transmits at least 90%, preferably at least 92%, and more preferably at least 95% of the incident light having a wavelength ranging from about 380 nm to about 420 nm. In one example, lens 98 transmits at least about 95% of the incident light having a wavelength of about 405 nm. Suitable coatings include single layer, magnesium difluoride ($MgF_2$) coatings, including ARSL0001 MgF2 coatings supplied by Siltint Industries of the United Kingdom.

In one preferred embodiment, solidification energy source 112 is a laser diode that emits light in the range of 380 nm-420 nm. A range of 390 nm-410 nm is preferred, and a range of from 400 nm to about 410 nm is more preferred. The laser power is preferably at least about 300 mW, more preferably at least about 400 mW, and even more preferably, at least about 450 mW. At the same time, the laser power is preferably no more than about 700 mW, more preferably no more than about 600 mW, and still more preferably no more than about 550 mW. In one example, a 500 mW, 405 nm blue-light laser is used. Suitable blue light laser diodes include 405 nm, 500 mW laser diodes supplied by Sanyo.

Rotating energy deflector 113 deflects solidification energy that is incident upon it toward flat field lens 117. Rotating energy deflector 113 preferably rotates in a rotation plane as linear solidification device 42 moves along the travel (x) axis. In certain examples, the rotation plane is substantially perpendicular to the travel axis (i.e., the rotation plane is the y-z plane). In certain examples, rotating energy deflector 113 rotates at a substantially constant rotational speed. In other examples, the linear solidification device 42 moves at a substantially constant speed along the travel (x) axis. In further examples, the rotating energy deflector 113 rotates at a substantially constant rotational speed and the linear solidification device 42 moves along the travel (x) axis at a substantially constant speed.

When solidification energy source 112 is a light source, rotating energy deflector 113 is preferably a rotating light deflector capable of deflecting visible or UV light. In one exemplary embodiment, rotating energy deflector 113 is a polygonal mirror having one or more facets 116*a*, *b*, *c*, etc. defined around its perimeter. In the example of FIG. 7B, rotating energy deflector 113 is a hexagonal mirror having facets 116*a* to 116*f*. Each facet 116*a*-116*f* has at least one rotational position, and preferably several, at which it will be in optical communication with solidification energy source 112 to receive light projected therefrom. As the rotating energy deflector 113 rotates, solidification energy (e.g., visible or ultraviolet light) will be deflected along the length of each facet 116*a*-*f* in succession. At any one time, one of the facets 116*a*-116*f* will receive and deflect solidification energy. As the facet changes its rotational position, the angle of incidence of the solidification energy with respect to the facet will change, altering the angle of deflection, and therefore, the scanning (y) axis location at which the deflected solidification energy strikes the solidification substrate 52 and the solidifiable material 50 above it (FIG. 1). Thus, each rotational position of rotating energy deflector 113 corresponds to a position along the scanning (y) axis at which solidification energy may be projected at a given time. However, for a given number of rotating energy deflector 113 facets F, there will be F rotational positions that each correspond to a particular position along the scanning axis direction. As will be discussed in greater detail below, one or more controllers or microcontrollers may be provided to regulate the movement of the build platform 44, solidification energy source 112, rotating energy deflector 113, and motor 88 that traverses the linear solidification device 42 across the solidifiable material.

In certain examples, the maximum length of scan along the scanning (y) axis will correspond to the full length of an individual facet 116a-116f. That is, as the light progressively impinges on the entire length of any one facet 116a-116f, the deflected light will correspondingly complete a full scan length in along the scanning (y) axis. The number of facets 116a, 116b, etc. on the rotating energy deflector 113 will correspond to the number of y-axis scans that are performed for one complete revolution of rotating energy deflector 113. In the case of a hexagonal mirror, six y-axis scans will occur for every complete rotation of rotating energy deflector 113. For rotating energy deflectors that maintain a constant rotational direction (e.g., clockwise or counterclockwise), the scans will be uni-directional along the y-axis. Put differently, as light transitions from one facet 116a to another 116b, the scan will return to its starting position in the y-axis, as opposed to scanning back in the opposite direction. However, other rotating energy deflector configurations may be used including those in which the rotating energy deflector 113 rotates in two rotational directions to produce a "back and forth" scan in the y-axis direction.

In the system 40 of FIGS. 1-5, linear solidification device 42 is positioned underneath rigid or semi-rigid solidification substrate 52 and moves in a first direction along the travel (x) axis to solidify solidifiable material 50 (FIG. 1). Lens 117 is located vertically (z-axis) above rotating energy deflector 113 and vertically (z-axis) below linear opening 114 (FIGS. 5a and 5b). As linear solidification device 42 translates along the travel (x) axis, solidification energy is selectively projected upward along the build (z) axis and progressively scanned in the scanning (y) axis direction to selectively solidify certain locations along a generally—and preferably substantially—linear scanning path (as dictated by the shape of the three-dimensional object at a given travel (x) axis position). Whether a given y-axis location on the solidifiable material will receive solidification energy depends on whether solidification energy is being supplied by the solidification energy source 112 as the facet 116a-116f that is in optical communication with solidification energy light source reaches the rotational position corresponding to that y-axis location.

Referring to FIG. 7C, and alternate embodiment of linear solidification device 42 of FIGS. 7A and B is depicted. In FIG. 7C, housing 110 is removed. As shown in the figure, solidification energy source 112 is in optical communication with one facet 116(a)-(f) of rotating energy deflector 113 at any one time as rotating energy deflector 113 rotates in the y-z plane (i.e., the plane orthogonal to the direction of movement of linear solidification device 42 along the travel (x) axis). In this embodiment, one or more solidification energy focusing devices is provided between solidification energy source 112 and rotating energy deflector 113. In the example of FIG. 7C, the one or more focusing devices comprises a collimator 137 and a cylindrical lens 120.

Collimator 137 is provided between solidification energy source 112 and cylindrical lens 120. Cylindrical lens 120 is provided between collimator 137 and rotating energy deflector 113. Collimator 137 is also a focusing lens and creates a round shaped beam. Cylindrical lens 120 stretches the round-shaped beam into a more linear form to allow the beam to decrease the area of impact against rotating energy deflector 113 and more precisely fit the beam within the dimensions of one particular facet 116(a)-(f). Thus, solidification energy transmitted from solidification energy source 112 passes through collimator 137 first and cylindrical lens 120 second before reaching a particular facet 116(a)-(f) of rotating energy deflector 113.

In certain preferred examples, collimator 137 and/or cylindrical lens 120 transmit at least 90%, preferably at least 92%, and more preferably at least 95% of the incident light having a wavelength ranging from about 380 nm to about 420 nm. In one example, collimator 137 and cylindrical lens 120 transmit at least about 95% of the incident light having a wavelength of about 405 nm. In the same or other examples, solidification energy source 112 comprises a laser diode having a beam divergence of at least about five (5) milliradians, more preferably at least about six (6) milliradians, and sill more preferably at least about 6.5 milliradians. At the same time or in other examples, the beam divergence is no more than about nine (9) milliradians, preferably no more than about eight (8) milliradians, and still more preferably not more than about 7.5 milliradians. In one example, the divergence is about 7 milliradians. Collimator 137 is preferably configured with a focal length sufficient to collimate light having the foregoing beam divergence values. Collimator 137 is preferably configured to receive incident laser light having a "butterfly" shape and convert it into a round beam for transmission to cylindrical lens 120.

In certain examples, collimator 137 has an effective focal length that ranges from about 4.0 mm to about 4.1 mm, preferably from about 4.0 mm to about 4.5 mm, and more preferably from about 4.01 mm to about 4.03 mm. In one example, collimator 137 is a molded glass aspheric collimator lens having an effective focal length of about 4.02 mm. One such collimator 137 is a Geltech™ anti-reflective coated, molded glass aspheric collimator lens supplied as part number 671TME-405 by Thorlabs, Inc. of Newton, N.J. This collimator is formed from ECO-550 glass, has an effective focal length of 4.02 mm, and has a numerical aperture of 0.60.

In certain examples, collimator 137 and/or cylindrical lens 120 are optimized based on the specific wavelength and beam divergence characteristics of solidification energy source 112. In one example, collimator 137 and/or cylindrical lens 120 are formed from a borosilicate glass such as BK-7 optical glass. In certain preferred examples, collimator 137 and/or cylindrical lens 120 are coated with an anti-reflective coating such that the coated collimator 137 and coated cylindrical lens 120 transmit at least 90%, preferably at least 92%, and more preferably at least 95% of the incident light having a wavelength ranging from about 380 nm to about 420 nm. Suitable anti-reflective coatings include magnesium difluoride (MgF2) coatings such as the ARSL0001 MgF2 coating supplied by Siltint Industries of the United Kingdom.

Figure 7D:
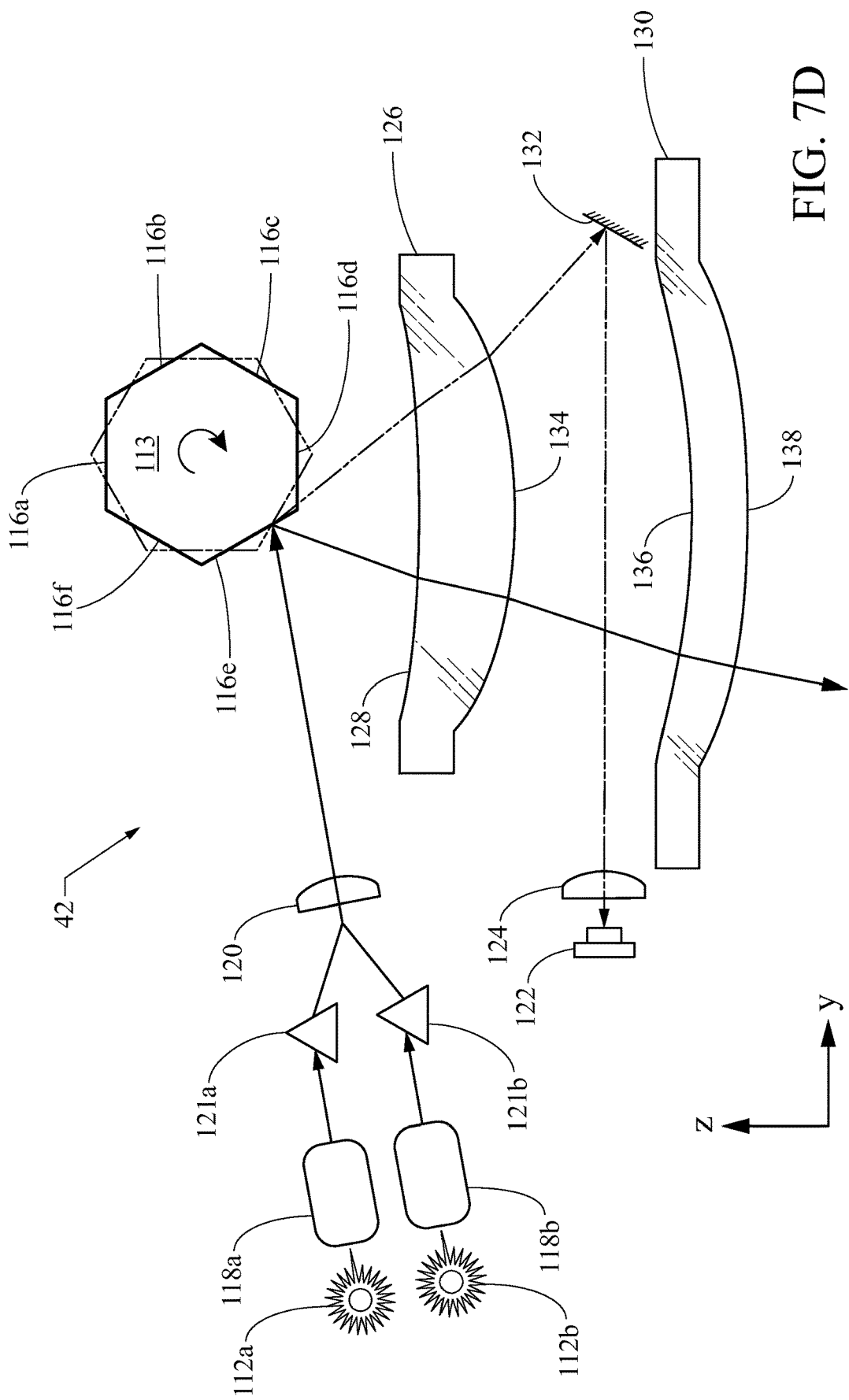
FIG. 7D is a schematic view of a second alternate version of the linear solidification device of FIG. 7A in which the housing is removed and which includes dual solidification energy sources and a solidification energy sensor.

In certain examples of a linear solidification device 42, the solidification energy defines a spot (which may or may not be circular) at the point of impingement on the solidifiable material. The angle of incidence between the solidification energy and the solidifiable material will vary with the rotational position of a given facet 116(a)-(f) relative to the solidification energy source 112. The spot dimensions and shape will also tend to vary with the angle of incidence. In some cases, this variation in spot size and/or spot dimensions can produce uneven solidification patterns and degrade the accuracy of the object building process. Thus, in certain examples, one or more lenses are provided between rotating energy deflector 113 and the solidifiable material 50 (FIG. 1) to increase the uniformity of the spot size and/or dimensions as the rotational position of rotating energy deflector 113 changes. In certain examples, the one or more lenses is a flat field lens 117 (FIGS. 7A and 7B). In other examples (FIG. 7C), the one or more lenses is an F-Theta lens (126 or 130 in FIG. 7C). In other examples, and as also shown in FIG. 7C, the one or more lenses is a pair of F-Theta lenses 126 and 130. The F-Theta lenses 126 and 130 are spaced apart from one another and from the rotating energy deflector 113 along the build (z) axis. First F-Theta lens 126 is positioned between second F-Theta lens 130 and rotating energy deflector 113 along the build (z) axis. Second F-Theta lens 130 is positioned between first F-Theta lens 126 and the solidifiable material 50 (as well as between first F-Theta lens 126 and linear 114, not shown in FIGS. 7C-D) along the build (z) axis.

First F-Theta lens 126 includes an incident face 128 and a transmissive face 134. Incident face 128 receives deflected solidification energy from rotating energy deflector 113. Transmissive face 134 transmits solidification energy from first F-Theta lens 126 to second F-Theta lens 130. Similarly, second F-Theta lens 130 includes incident face 136 and transmissive face 138. Incident face 136 receives solidification energy transmitted from transmissive face 134 of first F-Theta lens 126, and transmissive face 138 transmits solidification energy from second F-Theta lens 130 to housing linear opening 114 (not shown in FIGS. 7C-7D) and to the solidifiable material 50.

In certain implementations of the linear solidification device 42 of FIG. 7C, first F-Theta lens 126 has a refractive index that is less than that of second F-Theta lens 130. The relative difference in refractive indices helps reduce laser beam scattering losses. At the same time or in other implementations, the radius of curvature of first F-Theta lens transmissive face 134 is less than the radius of curvature of second F-Theta lens transmissive face 138. Suitable pairs of F-Theta lenses are commercially available and include F-Theta lenses supplied by Konica Minolta and HP. In certain embodiments, the F-Theta lenses 126 and 130 are preferably coated with an anti-reflective coating. The anti-reflective coating is used to maximize the amount of selected wavelengths of solidification energy that are transmitted through F-Theta lenses 126 and 130. In one example, the anti-reflective coating allows the coated F-Theta lenses 126 and 130 to transmit greater than 90 percent of the incident solidification energy having a wavelength between about 325 nm and 420 nm, preferably greater than 90 percent of the incident solidification energy having a wavelength between about 380 nm and about 420 nm, more preferably greater than about 92 percent of the incident solidification energy having a wavelength between about 380 nm and about 420 nm, and still more preferably greater than 95 percent of the incident solidification energy having a wavelength between about 380 nm and about 420 nm. In one specific example, the coated F-theta lenses transmit at least about 95% of the incident light having a wavelength of about 405 nm (i.e., blue laser light). In other preferred embodiments, collimator 137, and cylindrical lens 120 are also coated with the same anti-reflective coating. Suitable anti-reflective coatings include magnesium difluoride (MgF2) coatings such as the ARSL001 coating supplied by Siltint Industries of the United Kingdom.

In certain examples, linear solidification device 42 may comprise multiple solidification energy sources. In some implementations, the linear solidification device 42 may include multiple solidification energy sources that provide solidification energy of the same wavelength, and the device 42 may transmit a single beam of solidification energy to the solidifiable material. In other implementations, the device 42 may include solidification energy sources of different wavelengths and selectively transmit solidification energy of only one of the wavelengths to a solidifiable material. This implementation may be particularly useful when a three-dimensional object is built using multiple solidifiable materials each of which solidifies in response to solidification energy of different wavelengths (e.g., because their photoinitiators are activated by different wavelengths of solidification energy).

Referring to FIG. 7D, an alternate version of linear solidification device 42 (with the housing removed) is depicted in schematic form. The linear solidification device 42 is the same as the one depicted in FIG. 7C with two exceptions. First, the linear solidification device 42 of FIG. 7D includes two solidification energy sources 112*a* and 112*b*. In the specific embodiment of FIG. 7D, solidification energy sources 112*a* and 112*b* transmit solidification energy of substantially the same wavelength. In some cases, the use of such multiple solidification energy sources 112*a*, 112*b* is desirable in order to increase the power of the solidification energy transmitted to the solidifiable material. The power of the solidification energy can affect the rate of solidification, which in turn may limit the maximum speed of travel of the linear solidification device 42 in the x-axis direction. In order to solidify, for example, a given volume of a solidifiable resin, the volume must receive sufficient solidification energy (e.g., in Joules). The solidification energy received by a given volume of solidifiable material is a function of the power (e.g., in Watts) of the solidification energy and the time of exposure of the volume of solidifiable material. As a result, as the power is reduced, the rate of travel of the linear solidification energy device 42 must be reduced to ensure that sufficient solidification energy is received at each location along the direction of travel (i.e., x-axis) of linear solidification energy device 42. Put differently, at a desired solidification depth along the build axis (z-axis), increasing the power of the solidification energy increases the rate at which the linear solidification device 42 can be traversed in the x-axis direction, and hence, the speed of an object build process.

The second difference between the linear solidification energy devices 42 of FIGS. 7C and 7D is the inclusion of prisms 121*a* and 121*b* in FIG. 7D. The linear solidification energy device 42 of FIG. 7D is intended to combine solidification energy from both sources 112*a* and 112*b* into a single beam for delivery to the solidifiable material. The single beam preferably has a power that is at least 1.5 times, preferably at least 1.7 times, and more preferably at least 1.95 times the average power of the individual solidification energy sources 112*a* and 112*b*. Each solidification energy source 112*a* and 112*b* transmits its respective solidification energy to a respective prism 121*a* and 121*b*. The prisms 121*a* and 121*b* receive incident solidification energy at a first angle and deflect the energy to produce transmitted solidification energy beams at a second (different) angle that allows the individual beams to be combined in a single beam. It is believed that the individual beams combine ahead of cylindrical lens 120, after which the solidification energy is received by rotating energy deflector 113 and ultimately transmitted to the solidifiable material in the same manner described previously with respect to FIG. 7C.

As mentioned previously, the linear solidification device 42 of FIGS. 7C and 7D also includes a solidification energy sensor 122, which may be an optical sensor. Suitable optical sensors include photodiodes. One exemplary photodiode that may be used is a 404 nm, 500 mW photodiode supplied by Opnext under the part number HL40023MG.

Solidification energy sensor 122 generates a signal upon receipt of solidification energy. Mirror 132 is provided and is in optical communication with rotating energy deflector 113 such that when each facet 116*a-f* of rotating energy deflector 113 receives solidification energy from solidification energy source 112 while at a particular rotational position (or range of positions) in the y-z plane, the energy will be deflected toward mirror 132 (as shown by the dashed lines in FIG. 7C). Similarly, when the scanning device used in linear solidification device 42 is a linear scanning micromirror, a particular tilt angle or range of tilt angles will cause received solidification energy to be deflected toward mirror 132. The solidification energy then reflects off of mirror 132 along a path that is substantially parallel to the scanning axis (y-axis) between first F-Theta lens 126 and second F-Theta lens 130 to sensor 122. Sensor 122 may be operatively connected to a computer to which it will transmit the signal generated upon receipt of solidification energy. The signal may be stored as data and/or used in programs associated with a solidification energy source controller (not shown). An example of a line scanning synchronization method that makes use of the generated sensor signal is described below.

In certain examples, sensor 122 is used to determine the beginning of a line scanning operation along the scanning axis (y-axis) direction. However, in certain cases using the solidification energy sources described herein, the intensity of the solidification energy transmitted by solidification energy source 112 may be higher than desired, thereby reducing the sensitivity of sensor 122 due, at least in part, to the presence of scattered and ambient light. As a result, in some implementations a filter 124 is provided between sensor 122 and mirror 132 along the path of travel of solidification energy from mirror 132 to sensor 122. Filter 124 preferably reduces the intensity of electromagnetic radiation received by sensor 122 without appreciably altering its wavelength(s). Thus, in one example filter 124 is a neutral density filter. One such suitable neutral density filter is a 16× neutral density filter supplied by Samy's Camera of Los Angeles, Calif. under the part number HDVND58. In certain implementations, sensor 122 is used to synchronize a timer that serves as a reference for linear scanning operations. In such cases, the exposure of sensor 122 to scattered or ambient light may cause synchronization errors. Thus, filter 124 is preferably configured to ensure that only direct solidification energy from solidification energy source 112 is received by sensor 122.

Referring again to FIG. 1, container 48 is configured to retain a volume of solidifiable material in its interior and to receive solidification energy through its bottom surface. Solidifiable material is periodically dispensed into container 48 as the level of solidifiable material drops due to the solidification of the solidifiable material into the three-dimensional object. In one example, container 48 comprises a basin with silicone side walls and a bottom comprising solidification substrate 52 and a protective film 55 adhered thereto. In one example, the film 55 is a monofluoroalkoxy (MFA) film. In another example, a basin comprising a transparent resilient bottom and resilient side walls is used as container 48. In certain implementations, both the transparent resilient bottom and the resilient side walls are formed from the same or different silicone polymers. In other implementations, the bottom of silicone basin is adhered to a solidification substrate such as a rigid or semi-rigid glass or plastic that is transparent and/or translucent. In another implementation, a basin comprising non-resilient acrylic side walls and a resilient silicone bottom is used. In another example, the bottom of the basin is defined by a rigid or semi-rigid transparent solidification substrate 52 that is connected to side walls formed of a resilient or plastically deformable polymeric material. In a further example, the substrate 52 may be coated with a resilient transparent material, such as a silicone, that extends only a portion of the way to the side walls, leaving a peripheral gap around the coating and between the coating and the sidewalls. In yet another example, the substrate 52 may be coated with a resilient transparent material that extends all the way to the side walls. A non-resilient material such as a transparent non-resilient film may also be provided as a layer on top of the resilient bottom between the resilient bottom and the build platform 44.

Figure 8A:
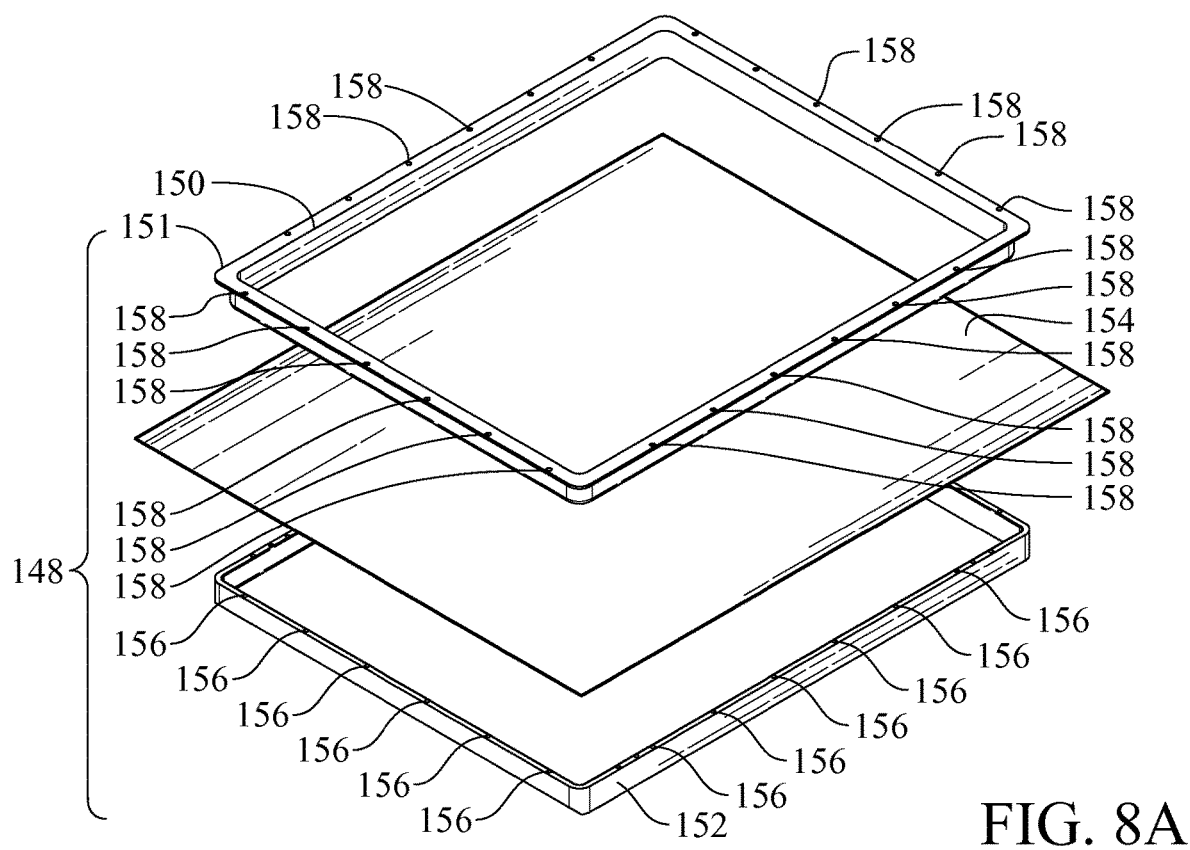
FIG. 8A is an exploded perspective view of a film assembly that can be used as a solidifiable material container in the system of FIG. 2.
Figure 8B:
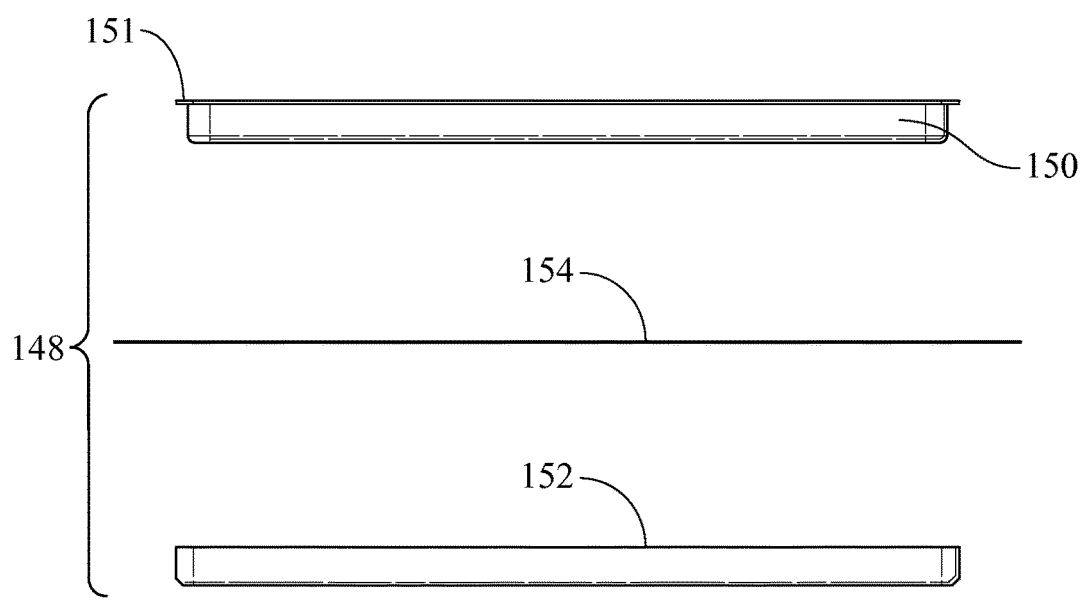
FIG. 8B is a side elevational view of the film assembly of FIG. 8A.
Figure 8C:
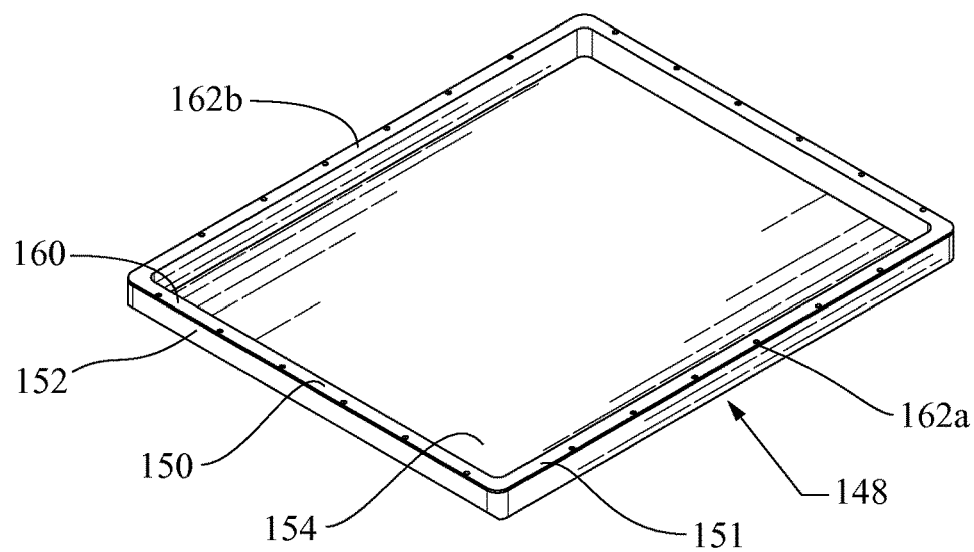
FIG. 8C is a perspective view of the film assembly of FIG. 8A in an assembled configuration.

In a further example, solidifiable material container 48 may comprise a film assembly 148 disposed above solidification substrate 52. As best seen in FIGS. 8A-C, film assembly 148 comprises a film 154 and one or more frames, which in the embodiment of FIGS. 8A-8C includes an inner frame 150 and an outer frame 152. As best seen in FIGS. 8A-C, in one example, outer frame 152 of film assembly 148 is a generally rigid and rectangular structure shaped to cooperatively engage inner frame 150. Inner frame 150 is a generally rigid and rectangular structure which includes an upper lip 151 that projects outwardly around the perimeter of inner frame 150. Outer frame 152 fits underneath upper lip 151. In certain examples, the outer edge of lip 151 and the outer perimeter of outer frame 152 are substantially flush with one another and define a substantially continuous outer surface. Film 154 is preferably secured between the inner frame 150 and outer frame 152. In one example, the outer periphery of film 154 is secured between the underside of the inner frame lip 151 and the upper surface of outer frame 152.

In addition, through-holes 158 (FIG. 8A) formed on the upper surface of inner frame upper lip 151 are alignable with complementary holes 156 (FIG. 8A) formed on the upper surface of outer frame 152, allowing fasteners such as screws, bolts, etc. to secure outer frame 152 to inner frame 150. Thus, in certain examples, the fasteners are selected to minimize the amount of leakage in the area between inner frame lip 151 and the upper most surface of outer frame 152. In other examples, portions of the inner frame area may be filled with a suitable resin blocking agent such as a cured resin. Suitable cured resins include silicones and epoxies.

Together, film 154, outer frame 152, and inner frame 150 define a film assembly 148 that is securable to the upper surface 51 of housing 54 (FIG. 1) and which is mounted on solidification substrate 52. In certain embodiments, it is contemplated that film assembly 148 will be replaced periodically due to the stress on film 154. Thus, film assembly 148 is preferably releasably secured to housing 54 to facilitate replacement of film assembly 148. In such implementations, film 154 is not adhered to solidification substrate 52, but rather, is tightly stretched across it to enable the film 154 to stretch in the build (z) axis direction relative to solidification substrate 52. However, in other implementations, the film 154 may be adhered to the solidification substrate 52.

In certain embodiments, film 154 is configured to provide a relieved area that reduces or minimizes the likelihood of vacuum formation between film 154 and rigid or semi-rigid solidification substrate 52. In such embodiments, a portion of film 154 includes a relieved area (not shown) defined by mircotextures or grooves in its lower surface (i.e., the surface facing rigid or semi-rigid solidification substrate 52 along the build (z) axis). The relieved area lies above rigid or semi-rigid solidification substrate 52 while also extending beyond the perimeter of rigid or semi-rigid solidification substrate 52. In certain examples, film assembly 148 has a width in the scanning (y) axis direction which is longer than the width (in the scanning axis direction) of rigid or semi-rigid solidification substrate 52. The variation in width creates a gap between the edge of rigid or semi-rigid solidification substrate 52 and the inner surface of inner frame 150, creating a leak path from the atmosphere to the portion of the relieved area of film 154 lying above and in facing opposition to rigid or semi-rigid solidification substrate 52, thereby minimizing the likelihood of vacuum formation between film 154 and rigid or semi-rigid solidification substrate 52.

Film 154 is preferably a homopolymer or copolymer formed from ethylenically unsaturated, halogenated monomers. Fluoropolymers are preferred. Examples of suitable materials for protective film 154 include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Examples of suitable film 154 materials include PVDF films sold under the Kynar® name by Arkema, ECTFE films sold under the Halar® name by SolvaySolexis, ETFE films sold under the Tefzel® name by DuPont, PFA films sold under the Teflon®-PFA name by DuPont, and MFA films sold under the name Nowofol. MFA and Teflon® films are preferred.

Figure 11A:
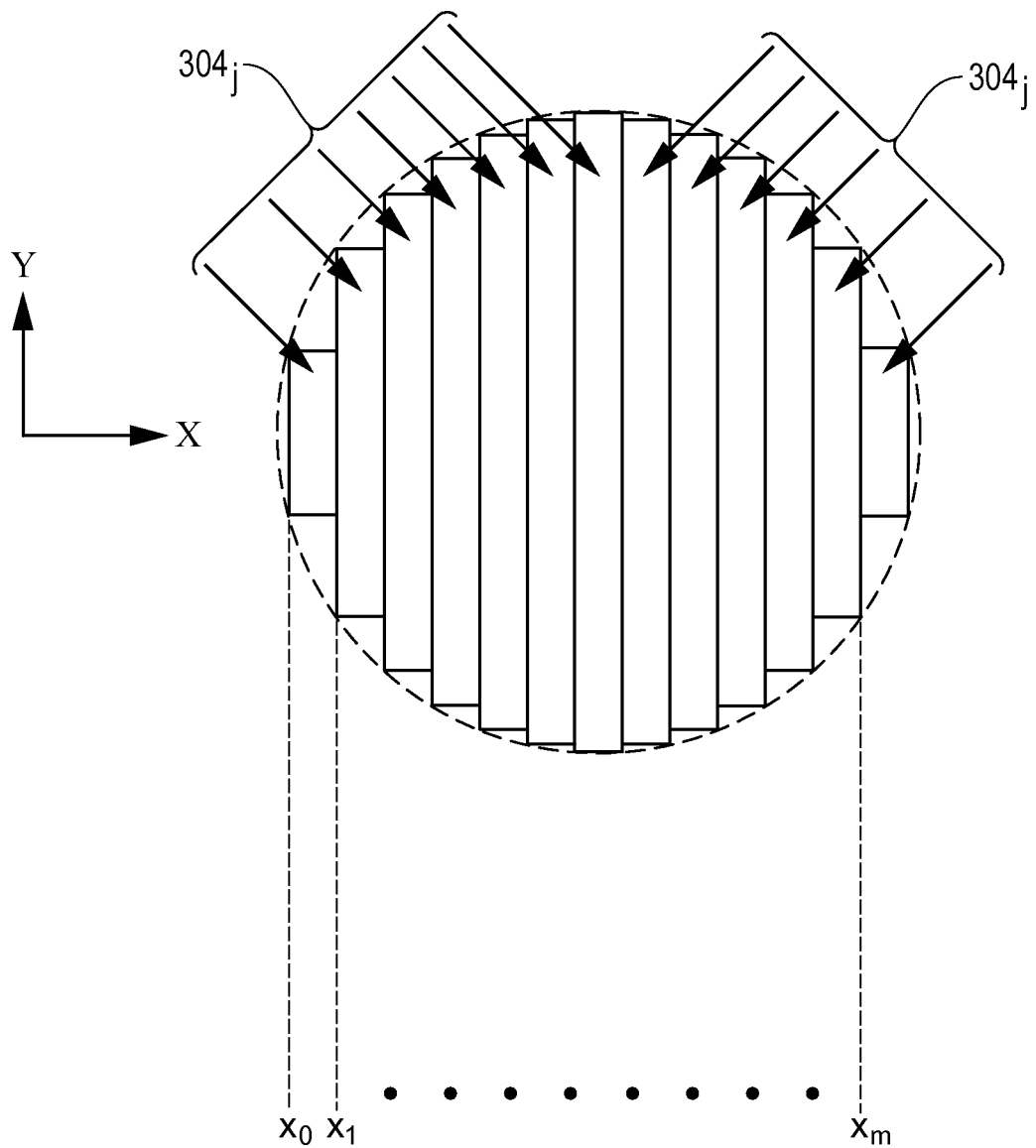
FIG. 11A is a graphical representation of object cross-section strip data corresponding to one of the slices of a three-dimensional object shown in FIG. 10.

In certain implementations, a portion of the solidifiable material within the area defined by the travel (x) and scanning (y) axes will be capable of receiving solidification energy from linear solidification device 42. This portion may be defined as the "build envelope." FIGS. 11B and 11C depict a top plan view of a region of solidifiable material 50 which includes a build envelope 342. The build envelope 342 defines the maximum area of solidification, and therefore, the maximum three-dimensional object area in the x-y plane (i.e., the travel axis/scanning axis plane). As shown in FIGS. 11B and 11C, in certain cases the linear solidification device 42 is movable along the travel (x) axis through a total distance that equals the sum of a build envelope 342 length L and two offset distances, $\delta_L$ and $\delta_R$. The offset distances $\delta_L$ and $\delta_R$ respectively represent the distance from the left end-of-travel (EOT) position of linear solidification device 42 to the left-hand side build envelope boundary 343 and the distance from the right-hand side EOT position to the right-hand side build envelope boundary 345. In certain examples, the offset distances, $\delta_L$ and $\delta_R$ are provided to ensure that the linear solidification device 42 has time to achieve a substantially constant speed along the travel (x) axis before any solidification of solidifiable material will begin (i.e., before build envelope 342 is reached). In certain examples, the movement of the linear solidification device 42 at a constant travel (x) axis speed avoids the necessity of directly measuring the travel axis position at any given moment because it allows a motor movement parameter for linear solidification device motor 88 (FIG. 5) to provide an indirect indication of travel axis position. In one particular example suitable for servo and stepper motors, the motor movement parameter is a number of motor steps. In certain examples, $\delta_L$ and $\delta_R$ are equal.

In accordance with one method of using the system 40 of FIGS. 1-5, linear solidification device 42 is traversed in a first direction along the travel (x) axis by virtue of its operative connection to linear solidification device translation motor 88 (FIG. 5). Solidification energy may be is selectively projected from the linear solidification device 42 though the solidification substrate 52 once the linear solidification device 42 reaches the edge 343 of the build envelope 342 and until linear solidification device 42 reaches edge 345 of the build envelope 342. In certain preferred examples herein, solidification of the solidifiable material only occurs while the linear solidification device 42 is moving in one direction along the travel (x) axis, and separation of the solidified material from the film 55 and solidification substrate 52 occurs when the linear solidification device 42 moves in the opposite direction along the travel (x) axis.

In certain examples, as rotating energy deflector 113 rotates (FIG. 7B), solidification energy source 112 will selectively project light in accordance with data that represents the object being built. At a given location along the travel (x) axis, some scanning (y) axis locations may be solidified and others may not, depending on the shape of the object being built. One way of selectively projecting light to the solidifiable material is to selectively activate the solidification energy source 112 depending on the travel (x) axis location of the linear solidification device 42 and the rotational position of the facet 116a-f that is in optical communication with the solidification energy source 112. While each facet 116a-116f will have a full range of locations along its length at which solidification energy may be received from solidification energy source 112, it will not necessarily be the case that each such facet location will receive solidification energy during any individual scan performed by that facet. Thus, by (directly or indirectly) coordinating the activation of solidification energy source with the rotational position of a given facet 116a-116f, solidification energy can be selectively provided to only those locations along the y-axis where solidification is desired.

The number of linear scans that can be performed within a given linear distance along the travel (x) axis may depend on several variables, including the rotational speed of rotating energy deflector 113, the number of facets F on the rotating energy deflector 113, and the speed of movement of the linear solidification device 42 along the travel (x) axis direction. In general, as the speed of movement of the linear solidification device 42 increases along the travel (x) axis, the number of linear scans per unit of travel axis length decreases. However, as the number of facets on the rotating energy deflector 113 increases or as the rotational speed of the rotating energy deflector 113 increases, the number of linear scans per unit of travel axis length increases. Thus, for a given build envelope distance L along the travel axis in units such as millimeters, the maximum number of line scanning operations that can be performed may be calculated as follows:

$$N_{max} = (L/S)*(RPM/60)*F \qquad (9)$$

where, $N_{max}$=maximum number of line scanning operations along the travel (x) axis within the build envelope;
L=desired length of the build envelope along the travel (x) axis (mm);
S=speed of movement of linear solidification device 42 along the travel axis (mm/sec);
RPM=rotational frequency of rotating energy deflector 113 (revolutions/minute); and
F=number of facets on the rotating energy deflector 113.

Each linear scan can then be assigned a linear scan index n (which can also be called a string index when sets of data strings are used as object layer data) ranging from a value of 0 to $N_{max}-1$. Equation (9) can also be used to calculate an actual number of line scanning operations needed for a given part length along the travel (x) axis. In that case, L would be the desired length of the part along the travel (x) axis and $N_{max}$ would be replaced by N, which would represent the total number of line scanning operations used to form the part.

When the linear solidification device 42 is moving at a constant speed S along the travel (x) axis, a motor movement parameter such as a number of motor steps for linear solidification device translation motor 88 may be correlated to the build envelope length L and used to define a variable W which equals a number of motor steps/L. A microcontroller unit associated with system 40 can then use the number of motor steps to indirectly determine the number of a linear scan (or string index as described further herein) position of the linear solidification device within the build envelope in accordance with the following equation:

$$\text{scan index } n = ((\text{number of steps from boundary})/(W)(S))*(\text{RPM}/60)*F \quad (10)$$

In equation (10), the number of steps from the boundary refers to the number of motor steps counted starting at build envelope boundary 343 and moving from left to right or starting at build envelope boundary 345 and moving from right to left. A particular three-dimensional object layer having a length along the travel (x) axis may be formed by a number of linear scans performed within build envelope 342.

In certain examples, a host computer associated with system 40 will assign scan index numbers or string data index numbers by scaling the part to the build envelope size and assigning a scan index number n based on the total number of possible scans $N_{max}$ in the build envelope 342. The scan index numbers n will then be correlated to a number of motor steps as set forth in equation (10). This relationship depends, in part, on the accuracy of the value W which is the ratio of the number of steps required for the linear solidification device 42 to traverse the build envelope length L along the travel (x) axis (FIG. 11B) divided by L. In some cases, W may deviate from the value predicted by geometry of the mechanical devices used to move the linear solidification device 42 (i.e., the value predicted by the gear ratio for motor 76, the rotational speed of motor 76, and the pulley diameter of pulleys 82*a* and 82*b*). In that case, it may be desirable to adjust the value of W. In certain examples, test parts are built and measured to determine the extent to which the actual value of W is offset from the predicted value, and the offset is used to provide a corrected value of W.

As indicated previously, the systems for making a three-dimensional object described herein may include a control unit, such as a microcontrol unit or microcontroller, which contains locally stored and executed programs for activating the motor 88 for translating linear solidification device 42 along the travel (x) axis, the motor 80 for translating build platform 44 along the travel (x) axis, the motor 86 for rotating build platform 44 about axis of rotation $R_x$, and the motor 125 (FIG. 4) for translating build platform 44 along the build (z) axis, as well as for selectively activating solidification energy source 112. In certain examples, the systems include a host computer that processes three-dimensional object data into a format recognized by the microcontroller unit and then transmits the data to the microcontroller for use by the microcontroller unit's locally stored and executed programs. As used herein, the term "microcontroller" refers to a high-performance, programmable computer memory system used for special tasks. In certain examples, the microcontrollers described herein include an integrated circuit chip having a microprocessor, a read only memory (ROM), interfaces for peripheral devices, timers, analog to digital and digital to analog converters, and possibly other functional units.

In certain examples, a linear solidification controller (not shown) selectively activates and deactivates solidification energy source 112 of linear solidification device 42, at least in part, based on the position of linear solidification device 42 along the travel (x) axis. The position along the travel (x) axis may be directly detected or may be indirectly determined by other variables (e.g., a number of motor steps). In one implementation discussed further below, an end of travel sensor 346 (FIGS. 11B and C) is used along with a motor movement parameter to indirectly determine the travel (x) axis position.

In one implementation, the linear solidification controller is a microcontroller or solidification energy source controller (not shown) which is operatively connected to solidification energy source 112 to change the energization state of solidification energy source 112 by selectively activating and deactivating it. In additional examples, the controller selectively activates the solidification energy source 112, at least in part, based on shape information about the three-dimensional object being built. In further examples, the controller selectively activates the solidification energy source 112 based on the position of linear solidification device 42 along the travel (x) axis (or based on another variable that correlates to the position such as a number of motor steps for motor 88) and based on shape information about the object being built which varies with the travel (x) axis position. On a given exposed surface of solidifiable material, the specific x, y locations that will receive the solidification energy will be dependent on the y-axis profile of the object being built at the given x-axis location of solidification energy source 112 and rotating energy deflector 113.

In certain examples, the shape information about the object being built is provided as three-dimensional object shape information which mathematically defines the shape of the object in three-dimensional space. The three-dimensional object data is then sliced or subdivided into object layer data preferably along a dimension that corresponds to a build (z) axis along which the build platform 44 moves relative to the solidifiable material container 48. The object layer data may comprise information that mathematically defines the shape of the object in a plane orthogonal to the build axis (i.e., the x-y plane). Thus, in one example wherein the build axis is referred to as the z-axis, each set of object data layer may comprise x and y coordinates that define the shape of the object cross-section at a given z-axis position. Exemplary methods of providing and using object data to drive the solidification process are described further below.

Referring again to FIGS. 7C-D and 11B, in certain implementations, linear solidification device 42 is positioned within the build envelope 342 such that mirror 132 is located immediately proximate scanning-axis build envelope boundary 344. In such implementations, the receipt of solidification energy by sensor 122 (FIGS. 7C-D) indicates that a line scanning operation may begin immediately thereafter because if the solidification energy source 112 remains activated and if rotating energy deflector 113 continues to rotate, solidification energy will be transmitted to the solidifiable material at the scanning axis build envelope boundary 344 immediately after it is transmitted to mirror 132. Therefore, sensor 122 can be used to indicate the beginning of a line scanning operation for each facet 116(*a*)-116(*f*). As mentioned previously, when solidification energy source 112 remains activated while rotating energy deflector 113 completes a single revolution, a number of linear scanning operations will be completed along the scanning (y) axis which equals the number of the rotating energy deflector's 113 facets 116(*a*)-(*f*).

In those cases where sensor 122 is used to indicate the beginning of a line scanning operation, it is useful to briefly activate solidification energy source 112 at a specific moment at which the transmitted solidification energy will be received by mirror 132. The brief activation of solidification energy source 112 may be coordinated or synchronized with an actuating signal sent to the scanning device used in linear solidification device 114. For example and as mentioned previously, in certain cases motor 118 is energized by a constant frequency pulse, the timing of which corresponds to a fixed rotational position for the particular facet 116(a)-(f) that is in optical communication with solidification energy source 112. Therefore, through a process of trial and error a lag time may be determined between the leading or trailing edge of the motor pulses and the receipt of solidification energy by sensor 122. More specifically, the source of solidification energy 112 can be selectively activated at a number of times relative to the leading or trailing edge of the pulse to determine which lag time results in the generation of a solidification energy sensor signal by sensor 122. In one preferred embodiment, the solidification energy source 112 is activated at or within a specified time following the trailing edge of the energy pulse used to drive motor 118.

In certain cases, the sensor 122 may be unnecessary because a specified lag time relative to the energization pulses that drive motor 118 will reliably indicate when a line scanning operation is about to begin (assuming solidification energy source 112 remains activated). However, in some examples, the pulses cannot be used to reliably indicate when a line scanning operation is about to begin within the desired degree of precision. For example, the facets 116(a) to 116(f) of rotating energy deflector 113 may not be perfectly or consistently planar. In that case, the scanning (y) axis position of solidification energy may not correlate well with the rotational position of rotating energy deflector 113. In addition, heat generated by solidification energy source 112 can cause slight variations in the path of the solidification energy toward the solidifiable material and the angle of incidence at which it strikes the solidifiable material. Thus, sensor 122 assists in better determining the time at which a line scanning operation may begin (or is about to begin if the solidification energy source 112 remains activated). This is particularly helpful when object data is stored as time values because the time values can be reliably correlated to specific positions along the scanning axis direction relative to the scanning axis boundary 344 of build envelope 342 (FIG. 11B). In certain examples, a timer is set to zero when sensor 122 generates a synchronization signal, and the object data is specified as time values at which the energization state of solidification energy source 112 is changed relative to the zero time value.

In accordance with certain implementations of the three-dimensional object manufacturing processes and apparatuses described herein, a method of representing object data for use in controlling the action of linear solidification device 42 is illustrated in FIGS. 9-11D. Typical file types used to generate object data include STL (Stereo Lithography) files or other CAD (Computer Aided Drafting) files commonly translated for rapid prototyping systems into formats such as SLC, CLI slice data files or voxelized data files which may include data formats such as BMP, PNG, etc. However, any data input type may be used and converted internally to create the image data used by the linear solidification device 42. The object data corresponds to the energy pattern supplied by linear solidification device 42 and may be generated by a control unit or by an external source or device (e.g., a network or storage device).

Figures 9, 10:
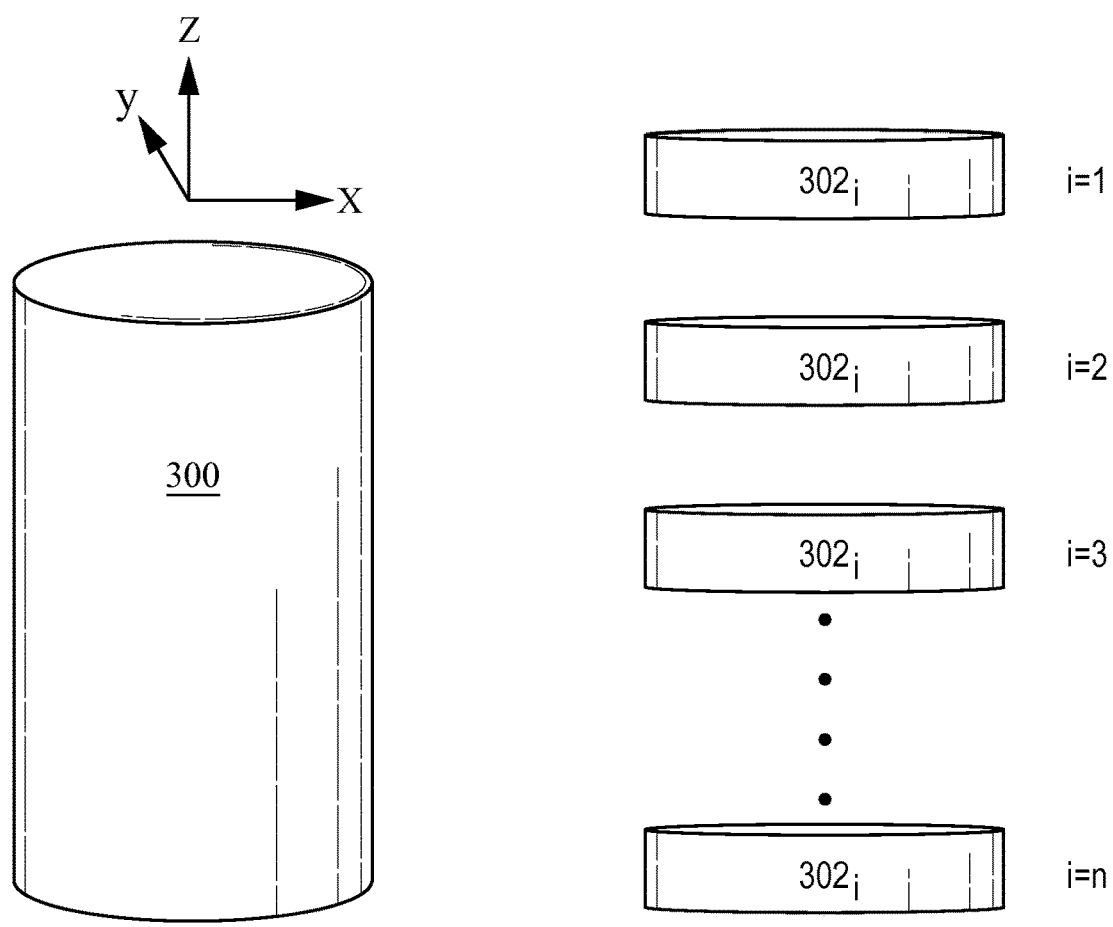
FIG. 9 is a graphical depiction of three-dimensional object data for use in illustrating a method of making a three-dimensional object using a linear solidification device.
FIG. 10 is a graphical representation of sliced data representative of the three-dimensional object of FIG. 9.

As an exemplary three-dimensional object, a simple cylinder 300 is shown in FIG. 9. Locations on or within the cylinder can be characterized by x, y, and z-axes as shown.

In certain linear solidification device implementations, the intensity and duration of solidification energy supplied at a particular x, y location cannot be varied. As a result, those locations in the x, y plane which receive solidification energy will solidify to substantially the same depth. Particularly in such implementations, it can be useful to perform a data "slicing" operation in which a computer representation of the three-dimensional object is sliced to create a plurality of sections in the build axis (z-axis) direction, each representing a uniform depth across at all points across the x-y plane. Each such section may mathematically correspond to or be represented by an object layer data set. One exemplary illustration of such slices is graphically depicted in FIG. 10. As shown in FIG. 10, a data representation of the object 300 can be further represented as a plurality of build axis (z-axis) slices 301, wherein the total number of slices n is substantially equal to the height of the object as built divided by the depth of solidification provided by linear solidification device 42. The slices 301 may be represented mathematically by object layer data sets in which each layer is defined by x, y coordinates representing its contours and a z-axis value representing its location along the build axis, with $\Delta z$ values between adjacent slices representing the thickness of the layer.

Each object layer data set may be represented graphically as a plurality of strips having a length along the scanning axis (y-axis) direction and a width along the x-axis direction, with the strips being arranged width-wise along the x-axis direction. Referring to FIG. 11A, a view taken along the vertical (z-axis) direction of a graphical representation of an individual object data slice $302_i$ is provided. The individual slice $302_1$ may be represented as a plurality of adjacent strips $304_j$, which is represented as m strips. The dashed line is not part of the data representation, but is provided to show the generally circular shape defined by strips $304_j$. In the example of FIG. 11A, the strips have a width corresponding to the direction of movement of the linear solidification device 42 along the travel (x) axis and length corresponding to a direction other than the direction of linear solidification device 42 movement (y-axis). In the specific example of FIG. 11A, the strip length direction is substantially perpendicular to the x-axis direction.

Each strip $304_j$ graphically depicts a data representation (preferably provided in a form that is readable by a computer processor) of those locations of solidifiable material that will be solidified in the y-axis direction for a given x-axis location. The locations may also be defined relative to build envelope boundaries such as the scanning axis boundary 344 and the travel (x) axis boundaries 343 and 345 of FIG. 11B. The control unit (not shown) receives data indicating the location of solidification energy in the x-axis direction, for example, as indicated by the position of linear solidification device 42 in the x-axis direction. The control unit also receives the data representation (strips $304j$) and directly or indirectly associates each strip $304_j$ with a travel (x) axis position in the build envelope 342 defined within the exposed surface of the solidifiable material. Thus, a position within a strip of the data representation corresponds to a position on the exposed surface of the solidifiable material.

In FIG. 11A $x_0$ corresponds to the position of the linear solidification device 42 at which solidification will begin. The increment $x_1-x_0$ represents the width of solidification in the x-axis direction provided by linear solidification device 42. Thus, when linear solidification device 42 is at position $x_0$, solidification energy source 112 will supply solidification energy when a facet 116a-f with which it is in optical communication has a rotational position corresponding to the y-axis locations in the build envelope 342 where the strip defined between $x_0$ and $x_1$ is present. In the illustrated embodiments of FIGS. 7A-C, the length of one facet 116 (a)-(f) of rotating energy deflector 113 corresponds to the maximum scannable y-axis dimension of the build envelope 342, i.e., the maximum length of solidification in the y-axis direction. However, any individual strip $304_j$ may correspond to a y-axis solidification length less than the maximum scannable y-axis build envelope dimension.

As linear solidification device 42 moves along the travel (x) axis direction within build envelope 342, it will solidify regions of solidifiable material corresponding to each strip $304j$. Each travel (x) axis location corresponds to a particular strip $304j$. In certain embodiments, a linear encoder is operatively connected to linear solidification device translation motor 88 and/or shaft 108 to determine the travel (x) axis position of linear solidification device 42.

The object layer data that is graphically illustrated in FIG. 11A may be mapped onto a build envelope 342 as shown in FIG. 11C. Each strip $304j$ may be defined by an x coordinate (or x-coordinate pairs) and one or more y-coordinates which define the regions of solidification at the particular x-axis location.

In certain examples, each strip $304j$ may be represented by a corresponding set of string data. In a preferred embodiment, the set of string data comprises a set of time values. In another preferred embodiment, the set of string data comprises a string number n and a set of time values. In certain cases, the string number n corresponds to a linear scan number. For example, using equation (9) (described previously) a maximum number of linear scans ($N_{max}$) may be calculated for a build envelope length L, and each linear scan will have a corresponding string index number associated with it. For any particular object layer, regions of the build envelope 342 along the x-axis direction may not be solidified and may not be scanned. Nevertheless, all regions at which a unique linear scan may occur in the x-axis direction may be assigned a string number. Thus, for a given speed of linear solidification device travel axis translation motor 88, a given number of facets F of a rotating energy deflector 113 and a given rotational speed of rotating energy deflector 92, there will be a maximum number of linear scans $N_{max}$ within build envelope 342 and a corresponding number of sets of data strings, each of which may or may not have actual scan data (object data) in it, depending on whether any scanning is to occur at its corresponding x-axis location. In the example of FIG. 11C, thirteen linear scans are used to form the object layer represented by strips $304j$ and each linear scan corresponds to a linear scan index ranging from n to n+12 and a unique set of string data having a string index ranging from n to n+12.

Typical control systems, including microcontrollers, will have a built in lag time between the time when solidification data is read and when solidification energy source 112 is toggled to either an activated or deactivated conditioned. The lag time may be variable and may cause errors in the dimensions of the three-dimensional object being built. In one example, a microcontroller is provided with the systems for making a three-dimensional object disclosed herein which has a lag time of no more than about 80 nanoseconds, preferably no more than about 60 nanoseconds, and even more preferably no more than about 50 nanoseconds. The part error can be related to the toggle lag time as follows:

$$\text{Error} = (L_{BE})(\text{RPM})(F)(t_{toggle\ lag})/(60\ \text{sec./min.})(0.001\ \text{mm/micron}) \quad (11)$$

wherein, Error is the maximum variation in the part dimensions (microns) due to the toggle lag time;
$L_{BE}$ is the build envelope distance in the scanning (y) axis direction (mm);
RPM is the rotational frequency of the rotating energy deflector 113 (revolutions/minute);
F is the number of facets on the rotating energy deflector 113; and
$t_{toggle\ lag}$ is the time required for the microprocessor to toggle the state of the solidification energy source.

In certain preferred implementations, the Error is preferably no more than 90 microns, more preferably no more than about 90 microns, still preferably no more than about 70 microns, and even more preferably no more than about 50 microns.

FIG. 11D provides a table that illustrates exemplary sets of string data that correspond to the object strips shown in FIG. 11C. The string indices begin with n=0 at the left-hand border ($x_0$) of build envelope 342 and end at a maximum string number $N_{max}$ at the right hand border of the build envelope 342. Thus, certain sets of string data will not have any object data associated with them because they do not correspond to x-axis locations where solidification where occur. In FIG. 11D no solidification occurs prior to string index n=20 and no solidification occurs after the string index n+12. Thus, there are no entries in the table of FIG. 11D for the x-axis locations at which no solidification occurs within build envelope 342.

Each set of string data depicted in FIG. 11D has a start code which is represented in hexadecimal notation by a series of eight Fs. Going from left to right, the string index n for the set of string data is next. Following the string index a series of time values is provided. Each time value represents a solidification source energization state event. In one example, the energization states are ON or OFF. The time values may take a variety of forms. However, in one implementation they are defined as elapsed times of a CPU clock in microcontroller unit used to operate the system for making a three-dimensional object. In one example, the CPU has a clock speed of 66 MHz and the units of time are CPU ticks. In an example where the line scanning speed is 1000 lines per second, the maximum scan length of each line in the scanning axis (y-axis direction) corresponds to 66,000 ticks. Thus, the set of string data at n=20 indicates that the solidification energy source 112 will be activated at 22000 ticks and deactivated at 44000 ticks. The set of string data at n=21 indicates that solidification energy source 112 will be activated at 20000 ticks and deactivated at 46000 ticks. In a preferred embodiment a timer is provided (such as a software timer programmed into the microcontroller unit) which is reset at the beginning of each linear scan, and the beginning of each linear scan is synchronized to the build envelope scanning axis boundary 344 using sensor 122 of FIG. 7C in the manner described previously. Thus, the ticks are defined relative to a zero starting time when the timer is reset at which point the line scanning operation is at the scanning axis boundary 344 (FIG. 11B).

In certain examples, a host computer transmits sets of string data to a microcontroller unit that operates the system for producing a three-dimensional object for each possible linear scan (i.e., for each string ranging from 0 to $N_{max}-1$) even though some of the sets of string data may have no object data (e.g., no CPU tick values) associated with them because no solidification occurs at the x-axis location to which they correspond. While this technique may be used, it consumes excess microcontroller unit processor capacity involved in reading string data for sets of string data corresponding to x-axis locations at which no solidification occurs. Accordingly, in certain examples, only sets of string data containing object solidification data (e.g., CPU tick values) are transmitted to the microcontroller unit. In such cases it is convenient to define a computer memory index m having values ranging from 0 to one less than the maximum number of transmitted sets of data strings $M_{max}$, where m uniquely identifies each set of string data transmitted to the microcontroller unit. In the example of FIG. 11D, there are a total of $N_{max}$ sets of string data defined for the entire build envelope 342 by the host computer. However, only 13 sets of string data include any object solidification data. Therefore, assuming that linear solidification device 42 is moving from left to right in FIG. 11C, the first set of string data transmitted by the host computer to the microcontroller unit will have a computer memory index of m=0 and a string index n of 20. The value of the string index n will correspond to a specific location along the x-axis within build envelope 342. However, the computer memory index m will not necessarily so correspond. Thus, the microcontroller unit need only read 13 sets of data string sets instead of $N_{max}-1$ sets of data strings.

Referring again to FIG. 7C, embodiments of a method for synchronizing a timer to the position of a scan line within the build envelope 342 will now be described. The method comprises activating a solidification energy source, such as source 112, which is in optical communication with a scanning device, such as a rotating energy deflector 113 or a linear scanning micromirror. The scanning device deflects solidification energy received from solidification energy source 112, and the deflected solidification energy is received by a solidification energy sensor, such as sensor 122. In certain examples, a mirror such as mirror 132 is provided to facilitate the transmission of deflected solidification energy from the scanning device to sensor 122.

In accordance with the method, the solidification energy sensor 122 senses the receipt of solidification energy and generates a sensing signal that is transmitted to a system microcontroller. The sensor's receipt of the solidification energy corresponds to the beginning of a line scanning operation. A timer is then initialized to a specified value (e.g., zero) based on the receipt of solidification energy by the sensor.

An example of the foregoing synchronization method will be described with reference to FIG. 7C. As illustrated in the figure, in certain examples, a solidification energy sensor 122, such as a light sensor, may be used to determine the y-axis location of solidification energy supplied by linear solidification energy device 42. In one example, a solidification energy sensor 122 is in optical communication with rotating energy deflector 113 to receive solidification energy deflected therefrom. In another example, the solidification energy sensor 122 is located at one end of housing 110 to indicate when solidification energy projected in the y-axis direction has reached its end or beginning of travel in the y-axis direction. In accordance with the example, the solidification energy sensor 122 is positioned at a location that corresponds to a maximum solidification energy position in the second direction (i.e., at a location corresponding to the end of travel in the y-axis direction). However, the sensor 122 can be located at other positions, but is preferably at a location at which the length of solidification energy travel between sensed events is known. In FIG. 7C, the location of mirror 132 and sensor 122 along with the depicted clockwise rotational direction of rotating energy deflector 113 cause the sensing of solidification energy by sensor 122 to correspond to the beginning of a linear scanning operation.

In accordance with such examples, a processor operatively connected to a clock (i.e., a CPU clock) receives the solidification energy sensor signals from sensor 122 and a timer operating on the clock units is synchronized to them, allowing an elapsed time between sensed solidification energy pulses to be calculated. The y-axis maximum scan length (e.g., the length of opening 114 or a measured length of solidification energy travel in the y-axis direction) is determined, and the speed of solidification energy beam scanning in the y-axis direction is calculated by dividing the maximum y-axis length of travel by the elapsed time between pulses:

$$s=l/\Delta t_{max} \qquad (11)$$

wherein, s=speed of solidification energy beam travel in the y-axis direction (e.g. cm/sec);
l=maximum length of scanning (e.g., cm); and
$\Delta t_{max}$=elapsed time between sequential sensed solidification energy signals generated by solidification energy sensor (e.g., sec).

By synchronizing the clock to the sensor's receipt of solidification energy and using the last speed value (or a suitable averaged value), the position of the solidification energy beam in the y-axis direction can be calculated:

$$y=s\Delta t \qquad (12)$$

wherein, y=y-axis position of solidification energy beam along solidifiable material relative to the y-axis starting point (e.g., cm);
s=speed of solidification energy beam travel from formula (1); and
$\Delta t$=elapsed time from last solidification energy signal from sensor.

A linear solidification controller (for example, as implemented in a microcontroller unit) operatively connected to solidification energy source 112 can selectively activate and deactivate solidification energy source 112 to cause solidification energy to be supplied only when linear solidification device 42 is at an x location and the rotating energy deflector 113 is at a rotational position that corresponds to a point on one of the strips $304_j$ shown in FIG. 11A. Using formulas (11) and (12), the linear solidification controller can receive data indicative of the y-axis position of solidification energy. A linear encoder may provide the linear solidification controller with travel (x) axis location information (for linear solidification energy device 42), allowing the controller to determine the desired y-axis profile at the determined travel (x) axis location from object data such as that in FIG. 11A.

As mentioned previously, the object layer data may also be converted to a plurality of sets of string data such that each plurality corresponds to a given layer and position along the build axis (z-axis). In accordance with such examples, each set of string data includes a plurality of time values, each of which defines a time at which the energization state of the solidification energy source 112 is changes. Preferably, the time values are defined relative to a zero time that is reset upon the receipt of a synchronization solidification energy generated when sensor 122 receives solidification energy, as also discussed previously. In certain examples, the zero time of a CPU counter is set at the leading edge of the synchronization sensor signal received by sensor 122.

Referring again to FIG. 11A, each strip $304_j$ corresponds to a continuous region of solidification in the scanning (y) axis direction. However, depending on the object being built, this may not be the case. Certain of the strips $304_j$ may be discontinuous, thereby defining unconnected sections along the scanning (y) axis for a given travel (x) axis location. In certain examples a solidification energy modulator (such as a laser diode modulator in the case of a laser diode solidification energy source 112) is provided to selectively activate solidification energy source 112.

Figure 12A:
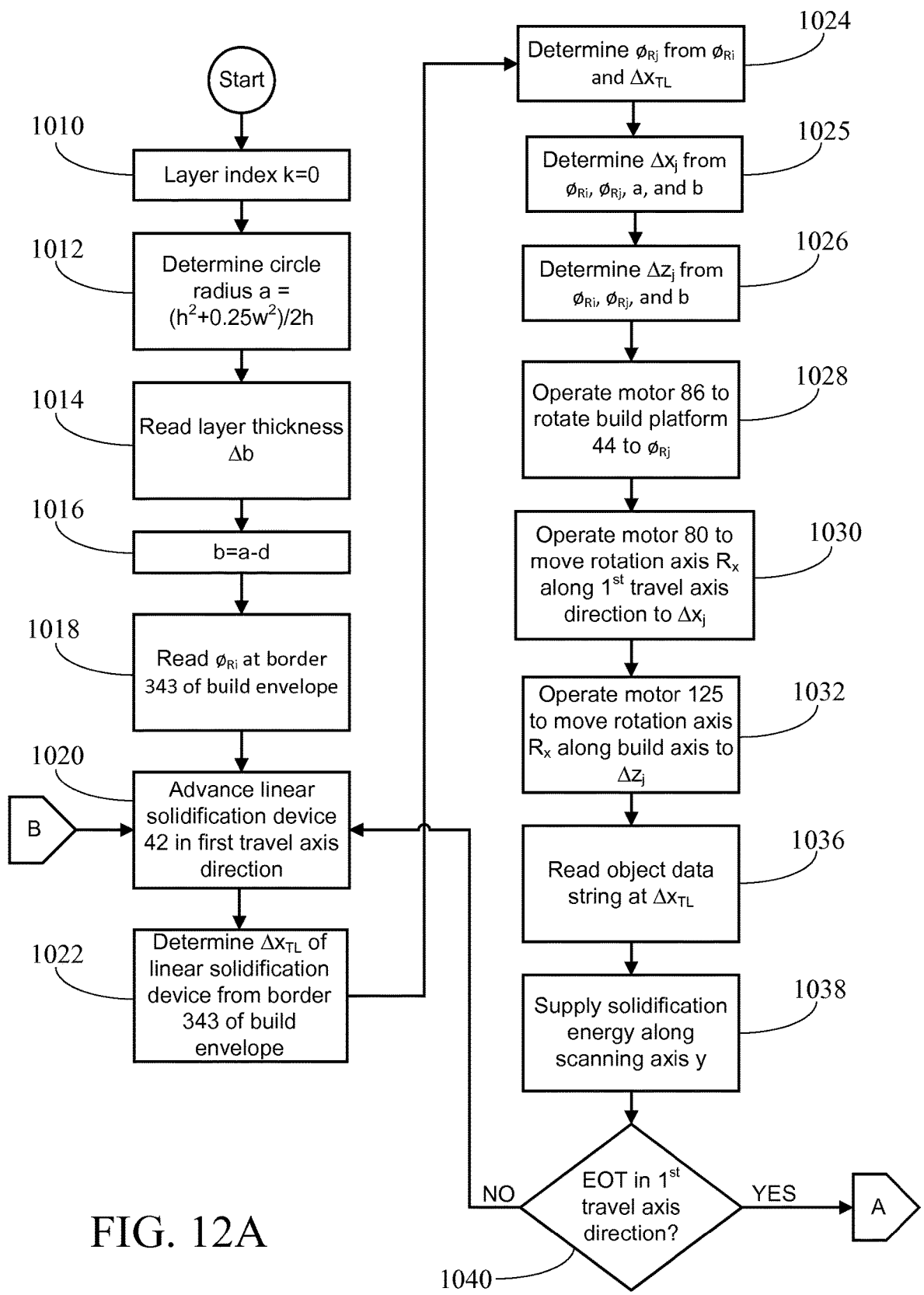
FIGS. 12A and 12B are a flow chart depicting an exemplary method of making a three-dimensional object using a curved build platform that moves in multiple dimensions during an object solidification operation.
Figure 12B:
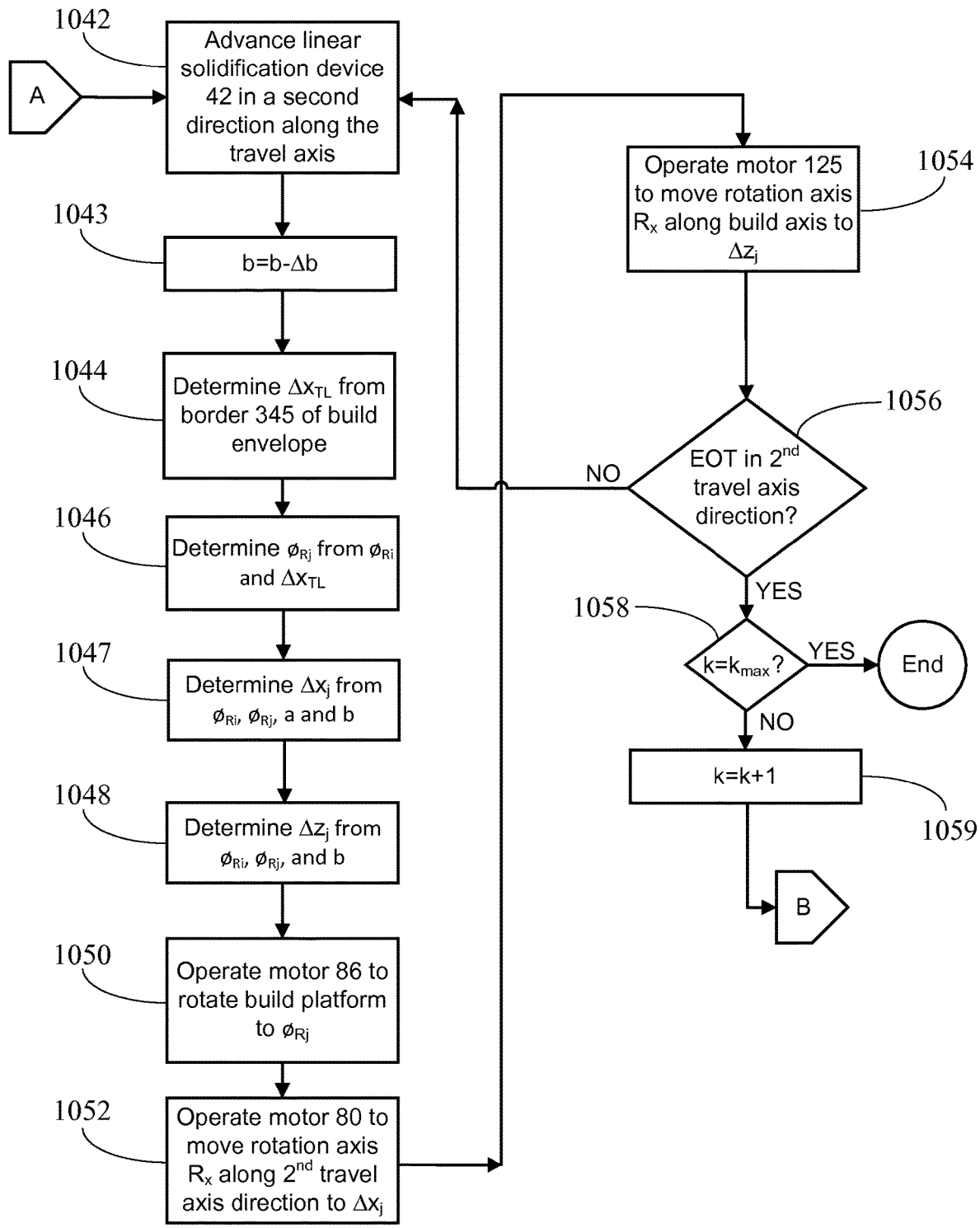

Referring to FIGS. 12A-B, a method of forming a three-dimensional object using the system of FIGS. 2-5 will now be described (with a suitable housing and solidifiable material container such as housing 54 and solidifiable material container 48 of FIG. 1 also being provided). The method of FIGS. 12A-B is based on the movement of the rotational axis $R_x$ along trochoidal paths. In accordance with the method, the build platform 44 is manipulated so that the linear solidification device 42 and the tangent line TL remain aligned along the travel (x) axis as the linear solidification device 42 moves along the travel (x) axis. In a preferred embodiment, the method is embodied in a set of computer readable instructions on a non-transitory computer readable medium which can be executed by a computer processor. At the beginning of the method, the linear solidification device 42 is preferably aligned with the lowest line of the build platform lower surface 46 along the build (z) axis, which is the tangent line at the build axis position $z_{min}$, exemplified in FIG. 6A. The sagittal plane on which the center C, rotational axis $R_x$, and sagittal line 79 lie is rotated counter-clockwise by $ø_{Ri}$ from the tangent line TL.

In accordance with the embodiment, at the start of an object build process, a layer index k is initialized to zero (Step 1010). In step 1012, the radius of a trochoidal circle is determined based on the sagittal height h and the width w of the build platform in accordance with equation (8) above. The radius need not be calculated during an individual build process, but rather, can be determined and pre-set in a computer or microcontroller operating the system. In step 1014 a layer thickness Δb (microns) is read. For the first layer, the value of b equals the difference between the radius a and the distance d measured between the rotational axis $R_x$ and the sagittal line 79 along the radial direction. In step 1016, the value of b is set to this value (a-d).

In step 1018, the value of $ø_{Ri}$ when linear solidification device 42 is at the travel (x) axis border 343 (FIG. 11B) is read. The angle $ø_{Ri}$ can also be pre-set in the computer or microcontroller.

Figure 11B:
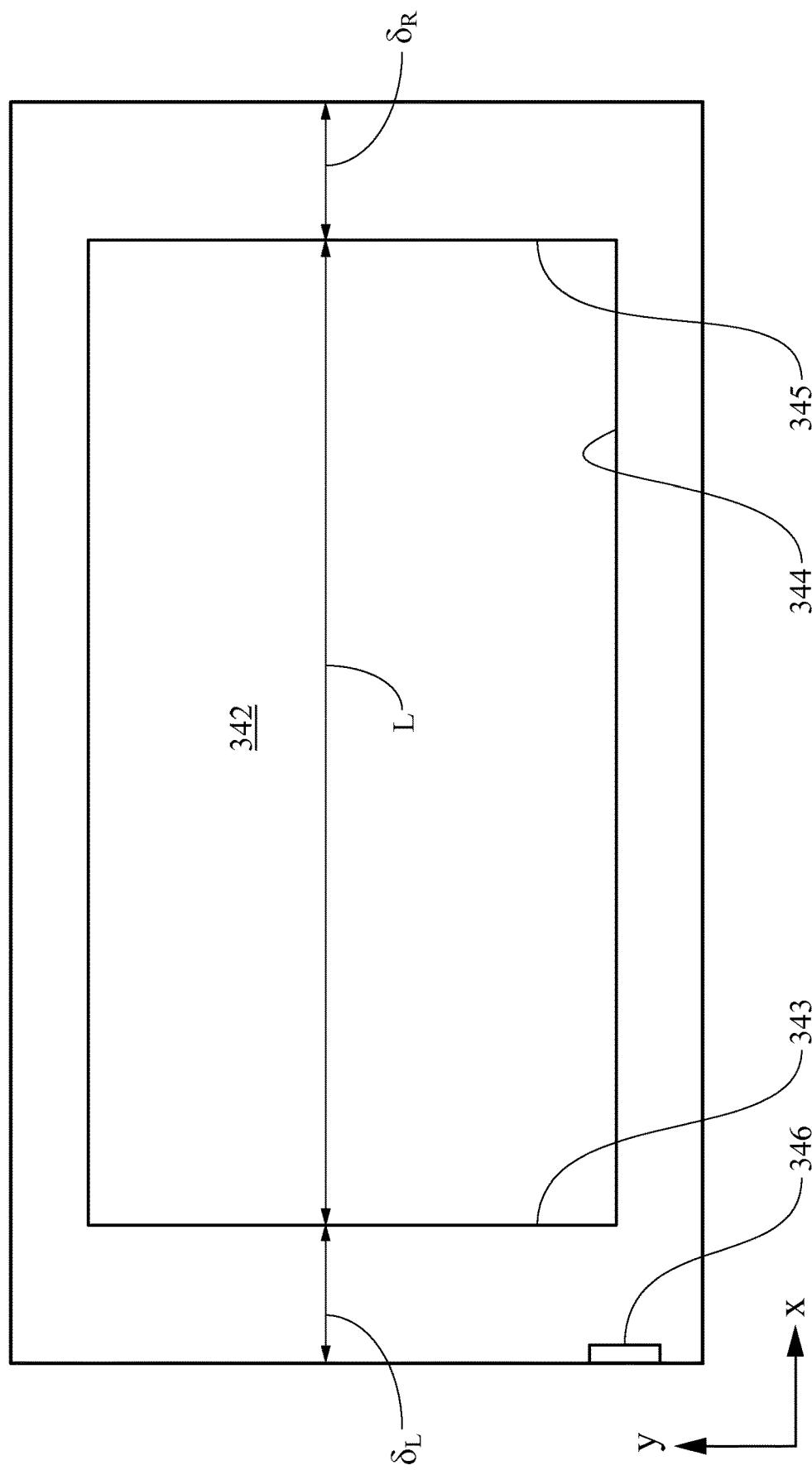
FIG. 11B is a top plan view of a source of solidifiable material comprising a build envelope and lateral offset regions.
Figure 11C:
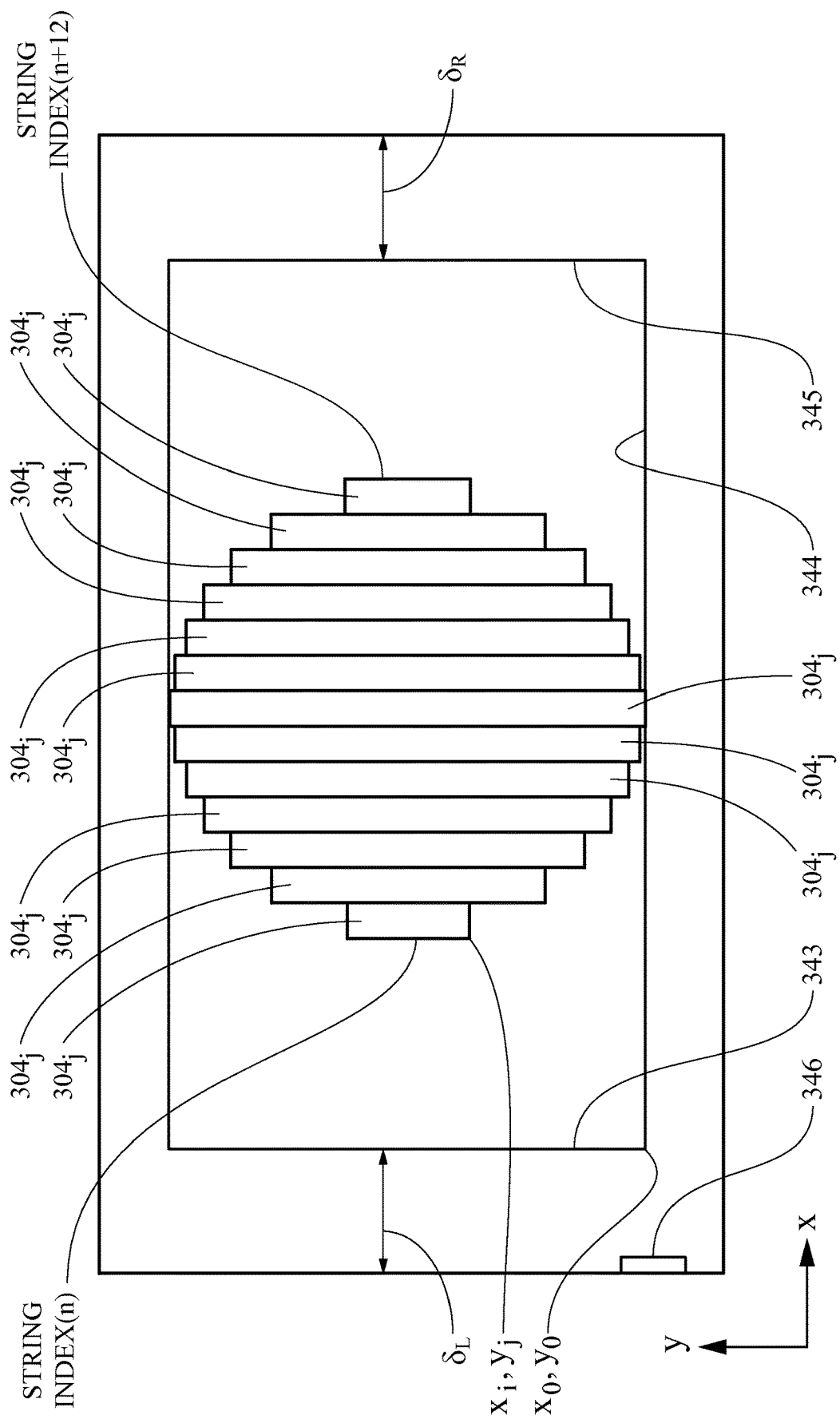
FIG. 11C is a top plan view of the source of solidifiable material of FIG. 11B with the object cross-section strip data of FIG. 1A mapped onto the build envelope.

In step 1020, linear solidification device 42 is advanced in a first direction along the travel (x) axis to a position within build envelope 342 (FIG. 11B). In step 1022, the distance of movement of the tangent line ($Δx_{TL}$) from the build envelope border 343 is determined. As mentioned above, the tangent line TL is maintained in alignment with the linear solidification device 42 along the travel (x) axis. Therefore, equation (3) can be used to calculate the change in the angle of rotation of the trochoidal circle of radius a for a given distance of travel ($Δx_{TL}$) of the tangent line TL along the travel (x) axis. If the tangent line moves by an amount $Δx_{TL}$ in the positive direction (to the right in FIGS. 6A-6C), the angular rotation of the trochoidal circle will change in radians by an amount equal to $-Δx_{TL}/a$. In step 1024, the new angle of rotation relative to the reference position of FIGS. 6B and 6E can be determined as follows:

$$ø_{Rj} = ø_{Ri} - Δx_{TL}/a \qquad (13)$$

In step 1025 equation (6) is used to calculate distance $Δx_j$ that the rotational axis $R_x$ moves along the travel axis using the initial angle of rotation $ø_{Ri}$, the current angle of rotation $ø_{Rj}$, the radius a and the distance b between the rotational axis $R_x$ and the center C of the trochoidal circle. In step 1026, equation (7) is used to calculate the distance $Δz_j$ that the rotational axis $R_x$ moves along the build (z) axis using the initial angle of rotation $ø_{Ri}$ and the current angle of rotation $ø_{Rj}$.

In step 1028, the build platform rotational motor 86 is operated to rotate the build platform to the current angle of rotation $ø_{Rj}$. In step 1030 motor 80 is operated to translate the rotational axis $R_x$ to the position $Δx_j$ (i.e., the position of rotational $R_x$ along the travel (x) axis relative to a starting point when the tangent line TL and linear solidification device 42 are at the build envelope border 343). In step 1032 motor 125 is operated to translate the rotational axis $R_x$ to a position $Δz_j$ (i.e., the build axis position relative to a starting point when the tangent line TL and linear solidification device are at the build envelope border 343). Although depicted as discrete, sequential steps, steps 1028, 1030, and 1032 may occur simultaneously or substantially simultaneously so that the build platform 44 moves in multiple dimensions at the same time or substantially the same time.

In step 1036, the set of object string data is read for the travel axis position that is located at $Δx_{TL}$ from the build envelope border 343. In step 1038, solidification energy is supplied along the scanning (y) axis in correspondence with the set of string data.

In step 1040, the method determines whether the linear solidification device 42 has reached an end of travel (EOT) position along the first travel (x) axis direction. If it has not, control transfers to step 1020, and steps 1020 to 1038 are repeated for the remaining $Δx_{TL}$ increments for j=1 to $j_{max}$ along the travel (x) axis. If the linear solidification device 42 has reached the end of travel (or in some examples, build envelope border 345), control transfers to step 1042 in FIG. 12B.

In step 1042, the linear solidification device 42 is translated in a second direction along the travel (x) axis. In certain examples, the linear solidification device 42 may be translated through the right-hand offset distance 6R and then back to the build envelope border 345 in step 1042. However, in step 1042 linear solidification device 42 is translated within build envelope 342 by an amount $Δx_j$ from build envelope border 345. In step 1043, the build platform is raised (using build platform build axis motor 125) by the layer thickness Δb, and the value of b is decreased by the layer thickness Δb.

In step 1044, the distance of the tangent line TL from the build envelope border 345 ($Δx_{TL}$) is determined based on the distance between the linear solidification device 42 and the build envelope border 345. When moving in the second direction (as illustrated in FIGS. 6D-6F), the value of $ΔX_{TL}$ is negative. In step 1046 the current value of the angle of rotation $ø_{Rj}$ relative to the reference orientation is determined using equation (13) from the initial angle of rotation at build axis border 345 ($ø_{Ri}$) and the value of $Δx_{TL}$. When moving in the second direction, $Δx_{TL}$ will have a negative value. As a result the calculated values of $ø_{Rj}$-$ø_{Ri}$ will be positive.

The value of the travel (x) axis position of the rotational axis $R_x$ relative to its travel axis starting position (i.e., the travel (x) axis position of rotational axis $R_x$ when the tangent line TL and linear solidification device 42 are both at build envelope boundary 345) is determined in step 1047 from the values of $ø_{Ri}$, $ø_{Rj}$, a, and b using equation (6). The value of the build (z) axis position of the rotational axis $R_x$ relative to its starting position (i.e., the build (z) axis position of the rotational axis $R_x$ when the tangent line TL and linear solidification device 42 are both at build envelope boundary 345) is determined in step 1048 using equation (7). In step 1050 the build axis rotation motor 86 is operated to rotate the build platform 44 to the angle of rotation $ø_{Rj}$ relative to the non-rotated reference position of FIG. 6E. In step 1052 the build platform travel axis translation motor 80 is operated to move the rotational axis $R_x$ to the position $\Delta x_j$, and in step 1054 the build platform build axis translation motor 125 is operated to move the rotational axis $R_x$ to the position $\Delta z_j$. Steps 1050-1054 may be carried out simultaneously or substantially simultaneously. In step 1056 the method determines whether the linear solidification device 42 has reached its end of travel (EOT) in the second travel (x) axis direction. If not, control transfers to step 1042, and steps 1042 to 1054 are repeated for the remaining $\Delta x_{TL}$ increments for j=1 to $j_{max}$ along the travel (x) axis. Otherwise, control transfer to step 1058, in which it is determined if the value of the current layer index k equals the value of the maximum layer index $k_{max}$. If the current layer index k is equal to the maximum layer index $k_{max}$, the three-dimensional object is complete, and the method ends. Otherwise, the layer index is incremented in step 1059 and control transfers to step 1020.

Figure 14A:
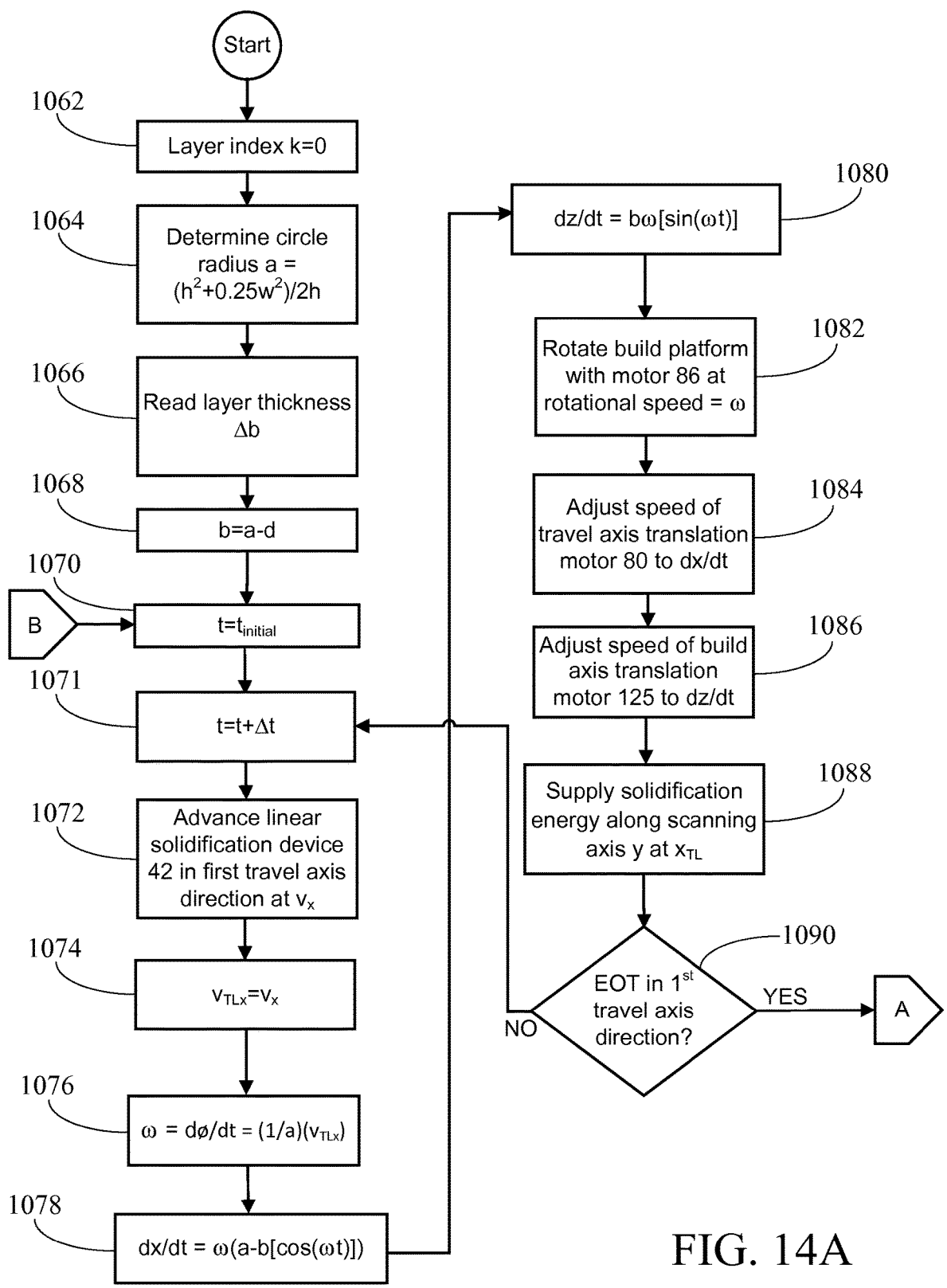
FIGS. 14A and 14B are a flow chart depicting another exemplary method of making a three-dimensional object using a curved build platform that moves in multiple dimensions during an object solidification operation.

In the method of FIGS. 12A and 12B, the trochoidal position of the point of interest (the rotational axis $R_x$) is recalculated at various increments along the travel (x) axis to adjust the operation of the build platform travel axis translation motor 80, build platform rotation motor 86, and build platform build axis translation motor 125. However, in other exemplary methods, the speeds of movement of the trochoidal point may be recalculated at various time increments and used to manipulate the movement of build platform 44 via motors 80, 86, and 125. One such exemplary method is illustrated in FIGS. 14A and B. In accordance with the method, a layer index is initialized to a value of zero in step 1062. In step 1064, the radius a of a trochoidal circle on which the lower build platform surface 46 lies is calculated based on the sagittal height h and the width w of build platform 44. Alternatively, the radius a can be calculated and stored beforehand without being calculated for the performance of an individual object solidification operation. In step 1066 the layer thickness Δb is read.

The initial value of b in equations (6) and (7) is determined in step 1068 by subtracting the distance d between the rotational axis $R_x$ and the sagittal line 79 along the radial direction of the lower build platform surface 46 from the length of radius a. A timer is initialized to a value of $t_{initial}$ in step 1070. In certain examples, the value of $t_{initial}$ is selected based on the starting angular orientation of the sagittal plane when the linear solidification device 42 is at the build envelope border 343. An exemplary method for selecting the initial time $t_{initial}$ is provided below with respect to equation (17). The time value is then incremented by a selected time increment Δt in step 1071.

Starting at an initial position such as the one depicted in FIG. 6A, the linear solidification device 42 begins to move at a constant or substantially constant velocity $v_x$ in a first direction along the travel (x) axis in step 1072. The desired tangent line velocity $v_{TL}$ is set equal to the linear solidification device constant velocity $v_x$ in step 1074. The build platform motors 80, 86, and 125 are manipulated to move the tangent line TL at the same velocity such that the tangent line TL and linear solidification device 42 remain in alignment along the travel (x) axis as the linear solidification device 42 moves along the travel (x) axis.

If tangent line TL moves at a constant velocity $v_x$ along the travel axis, the rate of angular rotation (in radians per unit second) of the trochoidal circle of radius a can be calculated step 1076 using the following equation:

$$\omega = d\phi/dt = (1/a)v_{TL} \tag{14}$$

where, $V_{TL}$ is the velocity of the tangent line TL along the travel (x) axis (mm/sec);
a=the radius of curvature of the lower build platform surface 46 (mm);
ω=angular rotational velocity (radians/sec).

The angular rotational velocity of the build platform w about axis of rotation $R_x$ equals the angular rotational velocity of the sagittal plane (and hence axis of rotation $R_x$ and sagittal line 79 because they lie in the sagittal plane) about the center of the trochoidal circle. Because the tangent line velocity $V_{TL}$ is constant, the angular rotational velocity ω is also constant. In step 1078, the velocity of the rotation axis $R_x$ in a direction along the travel (x) axis at a time t can be determined using the following equation:

$$dx/dt = \omega(a - b[\cos(\omega t)]) \tag{15}$$

wherein, dx/dt is the velocity of the rotation axis $R_x$ along the travel axis (mm/sec);
ω=angular rotational velocity (radians/sec);
t=time of rotation (sec) of a trochoidal circle of radius a to rotate from a reference orientation at which the sagittal plane is parallel to the build axis;
a=the length of the radius of curvature defined by the lower build platform surface 46 (mm); and
b=the distance between the center of a trochoidal circle of radius a defined by the radius of curvature of lower build platform surface 46 and the rotation axis $R_x$ along the radial direction of the lower build platform surface 46 (mm).

Equation (15) can be used to determine the velocity along the travel (x) axis of any point that is fixed relative to the center of the trochoidal circle by using the appropriate value of b. In the case of sagittal line 79, the initial value of b would equal the radius a. In the case of the rotational axis $R_x$, the initial value of b would equal the length of radius a minus the distance between the rotational axis $R_x$ and the sagittal line 79 in the radial direction of the lower build platform surface 46.

The velocity of the rotation axis $R_x$ in a direction along the build (z) axis at time t can be determined in step 1080 using the following equation:

$$dz/dt = b\omega[\sin(\omega t)] \tag{16}$$

wherein, dz/dt is the velocity of the rotation axis $R_x$ along the build (z) axis (mm/sec);
ω=angular rotational velocity (radians/sec);
t=time of rotation (sec) of a trochoidal circle of radius a from a reference orientation at which the sagittal plane is parallel to the build axis; and
b=the distance between the center of a trochoidal circle of radius a defined by the radius of curvature of lower build platform surface 46 and the rotation axis $R_x$ along the radial direction of the lower build platform surface 46 (mm).

In equations (15) and (16), the values of dx/dt and dz/dt are based on a trochoidal circle that rolls at a constant angular speed w from a starting reference orientation at which t=0 and ωt=ø=0 when the sagittal plane is parallel to the build axis. If starting from this reference orientation, the time it would take to reach the orientation of FIG. 6A may be determined as follows:

$$t_{initial} = (2\pi - \phi_{Ri})/\omega \tag{17}$$

wherein, $t_{initial}$ is the time (sec) required for the trochoidal circle to rotate from the reference orientation to $\phi_{Ri}$ at the angular rotational velocity ω; and
ω=angular rotational velocity (radians/sec).

Thus, the initial time value $t_{initial}$ obtained from equation (17) can be used as an initial time value for an angle $\varnothing_{Ri}$ between the sagittal plane and the tangent line. The time values used in equations (15) and (16) can then be related to the time elapsed since the build platform was in its initial rotational orientation as follows:

$$t = t_{initial} + \Delta t \quad (18)$$

wherein, $t_{initial}$ is as defined for equation (17); and
$\Delta t$ is the time elapsed from a sagittal plane angular orientation of $\varnothing_{Ri}$.

In step 1082, the angular velocity of rotational axis $R_x$ is adjusted to the value w determined in step 1076 by adjusting the rotational speed of build platform rotational motor 86. In step 1084, the translational velocity of the rotational axis $R_x$ along the travel (x) axis is adjusted to the value dx/dt determined in step 1078 by adjusting the operation of build platform translation axis motor 80. The translational velocity of the rotational axis $R_x$ along the build (z) axis is adjusted in step 1086 to the value dz/dt determined in sep 1080. Steps 1082-1086 may be carried out simultaneously or substantially simultaneously.

In step 1088, solidification energy is supplied along the scanning (y) axis at the travel (x) axis location of the tangent line ($x_{TL}$) corresponding to the current time value tin accordance with the corresponding object data string. In accordance with the method, it is determined whether the linear solidification device 42 has reached its end of travel (EOT) in the first direction along the travel (x) axis in step 1090. If it has not, control transfers to step 1071, the value of the current time t is incremented by a selected time increment $\Delta t$, and steps 1072-1088 are repeated. Otherwise, control transfers to step 1094 in FIG. 14B.

Figure 14B:
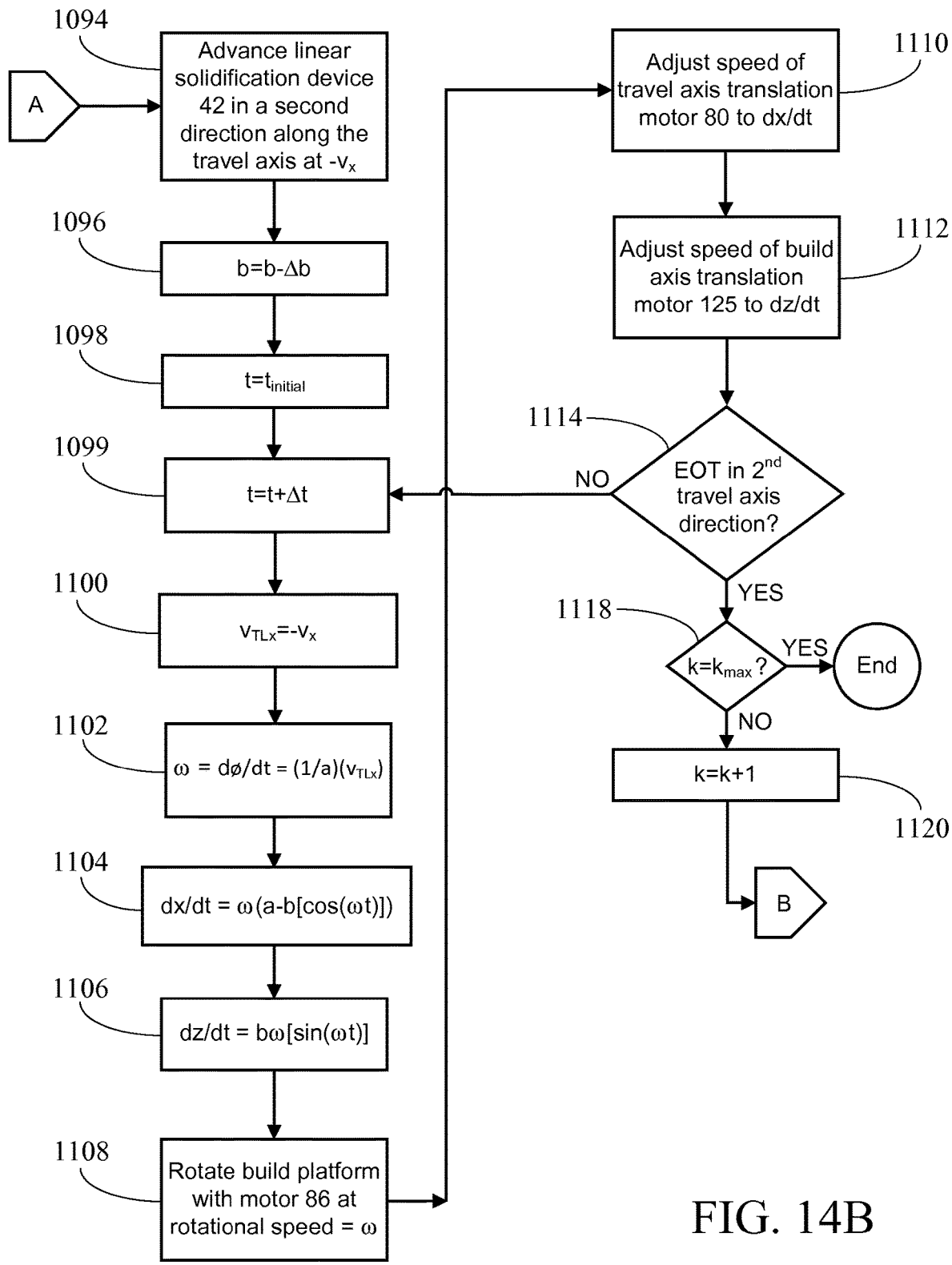

FIG. 14A describes an object solidification operation such as the one illustrated in FIGS. 6A-6C. FIG. 14B describes on object separation operation in which the most recently solidified layer of the object is separated from a solidification substrate such as the substrate 52 in FIG. 1 or from a film such as film 55 on top of the substrate 52. In step 1094, the linear solidification device 42 advances in a second direction along the travel (x) axis at a velocity of $-v_x$. In step 1096 the build platform is raised by the layer thickness $\Delta b$ using build platform build axis translation motor 125, and the value of b is decremented by the layer thickness $\Delta b$. A timer is initialized to a value of $t_{initial}$ in step 1098 and is then incremented by the selected time increment $\Delta t$ in step 1099. In certain examples, the value of $t_{initial}$ is selected based on the starting angular orientation of the sagittal plane when the linear solidification device 42 is at the build envelope border 345. An exemplary method for selecting the initial time $t_{initial}$ is provided above with respect to equation (17). As with the object solidification operation of FIG. 14A, in the object separation operation the linear solidification device 42 is maintained in alignment with the tangent line TL along the travel (x) axis. However, it is not critical to maintain their alignment during an operation separation operation.

In step 1100, the velocity of the tangent line $V_{TLx}$ is set equal to the velocity $-v_x$ of the linear solidification device along the travel (x) axis. The angular velocity ω corresponding to $V_{TLx}$ is determined in step 1102 using equation (14). The translational velocity of the rotation axis $R_x$ along the travel (x) axis is determined in step 1104 with equation (15). In step 1106, the translational velocity of the rotation axis $R_x$ along the build (z) axis is determined using equation (16).

In step 1108, the build platform rotation motor 86 is operated to rotate at the angular velocity ω determined in step 1102. The build platform travel axis translation motor 80 is adjusted in step 1110 to the speed dx/dt determined in step 1104. The build platform build axis motor 125 is adjusted in step 1112 to the speed dz/dt determined in step 1106.

In step 1114, a determination is made as to whether the linear solidification device 42 has reached its end of travel in the second direction along the travel (z) axis. If it has not, control transfers to step 1099 and steps 1099-1112 are repeated. Otherwise, control transfers to step 1118 in which the current layer index k is compared to the maximum layer index value $k_{max}$. If the current layer index value k has reached the maximum value $k_{max}$, the object formation is complete, and the process ends. Otherwise, control transfers to step 1120, and the layer index is incremented by one. Control then transfers to step 1070 (FIG. 14A) so that the next layer of the object can be formed.

In certain preferred examples, three-dimensional objects produced using the methods and apparatuses described herein comprise a removable support section and a finished object section. The removable supports connect the finished object to the build platform 44 and can be removed from both the build platform 44 and the finished object so that the finished object is less likely to be damaged due to separation from build platform 44. In certain examples, the removable supports have a geometry that facilitates their separation from the build platform 44 and the finished object. In the same or other examples, the removable supports are formed from a solidifiable material different from the solidifiable material used to form the finished object and may be dissolved in water or a suitable organic solvent to remove them from the finished object. The use of removable supports in connection with the methods and apparatuses described herein beneficially allows the finished object to be provided with a base that is substantially planar despite the fact that the lower surfaced 46 of build platform 44 is curved.

Figure 13:
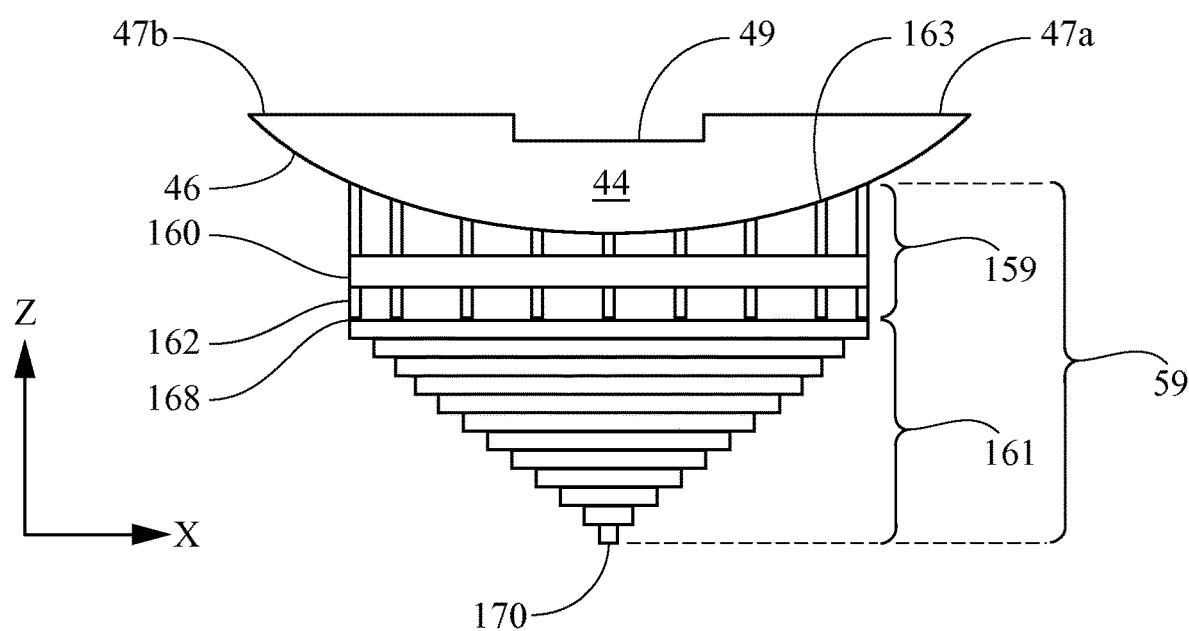
FIG. 13 is a cross-sectional view of the build platform of FIG. 2 with an attached object comprising a finished object section and a removable support section built using the system of FIG. 2.

Referring to FIG. 13 an object 59 is shown attached to the lower surface 46 of build platform 44 following the completion of an object building process. The object 59 comprises finished object section 161, which is a conical structure, and removable support section 159. Removable support section 159 is removably affixed to the lower surface 46 of the build platform. As indicated in the figure, the finished object section 161 includes a substantially planar base surface 168 spaced apart from a top 170 along the build (z) axis. Because the illustrated arrangement is from an "upside-down" build process, the base surface 168 is at a build (z) axis position that is above that of the top 170. However, once the object is removed, it would be flipped over to conform to the original object data on which it is based.

If the finished object section 161 were built directly on the build platform lower surface 46, it would not be possible to create a planar base surface 168 because of the curvature of build platform lower surface 46. However, the removable support section 159 acts as an interface between the build platform lower surface 46 and the finished object section 161, thereby allowing the finished object section to be created with a substantially planar lower surface 168. The removable supports include a discontinuous lower surface 163 that is defined by the ends of vertical support runs 162 which are attached to the build platform lower surface 46. The discontinuous lower surface 163 defines a curved profile when viewed along the y-axis that has the same degree of curvature as the build platform lower surface 46. Removable support section 159 may also include a horizontal member 160 to strengthen the support structure. In the exemplary support structure, the removable support section 159 contacts the substantially planar base 168 of the finished object section 161 at discontinuous and spaced apart locations, thereby reducing the surface area of the interface between the removable support section 159 and the finished object section 161. This configuration reduces the separation forces required to separate the finished object section 161 from the removable support section 159 as compared to interface structures with a greater contact surface area. Thus, in one preferred example of a method of making a three-dimensional object, object data is provided which comprises removable support data and finished object data. The removable support data defines removable supports comprising a build platform interface surface (e.g., discontinuous lower surface 163 of FIG. 13) that is curved along a width dimension of the removable supports and the finished object. The build platform interface surface may be discontinuous. The removable supports also comprise an object interface surface that removably adheres to the finished object. In preferred examples, the curvature of the build platform interface surface corresponds to the curvature of a build platform surface.

Figure 15:
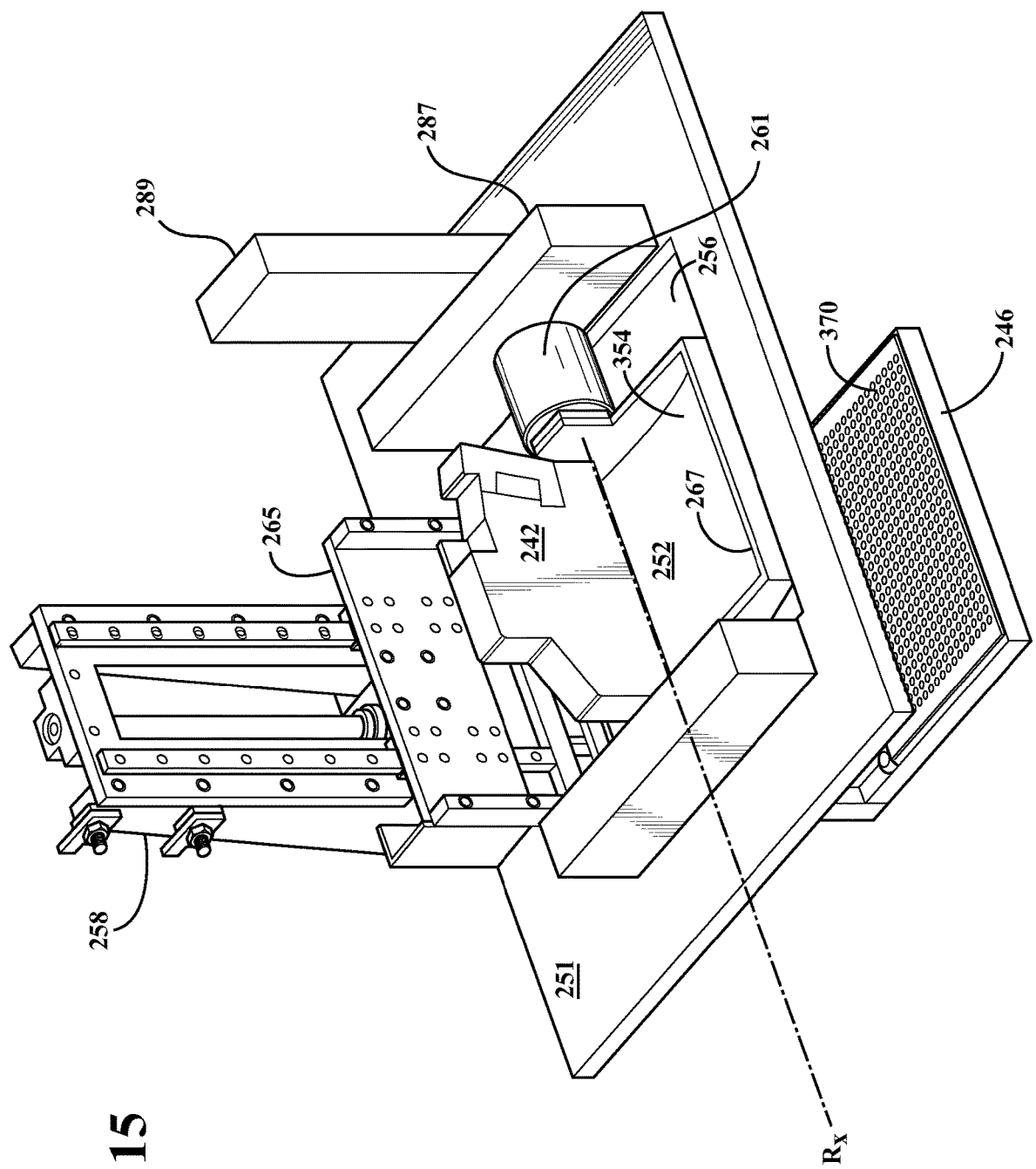
FIG. 15 is a perspective view of an apparatus for making at three-dimensional object from a solidifiable material in which a rigid or semi-rigid solidification substrate has a curved surface and is translatable along a travel axis and a build axis and rotatable about an axis of rotation.

Referring to FIG. 15, an apparatus for making a three-dimensional object is depicted. The apparatus includes a rigid or semi-rigid solidification substrate 252 that is transparent and/or translucent. Substrate 252 may be formed from the same materials as substrate 52 described previously. The substrate also includes a solidifiable material contacting surface 356 (not shown in FIG. 15) and an upward surface 354 which is spaced apart from the solidifiable material contacting surface 356 by the thickness of the substrate 252. Substrate 252 is supported within a frame 267. The solidifiable material contacting surface 356 may be coated with a resilient coating (e.g., silicone) and/or a protective film, such as a polymeric film formed from ethylenically unsaturated, halogenated monomers such as those described above for films 55 and 154.

Build platform 246 is also provided. A housing is not shown but is provided beneath the work table 251 and includes a solidifiable material container. The build platform 246 is movable along the build (z) axis within the solidifiable material container. During the formation of a three-dimensional object, the object is progressively built in the upward build (z) axis direction on an object contacting surface 370 of build platform 246. After each layer of the object is formed, the build platform 246 moves in the downward (negative) build (z) axis direction, allowing unsolidified solidifiable material to flow over the exposed, most recently formed (upward-facing) surface of the object. The solidifiable material contacting surface 356 of rigid or semi-rigid solidification substrate 252 faces the object contacting surface 370 of build platform 246. Build platform 246 is connected to a build (z) axis elevator 258 via horizontal support member 265. The horizontal support member 265 includes features that slidingly engage corresponding features formed on build (z) axis elevator 258. A build platform motor (not shown) is operatively connected to the horizontal support member 265. When the build platform motor is energized, it causes the horizontal support member 265 to move along the build (z) axis, which causes the build platform 246 to move therewith. Thus, the object contacting surface 370 of the build platform 246 and the solidifiable material contacting surface 356 (FIGS. 16A-F and 17) of the rigid or semi-rigid solidification substrate 252 are movable relative to one another along the build (z) axis.

When viewed along a cross-sectional axis (the y-axis) the solidifiable material contacting surface 356 of the rigid or semi-rigid solidification substrate 252 is curved and has a curvature direction along a travel (x) axis. During the solidification of solidifiable material to form each object layer, each point on the solidifiable material contacting surface 356 traverses a trochoidal path when viewed along the cross-sectional (y) axis.

In certain examples, during the formation of each layer of a three-dimensional object, rigid or semi-rigid solidification substrate 252 is simultaneously translated along the travel (x) axis and build (z) axis and rotated about an axis of rotation $R_x$. The coordination of these three degrees of motion causes the points on the solidifiable material contacting surface 356 to traverse a trochoidal path when viewed along the cross-sectional (y) axis. A travel axis translation apparatus 287 is provided and is operatively connected to rigid or semi-rigid solidification substrate 252 to translate the rigid or semi-rigid solidification substrate 252 long the travel (x) axis. Travel axis translation apparatus 287 may include the build platform travel axis translation components such as travel axis carriage 83 shown in FIGS. 2-4 and the associated components used to translate the build platform 44 (FIGS. 2-4) along the travel axis. A travel axis translation motor (not shown) such as travel axis translation motor 80 (FIGS. 2-4) may also be provided to translate the rigid or semi-rigid solidification substrate 252 along the travel (x) axis.

A build axis translation apparatus 289 may be provided and may be connected to the travel axis translation apparatus 287 so that the travel axis translation apparatus 287 may move along the build (z) axis. A suitable motor (not shown) such as the build platform build axis motor 125 (FIG. 4) may be provided and operatively connected to the travel axis carriage 287 to translate the travel axis carriage 287 along the build (z) axis and in sliding engagement with the build axis elevator 289.

Build axis translation apparatus 289 may be configured similarly to the build axis support assembly 70, vertical rail support member 58, and the other components shown in FIGS. 2-4 for translating the build platform 44 along the build (z) axis. Similarly, a rotation apparatus 261 is provided and is operatively connected to the rigid or semi-rigid solidification substrate 252 to rotate the substrate 252 about axis of rotation $R_x$. The rotation apparatus 261 may be configured similarly to the platform holder 61, motor 86 and other associated components shown in FIGS. 2-4 for rotating build platform 44 about rotational axis $R_x$. The rotation apparatus 261 is preferably configured to rotate relative to the travel axis translation apparatus 287 and the build axis translation apparatus 289. Other configurations may also be used to translate the rigid or semi-rigid solidification substrate 252 along the travel (x) and build (y) axes and to rotate the substrate 252 about rotational axis $R_x$. However, any such configurations preferably allow the substrate 252 to simultaneously translate along the travel (x) axis, translate along the build (z) axis, and rotate about the rotational axis $R_x$.

Linear solidification device 242 is shown in FIG. 15 and includes a source of solidification energy used to solidify the solidifiable material that forms a three-dimensional object. The linear solidification device 242 is configured similarly to the linear solidification device 42 described previously. However, in the example of FIG. 15, linear solidification device 242 is positioned above the rigid or semi-rigid solidification substrate 252 along the build (z) axis, whereas the linear solidification device 42 of FIGS. 2-4 is positioned below the substrate 52. During an object solidification operation, the linear solidification device 242 travels along the travel (x) axis and projects solidification energy along a scanning axis (e.g., the y-axis) and through the rigid or semi-rigid solidification substrate 252. As a result, the linear solidification device 242 solidifies each layer of solidifiable material into a pattern of adjacent, linear sections that correspond to a portion of the object being built.

In general, the movement of the rigid or semi-rigid solidification substrate 252 during an object solidification operation is similar to the movement of the build platform 44 of FIGS. 2-4 during an object solidification operation. At any given time, the travel (x) axis position of the linear solidification device 242 is aligned with the portion of the substrate 252 that is at the lowest build (z) axis position. In preferred examples, the lowest build (z) axis position of the rigid or semi-rigid solidification substrate 252 does not vary through an object building process.

FIGS. 16A-16F depict an example of a rigid or semi-rigid solidification substrate 252 that moves in multiple dimensions during an object solidification and an object separation process. The build platform and solidifiable material are not shown but would be below the rigid or semi-rigid solidification substrate 252 along the build (z) axis.

As the figures indicate, the radius of curvature of the lower surface 356 of build platform 44 defines a trochoidal circle (not shown) having a center C and a radius a that equals the distance between center C and the sagittal line 279. The rigid or semi-rigid solidification substrate 252 is in the shape of a partial cylinder. A sagittal plane may be defined as a plane that bisects the substrate 252 at the mid-point along the direction of curvature of the substrate. The sagittal plane intersects the rigid or semi-rigid solidification substrate 252 along a line that has a length along the cross-sectional (y) axis. Since FIGS. 16A-16F are views taken along the y-axis, the sagittal line 279 appears as a point. The sagittal line 279 has a fixed location with respect to the rigid or semi-rigid solidification substrate 252. However, in preferred examples, the sagittal line 279 will traverse a trochoidal path when viewed along the y-axis during an object solidification operation and during the formation of a single layer of an object.

A tangent plane may be defined as a plane that is parallel to the x-y plane which is tangent to the rigid or semi-rigid solidification substrate 252. The tangent plane will intersect the rigid or semi-rigid solidification substrate along a line (the "tangent line" or "TL") that extends along the cross-sectional (y) axis. In preferred examples, the translation of the linear solidification device 242 along the travel (x) axis is coordinated with the movement of the rigid or semi-rigid solidification substrate such that the spatial relationship between the linear solidification device and the tangent line TL remains fixed during an object solidification operation. In a more preferred example, the linear solidification device 242 remains aligned with the tangent line TL in the y-z plane. In FIG. 16A, the linear solidification device 242 is at a first build envelope boundary where solidification of the solidifiable material can begin (e.g., build envelope boundary 343 of FIG. 11C). While linear solidification device 242 is at the build envelope boundary 343, the rigid or semi-rigid solidification substrate 252 is rotated so that the sagittal plane intersects the y-z plane at an angle that is $\Delta\phi$ radians counterclockwise of the y-z plane.

As the figures indicate, the tangent line TL moves in alignment with the linear solidification device 242 in a first direction along the travel (x) axis during an object solidification process (FIGS. 16A-16C). The tangent line TL also moves in alignment with the linear solidification device 242 in a second direction along the travel (x) axis during an object separation process (FIGS. 16D-16F). However, the alignment of the linear solidification device 242 and the tangent line TL are not critical during an object separation process. Nevertheless, it is often convenient to program a control computer or microcontroller that guides the movement of linear solidification device 242 and rigid or semi-rigid solidification substrate 252 so that the linear solidification device 242 and tangent line TL remain aligned along the travel (x) axis direction regardless of whether solidification or separation is occurring.

In FIGS. 16A-16C, the sagittal line 279 and rigid or semi-rigid solidification substrate axis of rotation $R_x$ move in first respective trochoidal paths in the x-z plane. In FIGS. 16A and 16F, the linear solidification device 242 is at a first build axis boundary within a build envelope (described above with respect to FIG. 11B). In FIGS. 16C and 16D, the linear solidification device 242 is at a second build axis boundary within the build envelope. The first and second build axis boundaries are spaced apart along the travel (x) axis and define the maximum travel (x) axis dimension of the three-dimensional object which can be constructed. Thus, sagittal line 279 and rotational axis $R_x$ move along the travel (x) axis, the build (z) axis, and rotate in the x-z plane during the object solidification process of FIGS. 16A-16C the object separation process of FIGS. 16D-16F.

In FIGS. 16A-16C, the sagittal line 279 and axis of rotation $R_x$ move in first respective trochoidal paths in the x-z plane. In FIGS. 16D-16F, the sagittal line 279 and axis of rotation $R_x$ move in second respective trochoidal paths in the x-z plane. In FIGS. 16A and 16F, the linear solidification device 242 is at a first build axis boundary within a build envelope (described above below with respect to FIG. 11B). In FIGS. 16C and 16D, the linear solidification device 242 is at a second build axis boundary within the build envelope. The first and second build axis boundaries are spaced apart along the travel (x) axis and define the maximum travel (x) axis dimension of the three-dimensional object which can be constructed. Thus, sagittal line 279 and rotational axis $R_x$ move along the travel (x) axis, the build (z) axis, and rotate in the x-z plane during the object solidification process of FIGS. 16A-16C the object separation process of FIGS. 16D-16F.

In order to describe the rigid or semi-rigid solidification substrate 252 movement in accordance with this example, it is convenient to define a trochoidal circle having a radius equal to the radius of curvature of the substrate lower surface 356. The trochoidal circle is considered to roll along the tangent plane that intersects the exposed object surface at the tangent line. If x represents the position of the fixed point along the planar surface and z represents the distance of the point from the surface as the circle rolls, the x and z positions relative to a starting position at 0, 0 which is in contact with the tangent plane surface (i.e., x=0 and z=0 is a point on the circle to which the plane along which the circle rolls is tangent) can be described using equations (1) and (2) above.

Unlike the example of FIGS. 2-6I, in certain preferred examples, the movement of the rigid or semi-rigid solidification substrate 252 is based on a trochoidal path in which both the radius of curvature a and the distance b remains constant during the build process. In certain preferred examples, after each layer of the three-dimensional object is built, the build platform 246 is lowered in the build (z) axis direction by an amount equal to the layer thickness $\Delta z$. However, in the example of FIGS. 15-17, the value of b does not change with the addition of each successive layer because the relationship between the substrate 252 and the tangent plane does not change. In contrast, when a curved build platform 44 is used, the build (z) axis spacing between the build platform 44 and the tangent plane changes by one layer thickness Δz each time a new layer is solidified, which in turn alters the value of b.

The movement of any point that lies at a fixed distance b from the center C of the trochoidal circle can be described using equations (1) and (2). For purposes of understanding the motion of rigid or semi-rigid solidification substrate 252 it is convenient to describe the movement of the rotational axis $R_x$ defined by the rotational motor (not shown in FIG. 15 but comprising part of the rotational apparatus 261) and the sagittal line 279. In equations (1) and (2), the movement of each of these lines $R_x$ and 279 (which appear as points when viewed in cross-section, as in FIGS. 16A-16F), will be based on the radius a defined by the radius of curvature of the lower rigid or semi-rigid solidification substrate surface 356. The values of b used for the sagittal line 279 and the rotational axis $R_x$ will differ from one another but will not change with the formation of each layer. With respect to the sagittal line 279, the value of b will equal the radius of curvature a of the lower surface 356 of rigid or semi-rigid solidification substrate 252. With respect to rotational axis $R_x$, the value of b will equal the difference between the length of radius a and the distance d between the rotational axis $R_x$ and the sagittal line 279 in the radial direction defined by lower surface 356 of rigid or semi-rigid solidification substrate 252. The value of b for the rotational axis $R_x$ will be smaller than the value of b for the sagittal line 279 by an amount equal to the distance between the rotational axis $R_x$ and the sagittal line 279 along the radial direction defined by the lower surface 356 of the rigid or semi-rigid solidification substrate 252.

Referring again to FIGS. 16A-16F, it is convenient to define a reference rotational orientation of the rigid or semi-rigid solidification substrate 252 as the orientation at which a plane tangent to lower surface 356 at sagittal line 279 is perpendicular to the build (z) axis and parallel to the x-y plane as illustrated in FIGS. 16B and 16E. Equations (1) and (2) are defined for a trochoidal circle that rolls along a plane (the "tangent plane") that is perpendicular to the build (z) axis and tangent to the most recently formed exposed surface of the three-dimensional object (or the object contacting surface 370 of the build platform 246 for the first layer of the object). In the reference orientation, the sagittal plane is parallel to the y-z plane and perpendicular to the x-y plane. Equations (1) and (2) are based on a trochoidal circle that rolls from a starting point at which the center C of the trochoidal circle and the rotational axis $R_x$ define a line that is parallel to the build (z) axis. A trochoidal circle starting at that position would roll in the clock-wise direction by $2\pi$ radians to reach the reference rotational orientation of FIG. 16B. As a result, when rigid or semi-rigid solidification substrate 252 is in the reference rotational orientation, the angle ø in equations (1) and (2) is 360 degrees or $2\pi$ radians because the point of interest (e.g., the sagittal line 79 or rotational axis $R_x$) is rotated 360° Or radians) from the reference position. As the linear solidification device 242 moves a distance $\Delta x_{LD}$ in the travel (x) axis direction, the tangent line TL moves by the same amount.

In equation (3), $\Delta x_{TL}$ is positive when moving in a first direction (e.g., left to right in FIGS. 16A-16C) along the travel (x) axis and negative when moving in a second direction (e.g., right to left in FIGS. 16D-16F) along the travel (x) axis. Sagittal plane angles of rotation ø that are counter-clockwise from the tangent line TL and the y-z plane are positive, and sagittal plane angles of rotation ø that are clockwise from the tangent line TL and the y-z plane are negative. As mentioned above, the angle ø is the angle of rotation of a trochoidal circle defined by the radius of curvature a of the lower surface 356 of build platform 252 relative to a starting position at which the sagittal plane is perpendicular to the tangent plane that defines the tangent line TL. It is convenient to define the angular position of the sagittal line 279 and the rotation axis $R_x$ relative to the build platform reference positions of FIGS. 16B and 16E, in which the plane tangent to the sagittal line 79 is perpendicular to the build (z) axis. In the reference orientation of FIGS. 6B and 6E, ø=360°=$2\pi$ radians. Thus, the angle of rotation (in radians) relative to the reference orientation can be defined by equation (4), described above.

In equation (4), angular positions that are counterclockwise from the tangent line TL and the y-z plane are positive, while those that are clockwise from the tangent line TL and the y-z plane are negative. Thus, in FIG. 16A $ø_R$ is positive, while in FIG. 16C, $ø_R$ will have a negative value.

A change in the relative angular orientation $ø_R$ can be defined by equation (5), described above. The rigid or semi-rigid solidification substrate 252 is rotated about rotational axis $R_x$ (FIG. 15) via the operation of rigid or semi-rigid solidification substrate rotational apparatus 261 such that the rotational orientation of the sagittal plane on which sagittal line 79 and rotation axis $R_x$ lie changes by an amount Δø in accordance with equation (3) and an amount $\Delta ø_R$ in accordance with equation (5). As it rotates from the rotational orientation of FIG. 16A, the rigid or semi-rigid solidification substrate 252 eventually reaches the reference rotational orientation of FIG. 16B. As the linear solidification device 242 continues to move in the travel (x) axis direction, the rigid or semi-rigid solidification substrate 242 continues to translate along the travel (x) axis and to rotate about the rotational axis $R_x$ until reaching the rotational orientation of FIG. 6D, at which point the linear solidification device 242 has completed its traversal of the build envelope 342 (FIG. 11B) in the travel (x) axis direction. As FIGS. 16A-C indicate, at each position along the travel (x) axis, the linear solidification device 242 remains aligned with the minimum build axis position ($z_{min}$) defined by the tangent line TL (which appears as a point in FIGS. 16A-16C because the length of the line is along the y-axis).

In preferred examples, the minimum build axis position $z_{min}$ of the trochoidal circle defined by the radius of curvature a of the lower surface 356 of rigid or semi-rigid solidification substrate 252 is maintained at a fixed position (and distance Δz) relative to the exposed surface 264 of the three-dimensional object 259 (FIG. 15), which ensures that the thickness of unsolidified solidifiable material at the location of solidification remains constant during the formation of each part of a layer and each layer of an object. In the same or other examples, the spacing along the z-axis between the linear solidification device 42 and the most recently solidified exposed surface 264 of the object 259 (FIG. 15) is also held constant.

In FIGS. 16D-16F, the motion of the rigid or semi-rigid solidification substrate 252 is reversed, and the substrate 252 travels in a second direction along the travel (x) axis that is opposite the first direction in which it travels in FIGS. 16A-16C. In the example of FIGS. 16D-16F, linear solidification device 242 does not supply solidification energy to the solidifiable material 50 when traveling in the second direction. FIGS. 16D-16F define a separation operation (although the object is not visible) in which solidified object material is separated from the solidification substrate 252 and any film(s) or resilient coatings disposed on the lower surface 356 of substrate 252 (if present). Because of the trochoidal path of sagittal line 79, the separation forces at each moment are concentrated along tangent line TL of the trochoidal circle. Because the separation forces are concentrated along a line instead of a larger surface area of the object being built, separation forces will not tend to limit the x-y area of the object that can be built.

As with the example of FIGS. 2-6I, equations (1) and (2) can be modified to yield equation (6) which uses the angular rotation relative to the non-rotated position of FIGS. 16B and 16E (i.e., to use $ø_R$) to calculate the distance that the sagittal line 279 travels along the travel (x) axis as the sagittal line 279 is rotated from a first angular position $ø_{R1}$ to a second angular position $ø_{R2}$. In equation (6), the center of the circle of radius a remains at a fixed position along the build (z) axis during the formation of each layer of a three-dimensional object. Thus, the value of a will remain constant for the formation of each layer. For any particular point of interest (e.g., the sagittal line 279 or rotational axis $R_x$) its corresponding value of b will also remain constant for the formation of each layer. When the rigid or semi-rigid solidification substrate 252 is rotated counter-clockwise relative to the x-y plane, the sagittal plane will be rotated counterclockwise relative to the tangent line TL and the y-z plane, and $ø_R$ will be positive (FIGS. 16A and 16F). When the rigid or semi-rigid solidification substrate 252 is rotated clock-wise relative to the x-y plane, the sagittal plane will be rotated clockwise relative to the tangent line TL and the y-z plane, and $ø_R$ will be negative (FIGS. 16C and 16D).

Equation (6) can be modified to describe the trochoidal path of other fixed points of interest. For example, the equation can be used to describe the travel (x) axis path of the rotation axis $R_x$. In that case, the value of b would be the distance from the center of the trochoidal circle of radius a to the axis of rotation $R_x$ along the radial direction. The length of a will again equal the length of the radius of curvature of lower surface 356 of rigid or semi-rigid solidification substrate 252 during the formation of each layer of the three-dimensional object.

In certain examples of making a three-dimensional object herein, the values of $\Delta$x calculated from equation (6) are used to guide the movement of the rigid or semi-rigid solidification substrate travel axis translation motor (not shown but part of the travel axis translation assembly 287 in FIG. 15).

FIG. 16G illustrates the relationship between the angle of rotation $\Delta ø_R$ of the sagittal plane relative to the y-z plane and the rotation of the rigid or semi-rigid solidification substrate 252 relative to the non-rotated reference orientation of FIG. 16B. The sagittal plane bifurcates the lower surface 356 of rigid or semi-rigid solidification substrate 252 and includes the center C of the trochoidal circle as well as the sagittal line 279 and the rotation axis $R_x$. The rigid or semi-rigid solidification substrate 252 shown in the reference (non-rotated) orientation in solid lines and in a rotated orientation in dashed lines. The rigid or semi-rigid solidification substrate 252 rotates about the rotational axis $R_x$ such that the sagittal plane defining sagittal line 279 is rotated by an amount $\Delta ø$ relative to the reference orientation. As the figure illustrates, the change in rotational position of the sagittal plane relative to the x-y plane ($\Delta ø$) equals the angle of rotation ($ø_R$) of the sagittal plane (on which rotation axis $R_x$ and sagittal line 279 lie) relative to the y-z plane. Thus, the angle of rotation predicted by the equations of a trochoid can be used to determine the rotation of the rotational motor comprising part of the rotational assembly 261 (FIG. 15).

If the sagittal line 279 traverses a trochoidal path in the x-z plane, equation (2) can be modified to yield equation (7) to determine the change in build (z) axis position of the sagittal line 279 as the rigid or semi-rigid solidification substrate 279 rotates from one angular position relative to the reference position (FIGS. 16B and 16E) to another angular position relative to the reference position.

In equation (7), the center of the circle of radius a remains at a fixed position along the build (z) axis during the formation of each of the layers of a three-dimensional object. Thus, the values of a and b remain constant during the formation of each of the layers of the three-dimensional object, and the value of b for the sagittal line 279 will equal the radius a. As with equation (6), when the rigid or semi-rigid solidification substrate 252 is rotated counter-clockwise relative to the x-y plane, the sagittal plane will be rotated counterclockwise relative to the tangent line TL and the y-z plane, and the value of $ø_R$ in equation (7) will be positive (FIGS. 16A and 16C). When the rigid or semi-rigid solidification substrate 259 is rotated clock-wise relative to the x-y plane, the sagittal plane will be rotated clockwise relative to the tangent line TL and the y-z plane, and the value of $ø_R$ in equation (7) will be negative (FIGS. 16C and 16D).

As with equation (6), equation (7) can be modified to determine the change in the rotational axis $R_x$ position as the rigid or semi-rigid solidification substrate 252 rotates from $ø_{R1}$ to $ø_{R2}$. In that case, the value of b would equal the difference between the length of radius a and the distance between the axis of rotation $R_x$ and the sagittal line 279 in the radial direction.

Referring again to FIG. 16G, the radius a used in equations (1) to (4) is the radius of curvature of the lower surface 356 of the rigid or semi-rigid solidification substrate 252. Using equation (8), the radius a can be determined from the sagittal height h defined by the lower surface 356 and the width w of the build platform along the direction of curvature (i.e., the width w is the chord length defined by lower surface 356).

In FIG. 16A, the sagittal line 279 is at an initial position corresponding to the position of linear solidification device 242 at which solidification may first begin along the travel axis (i.e., linear solidification device 242 and tangent line TL are at the build envelope border 343 of FIG. 11B as discussed previously). At this initial position, the plane tangent to the sagittal line 279 is rotated counter-clockwise by an angle $ø_R$ relative to the reference orientation of FIG. 16B. The angle $ø_R$ is also the angle of rotation of the trochoidal circle of radius a in the orientation of FIG. 16A relative the orientation of FIG. 16B. Thus, in FIG. 16A, $ø_R$ is positive and equals $2\pi$-ø.

In FIG. 16B, the rigid or semi-rigid solidification substrate 252 is in the non-rotated orientation at which $ø_R$ is zero and $ø=2\pi$. The position of tangent line TL along the travel (x) axis is the mid-point of the build envelope 342 length in the travel (x) axis direction (FIG. 11B). In FIG. 16C, the rigid or semi-rigid solidification substrate 252 completed its traversal in the travel (x) axis direction. The value of $ø_R$ is negative in the orientation of FIG. 16C and equals $2\pi$-ø.

Figure 17:
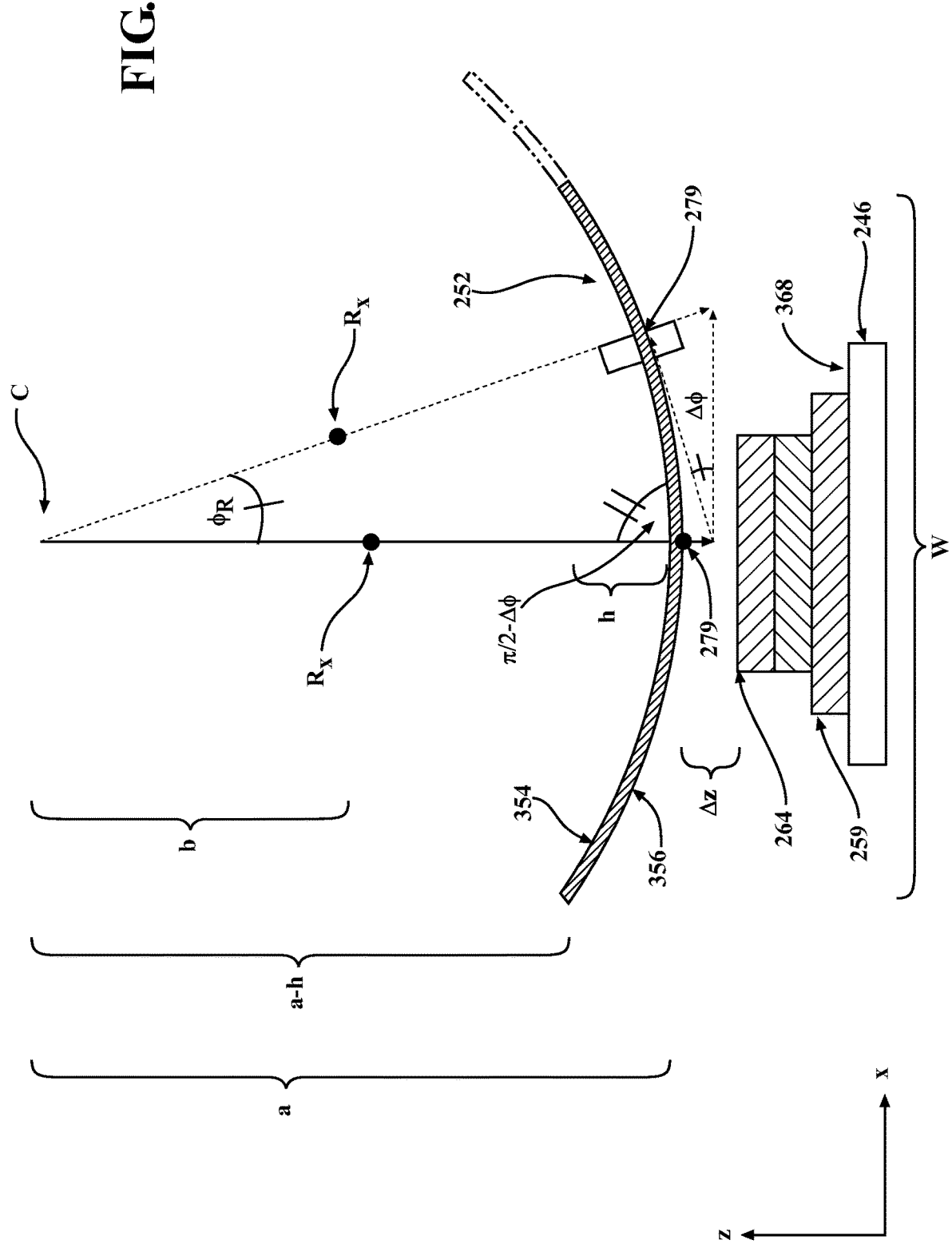
FIG. 17 is a schematic view of two rotational positions of the rigid or semi-rigid solidification substrate of the system of FIG. 15 used to illustrate the rotational relationship between the movement of a point on a trochoidal circle and the rotational orientation of the rigid or semi-rigid solidification substrate.

The methods of 12A-12B and 14A-14B may be modified for use with curved rigid or semi-rigid solidification substrate apparatuses, such as those depicted in FIGS. 15-17. The manipulations of the build platform described in FIGS. 12A-12B and 14A-14B are carried out on rigid or semi-rigid solidification substrate 252. The build platform 246 is moved downward by one layer thickness along the build (z) axis after each layer of the object is formed but is not be translated along the travel (x) axis or rotated about an axis parallel to the scanning (y) axis. Referring to FIG. 12A, in step 1010 the layer index k is initialized. In step 1012 the radius a of a trochoidal circle defined by the lower surface 356 of rigid or semi-rigid solidification substrate 252 is calculated from the values of h and w (see FIG. 17). In step 1014 the layer thickness is read. However, the layer thickness will not be used as a value of Δb in step 1043 because that step is not used in this example. Instead, the value of b remains constant during the entire object build process.

In step 1016 the value of b is calculated from the trochoidal circle radius a and the distance between the rotation axis $R_x$ and the sagittal line 279 along the radial direction of he trochoidal circle. In step 1018, the value of $ø_{Ri}$ when linear solidification device 242 is at the travel (x) axis border 343 (FIG. 11B) is read. The angle $ø_{Ri}$ can also be pre-set in the computer or microcontroller.

In step 1020, linear solidification device 242 is advanced in a first direction along the travel (x) axis to a position within build envelope 342 (FIG. 11B). In step 1022, the distance of movement of the tangent line ($\Delta x_{TL}$) from the build envelope border 343 is determined. As mentioned above, the tangent line TL is maintained in alignment with the linear solidification device 242 along the travel (x) axis. Therefore, equation (3) can be used to calculate the change in the angle of rotation of the trochoidal circle of radius a for a given distance of travel ($\Delta x_{TL}$) of the tangent line TL along the travel (x) axis. If the tangent line moves by an amount $\Delta x_{TL}$ in the positive direction (to the right in FIGS. 16A-16C), the angular rotation of the trochoidal circle will change in radians by an amount equal to $-\Delta x_{TL}/a$. In step 1024, the new angle of rotation relative to the reference position of FIGS. 16B and 16E can be determined using equation (13).

In step 1025 equation (6) is used to calculate distance $\Delta x_j$ that the rotational axis $R_x$ moves along the travel axis using the initial angle of rotation $ø_{Ri}$, the current angle of rotation $ø_{Rj}$, the radius a and the distance b between the rotational axis $R_x$ and the center C of the trochoidal circle. In step 1026, equation (7) is used to calculate the distance $\Delta z_j$ that the rotational axis $R_x$ moves along the build (z) axis using the initial angle of rotation $ø_{Ri}$ and the current angle of rotation $ø_{Rj}$.

In step 1028, the rigid or semi-rigid solidification substrate rotational apparatus 261 is operated to rotate the substrate 252 to the current angle of rotation $ø_{Rj}$. In step 1030 the rigid or semi-rigid solidification substrate travel axis translation apparatus 287 is operated to translate the rotational axis $R_x$ to the position $\Delta x_j$ (i.e., the position of rotational $R_x$ along the travel (x) axis relative to a starting point when the tangent line TL and linear solidification device 242 are at the build envelope border 343). In step 1032 the rigid or semi-rigid solidification substrate build axis translation apparatus 289 is operated to translate the rotational axis $R_x$ to a position $\Delta z_j$ (i.e., the build axis position relative to a starting point when the tangent line TL and linear solidification device 242 are at the build envelope border 343). Although depicted as discrete, sequential steps, steps 1028, 1030, and 1032 may occur simultaneously or substantially simultaneously so that the rigid or semi-rigid solidification substrate moves in multiple dimensions at the same time or substantially the same time.

In step 1036, the set of object string data is read for the travel axis position that is located at $\Delta x_{TL}$ from the build envelope border 343. In step 1038, solidification energy is supplied along the scanning (y) axis in correspondence with the set of string data.

In step 1040, the method determines whether the linear solidification device 242 has reached an end of travel (EOT) position along the first travel (x) axis direction. If it has not, control transfers to step 1020, and steps 1020 to 1038 are repeated for the remaining $\Delta x_{TL}$ increments for j=1 to $j_{max}$ along the travel (x) axis. If the linear solidification device 242 has reached the end of travel (or in some examples, build envelope border 345), control transfers to step 1042 in FIG. 12B.

In step 1042, the linear solidification device 242 is translated in a second direction along the travel (x) axis. In certain examples, the linear solidification device 42 may be translated through the right-hand offset distance 6R and then back to the build envelope border 345 in step 1042. However, in step 1042 linear solidification device 242 is translated within build envelope 342 by an amount $\Delta x_j$ from build envelope border 345. In step 1043, the build platform is lowered (using a build platform build axis motor that is not shown) by the layer thickness. However, the value of b is not changed.

In step 1044, the distance of the tangent line TL from the build envelope border 345 ($\Delta x_{TL}$) is determined based on the distance between the linear solidification device 242 and the build envelope border 345. When moving in the second direction (as illustrated in FIGS. 6D-6F), the value of $\Delta x_{TL}$ is negative. In step 1046 the current value of the angle of rotation $ø_{Rj}$ relative to the reference orientation is determined using equation (13) from the initial angle of rotation at build axis border 345 ($ø_{Ri}$) and the value of $\Delta x_{TL}$. When moving in the second direction, $\Delta x_{TL}$ will have a negative value. As a result the calculated values of $ø_{Rj}$-$ø_{Ri}$ will be positive.

The value of the travel (x) axis position of the rotational axis $R_x$ relative to its travel axis starting position (i.e., the travel (x) axis position of rotational axis $R_x$ when the tangent line TL and linear solidification device 242 are both at build envelope boundary 345) is determined in step 1047 from the values of $ø_{Ri}$, $ø_{Rj}$, a, and b using equation (6). The value of the build (z) axis position of the rotational axis $R_x$ relative to its starting position (i.e., the build (z) axis position of the rotational axis $R_x$ when the tangent line TL and linear solidification device 242 are both at build envelope boundary 345) is determined in step 1048 using equation (7). In step 1050 the rigid or semi-rigid solidification substrate rotation apparatus 261 is operated to rotate the rigid or semi-rigid solidification substrate 252 the angle of rotation $ø_{Rj}$ relative to the non-rotated reference position of FIG. 16E. In step 1052 the rigid or semi-rigid solidification substrate travel axis translation apparatus 287 is operated to move the rotational axis $R_x$ to the position $\Delta x_j$, and in step 1054 the build axis translation apparatus 289 is operated to move the rotational axis $R_x$ to the position $\Delta z_j$. Steps 1050-1054 may be carried out simultaneously or substantially simultaneously. In step 1056 the method determines whether the linear solidification device 242 has reached its end of travel (EOT) in the second travel (x) axis direction. If not, control transfers to step 1042, and steps 1042 to 1054 are repeated for the remaining $\Delta x_{TL}$ increments for j=1 to $j_{max}$ along the travel (x) axis. Otherwise, control transfer to step 1058, in which it is determined if the value of the current layer index k equals the value of the maximum layer index $k_{max}$. If the current layer index k is equal to the maximum layer index $k_{max}$, the three-dimensional object is complete, and the method ends. Otherwise, the layer index is incremented in step 1059 and control transfers to step 1020.

The method of FIGS. 14A-14B can also be modified for use with apparatuses that include curved rigid or semi-rigid solidification substrates such as substrate 252. In accordance with the method, a layer index is initialized to a value of zero in step 1062. In step 1064, the radius a of a trochoidal circle on which the lower surface 356 of rigid or semi-rigid solidification substrate 252 lies is calculated based on the sagittal height h and the width w of substrate 252, as shown in FIG. 17. Alternatively, the radius a can be calculated and stored beforehand without being calculated for the performance of an individual object solidification operation. In step 1066 the layer thickness is read. However, the layer thickness will not be used to adjust the value of b because in this example step 1096 is eliminated.

The value of b in equations (6) and (7) is determined in step 1068 by subtracting the distance d between the rotational axis $R_x$ and the sagittal line 279 along the radial direction of the lower surface 256 of rigid or semi-rigid solidification substrate 252 from the length of radius a. A timer is initialized to a value of $t_{initial}$ in step 1070. In certain examples, the value of $t_{initial}$ is selected based on the starting angular orientation of the sagittal plane when the linear solidification device 242 is at the build envelope border 343. An exemplary method for selecting the initial time $t_{initial}$ is provided previously with respect to equation (17). The time value is then incremented by a selected time increment Δt in step 1071.

Starting at an initial position such as the one depicted in FIG. 16A, the linear solidification device 242 begins to move at a constant or substantially constant velocity $v_x$ in a first direction along the travel (x) axis in step 1072. The desired tangent line velocity $v_{TL}$ is set equal to the linear solidification device constant velocity $v_x$ in step 1074. The rigid or semi-rigid solidification substrate travel axis translation apparatus 287, build axis translation apparatus 289 and rotational apparatus 261 are manipulated to move the tangent line TL at the same velocity such that the tangent line TL and linear solidification device 242 remain in alignment along the travel (x) axis as the linear solidification device 242 moves along the travel (x) axis.

If tangent line TL moves at a constant velocity $v_{TL}$ along the travel axis, the rate of angular rotation (in radians per unit second) of the trochoidal circle of radius a can be calculated using equation (14) as described above (step 1076). The angular rotational velocity of the rigid or semi-rigid solidification substrate 252 ω about axis of rotation $R_x$ equals the angular rotational velocity of the sagittal plane (and hence axis of rotation $R_x$ and sagittal line 279 because they lie in the sagittal plane) about the center of the trochoidal circle. Because the tangent line velocity $V_{TL}$ is constant, the angular rotational velocity ω is also constant. In step 1078, the velocity of the rotation axis $R_x$ in a direction along the travel (x) axis at a time t can be determined using equation (15).

Equation (15) can be used to determine the velocity along the travel (x) axis of any point that is fixed relative to the center of the trochoidal circle by using the appropriate value of b. In the case of sagittal line 279, the value of β equals the radius a. In the case of the rotational axis $R_x$, the value of b equals the length of the radius a minus the distance between the rotational axis $R_x$ and the sagittal line 279 in the radial direction of the lower surface 356 of rigid or semi-rigid solidification substrate 252.

In step 1080 the velocity of the rotation axis $R_x$ in a direction along the build (x) axis at a time is determined using equation (16). In step 1082, the angular velocity of rotational axis $R_x$ is adjusted to the value w determined in step 1076 by adjusting the operation of the rigid or semi-rigid solidification substrate rotational apparatus 261. In step 1084, the translational velocity of the rotational axis $R_x$ along the travel (x) axis is adjusted to the value dx/dt determined in step 1078 by adjusting the operation of travel axis translation apparatus 287. The translational velocity of the rotational axis $R_x$ along the build (z) axis is adjusted in step 1086 to the value dz/dt determined in step 1080 using the build axis translation apparatus 289. Steps 1082-1086 may be carried out simultaneously or substantially simultaneously.

In step 1088, solidification energy is supplied along the scanning (y) axis at the travel (x) axis location of the tangent line ($x_{TL}$) corresponding to the current time value tin accordance with the corresponding object data string. In accordance with the method, it is determined whether the linear solidification device 242 has reached its end of travel (EOT) in the first direction along the travel (x) axis in step 1090. If it has not, control transfers to step 1071, the value of the current time t is incremented by a selected time increment Δt, and steps 1072-1088 are repeated. Otherwise, control transfers to step 1094 in FIG. 14B.

FIG. 14A describes an object solidification operation such as the one illustrated in FIGS. 16A-16C. FIG. 14B describes on object separation operation. In step 1094, the linear solidification device 242 advances in a second direction along the travel (x) axis at a velocity of $-v_x$. In step 1096 the build platform is lowered by an amount equal to the layer thickness, but in this example the value of b is not adjusted. A timer is initialized to a value of $t_{initial}$ in step 1098 and is then incremented by the selected time increment Δt in step 1099. In certain examples, the value of $t_{initial}$ is selected based on the starting angular orientation of the sagittal plane when the linear solidification device 242 is at the build envelope border 345. An exemplary method for selecting the initial time $t_{initial}$ is provided above with respect to equation (17). As with the object solidification operation of FIG. 14A, in the object separation operation the linear solidification device 242 is maintained in alignment with the tangent line TL along the travel (x) axis. However, it is not critical to maintain their alignment during an operation separation operation.

In step 1100, the velocity of the tangent line $V_{TLx}$ is set equal to the velocity $-v_x$ of the linear solidification device 242 along the travel (x) axis. The angular velocity ω corresponding to $V_{TLx}$ is determined in step 1102 using equation (14). The translational velocity of the rotation axis $R_x$ along the travel (x) axis is determined in step 1104 with equation (15). In step 1106, the translational velocity of the rotation axis $R_x$ along the build (z) axis is determined using equation (16).

In step 1108, the rotational apparatus 261 is operated to rotate the rigid or semi-rigid solidification substrate at the angular velocity ω determined in step 1102. The travel axis translation apparatus 287 is adjusted in step 1110 to the speed dx/dt determined in step 1104. The build platform translation apparatus 289 is adjusted in step 1112 to the speed dz/dt determined in step 1106.

In step 1114, a determination is made as to whether the linear solidification device 242 has reached its end of travel in the second direction along the travel (z) axis. If it has not, control transfers to step 1099 and steps 1099-1112 are repeated. Otherwise, control transfers to step 1118 in which the current layer index k is compared to the maximum layer index value $k_{max}$. If the current layer index value k has reached the maximum value $k_{max}$, the object formation is complete, and the process ends. Otherwise, control transfers to step 1120, and the layer index is incremented by one. Control then transfers to step 1070 (FIG. 14A) so that the next layer of the object can be formed.

As with linear solidification device 42, linear solidification device 242 may be configured in a number of ways. In certain examples, the linear solidification device 242 progressively exposes portions of the solidifiable material to solidification energy in a scanning (y) axis direction as the linear solidification device 242 device moves along the travel (x) axis direction. In other examples, a generally, or preferably substantially, linear pattern of solidification energy is applied in a single exposure along one direction as the device moves in another direction. The solidification energy may comprise electromagnetic radiation. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application. In preferred embodiments, linear solidification device 242 includes a linear scanning device, and solidification energy is "scanned" in a scanning direction that defines a scanning axis (i.e., the y-axis) as the linear solidification device 242 moves in a direction along the travel (x) axis. Preferably, the linear solidification device 242 is not itself moved in the y-direction as this occurs. The sequential linear scans in the scanning axis direction may be referred to as "linear scanning operations" herein Example 1

An example of the trochoidal movement of the rotational axis $R_x$ as the platform rotates from an initial position to a non-rotated reference position (at which the plane tangent to the sagittal line 79 is perpendicular to the build (z) axis) will now be described with reference to FIGS. 6A-6C and equations (6)-(7). In accordance with the example, no solidifiable material has yet been solidified on the lower surface 46. The build platform lower surface 46 has a radius of curvature of a=25 inches (635 mm) which is the radius of the trochoidal circle on which the lower build platform surface 46 lies during the formation of the first object layer. The distance d from the axis of rotation $R_x$ to the sagittal line 79 along the radial direction defined by lower build platform surface 46 is 10 inches (254 mm). Thus, the initial value of b=a−d=15 inches (381 mm). The starting angular orientation (FIG. 6A) of the build platform 44 relative to the reference orientation of FIG. 6B when the linear solidification device 42 is at the build axis border 343 is $\emptyset_{R1}=+10°=+\pi/18$ radians. With respect to equation (1), $\emptyset_1=2\pi-\pi/18=35\pi/18$ radians. The angular orientation $\emptyset_{R2}$ at the reference orientation is 0 (i.e., ø2=2π radians). At the initial rotational orientation of $\emptyset_{R1}$, the portion of the build platform (i.e., the tangent line TL) lying at the lowest position along the build (z) axis (shown as $z_{min}$ in FIG. 6A) is at the border 343 of the build envelope as is the linear solidification device 42.

The distance that the tangent line TL will travel along the travel (x) axis as the build platform 44 rotates from $\emptyset_{R1}$ to $\emptyset_{R2}$ can be calculated using equation (3) as follows:

$$\Delta x_{TL}=-a(0-\emptyset_{R1})=635 \text{ mm}(\pi/18)=110.8 \text{ mm}=4.36 \text{ inches}$$

The distance that the rotational axis $R_x$ will move as the tangent line moves the distance $\Delta x_{TL}$ can be calculated using equation (6) as follows:

$$\Delta x=635 \text{ mm}[\pi/18-0]+381 \text{ mm}[\sin(2\pi-\pi/18)-\sin(2\pi)]$$

$$\Delta x=635 \text{ mm}(\pi/18)+381 \text{ mm}[\sin(35\pi/18)]$$

$$\Delta x=110.83 \text{ mm}-66.16 \text{ mm}=44.67 \text{ mm}$$

Thus, build platform travel axis translational motor 80 will be operated to translate the rotational axis $R_x$ of rotational motor 86 by 44.67 mm in order to move the build platform 44 from the orientation of FIG. 6A to the orientation of FIG. 6B. In the example of FIGS. 6A-6C, the non-rotated orientation of FIG. 6B occurs when the linear solidification device 42 is at the mid-point of the build envelope along the travel (x) axis. Therefore, to move the build platform from the orientation of FIG. 6B to the orientation of FIG. 6C, build platform travel axis translation motor 80 will be operated to translate the rotational axis $R_x$ by an additional 44.67 mm.

The movement of the rotational axis $R_x$ along the build (z) axis as the linear solidification device 42 moves along the travel (x) axis from the position of FIG. 6A to the position of FIG. 6B can be determined from equation (7) as follows:

$$\Delta z=381 \text{ mm}[\cos(2\pi-\pi/18)-\cos(2\pi)]$$

$$\Delta z=381 \text{ mm}[\cos(35\pi/18)-1]=-5.79 \text{ mm}$$

Thus, build platform build axis translation motor 125 will be operated to move the rotational axis $R_x$ downward by 5.79 mm along the build (z) axis in order to move the build platform 44 from the orientation of FIG. 6A to the orientation of FIG. 6B. The build platform build axis translation motor 125 will be operated to translate the rotational axis $R_x$ upward by 5.79 mm in order to move the build platform 44 from the orientation of FIG. 6B to that of FIG. 6C. In actual operation, the travel axis position Δx and the build axis position Δz would be recalculated at small rotational angle increments (e.g., $\Delta\emptyset_R$=0.1 radians), and the motors 80 and 125 would be operated to adjust the rotational axis $R_x$ position along the travel and build axes at each rotational angle increment in accordance with equations (6) and (7).

Example 2

An example of the trochoidal movement of rotational axis $R_x$ as the platform rotates from an initial position to a non-rotated reference position (at which the plane tangent to the sagittal line 79 is perpendicular to the build (z) axis) will now be described with reference to FIGS. 6A-6C and equations (14)-(16). In accordance with the example, no solidifiable material has yet been solidified on the lower surface 46. The build platform lower surface 46 has a radius of curvature of a=25 inches (635 mm) which is the radius of the trochoidal circle on which the lower surface 46 lies during the formation of the first object layer. The distance d from the axis of rotation $R_x$ to the sagittal line 79 along the radial direction defined by lower build platform surface 46 is 10 inches (254 mm). Thus, the initial value of b=a−d=15 inches (381 mm). The starting angular orientation (FIG. 6A) of the build platform 44 relative to the reference orientation of FIG. 6B when the linear solidification device 42 is at the build axis border 343 is $\emptyset_{R1}=+10°=+\pi/18$ radians. The linear solidification device 42 will travel at a constant rate of 1 inch/sec (25.4 mm/sec) from build axis border 343 (FIG. 6A) to the mid-point of the build envelope along the travel (x) axis (FIG. 6B). The build platform 44 will be manipulated so that the tangent line TL moves at the same rate as the linear solidification device 42 along the travel (x) axis, i.e., $v_{TL}$=25.4 mm/sec. Thus, the angular velocity ω required to obtain the tangent line velocity $V_{TL}$ can be calculated from equation (14) as follows:

$$\omega = (1/635 \text{ mm})(25.4 \text{ mm/sec}) = 0.04 \text{ radians/sec}$$

As indicated in Example 1, the build envelope length is 2(110.8 mm)=221.6 mm. Thus, the linear solidification device will travel from the position of FIG. 6A to that of FIG. 6B in 110.8 mm/(25.4 mm/sec)=4.36 sec. The initial time value used in equations (15) and (16) may be calculated from equation (17) as follows:

$$t_{initial} = (2\pi - \pi/18)/0.04/\text{sec} = 152.72 \text{ sec}.$$

Thus, the initial velocity of the rotational axis $R_x$ in along the travel (x) axis when the linear solidification device 42 is at build envelope border 343 (FIG. 6A) can be determined from equation (15) as follows:

$$dx/dt = 0.04/\text{sec}[635 \text{ mm} - 381 \text{ mm}[\cos(0.04/\text{sec} \times 152.72 \text{ sec})]]$$

$$dx/dt = 0.04/\text{sec}[635 \text{ mm} - 375 \text{ mm}] = 10.39 \text{ mm/sec}$$

Thus, at the initial orientation of FIG. 6A, build platform travel axis translation motor 80 would be operated to translate the rotation axis $R_x$ at 10.39 mm/sec along the travel (x) axis. The initial velocity of the rotational axis $R_x$ in along the build (z) axis when the linear solidification device 42 is at build envelope border 343 (FIG. 6A) can be determined from equation (16) as follows:

$$dz/dt = 381 \text{ mm}(0.04/\text{sec})[\sin(0.04/\text{sec} \times 152.72 \text{ sec})]$$

$$dz/dt = 381 \text{ mm}(0.04/\text{sec})[-0.1735] = -2.64 \text{ mm/sec}$$

Thus, at the initial orientation of FIG. 6A, build platform build axis translation motor 125 would be operated to translate the rotational axis $R_x$ along the build (z) axis at −2.64 mm/sec. When the build platform 44 reaches the non-rotated reference orientation of FIG. 6B, the elapsed time from the starting position of FIG. 6A can be determined from the angular rotation and the angular speed as follows:

$$\Delta t = \pi/18/(0.04/\text{sec}) = 4.36 \text{ sec}.$$

Equation (15) can be used to determine the velocity of the rotation axis $R_x$ along the travel (x) axis at the orientation of FIG. 6B as follows:

$$dx/dt = 0.04/\text{sec}[635 \text{ mm} - 381 \text{ mm}[\cos(0.04/\text{sec}(152.72 \text{ sec} + 4.36 \text{ sec}))]$$

$$dx/dt = 10.16 \text{ mm/sec}$$

Equation (16) can be used to determine the velocity of the rotation axis $R_x$ along the build (z) axis at the orientation of FIG. 6B as follows:

$$dz/dt = 381 \text{ mm}(0.04/\text{sec})[\sin(0.04/\text{sec})(152.72 \text{ sec} + 4.36 \text{ sec}))]$$

$$dz/dt = 0$$

Thus, at the non-rotated reference orientation of FIG. 6B, the build platform travel axis translation motor 80 would be operated to translate rotational axis $R_x$ along the travel (x) axis at 10.16 mm/sec. The build platform build axis translation motor 125 would momentarily have a zero velocity as the motor changed the direction of translation from the downward direction to the upward direction. In actual operation, the values of dx/dt and dz/dt would be calculated at small time increments Δt (e.g., every 0.1 second), and the speeds of motors 80 and 125 would be adjusted at each increment in accordance with equations (15) and (16).

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. For example, while the systems, methods, and examples described herein have been illustrated by way of an "upside down" build process, they are equally applicable to "right-side up" build processes, including those in which the build platform curved surface faces upward and the build platform is progressively immersed downward into a supply of solidifiable material during an object building process.

In addition, systems for manufacturing three-dimensional objects of the type described herein may be configured with a solidification substrate that is curved and a build platform that is planar. In such cases, the solidification substrate would pivot about an axis parallel to the scanning (y) axis as the linear solidification device 42 moves along the travel (x) axis. The build platform would translate along the build (z) axis but not along the travel (x) or scanning (y) axis. The scope of the invention is defined by the appended claims and their equivalents, rather than by the preceding description.

What is claimed is:

1. A method of forming a layer of a three-dimensional object from a solidifiable material, the method comprising:
   supplying solidification energy to the solidifiable material;
   translating a rigid or semi-rigid solidification substrate that is transparent and/or translucent along a travel axis, wherein the rigid or semi-rigid solidification substrate has a curved surface with a direction of curvature along the travel axis;
   rotating the rigid or semi-rigid solidification substrate about an axis of rotation;
   translating the rigid or semi-rigid solidification substrate along a build axis, and moving the rigid or semi-rigid solidification substrate such that the substrate's axis of rotation moves along a trochoidal path.

2. The method of claim 1, wherein during the step of translating a rigid or semi-rigid solidification substrate along the travel axis, each point on the curved surface traverses a trochoidal path.

3. The method of claim 1, wherein the curved surface of the rigid or semi-rigid solidification substrate has a mid-point along the direction of curvature, the curved surface includes a sagittal plane defining a sagittal line extending along a cross-sectional axis at the mid-point along the direction of curvature, and the method further comprises forming an object layer such that the rigid or semi-rigid solidification substrate rotates about the axis of rotation from a first angle of rotation to a second angle of rotation as the sagittal line travels a distance Δx along the travel axis, and the distance Δx is related to the first and second angles of rotation as follows:

$$\Delta x = a[\varnothing_{R1} - \varnothing_{R2}] + b[\sin(2\pi - \varnothing_{R1}) - \sin(2\pi - \varnothing_{R2})]$$

wherein, Δx=change in position of the sagittal line along the travel axis from a first position $x_1$ to a second position $x_2$;

$\varnothing_{R1}$=the first angle of rotation of the rigid or semi-rigid solidification substrate when the sagittal line is at the first travel axis position $x_1$ relative to a reference angle of rotation at which the sagittal plane is parallel to the build axis;

$\emptyset_{R2}$=the second angle of rotation of the rigid or semi-rigid solidification substrate when the sagittal line is at the second travel axis position $x_2$ relative to the reference angle of rotation;

a=the length of the radius of curvature of the curved surface of rigid or semi-rigid solidification substrate; and b=the distance between the sagittal line and the center of a circle of radius a defined by the curved surface along the radial direction of the circle.

4. The method of claim 3, wherein during the step of forming an object layer, the sagittal line moves a distance $\Delta z$ along the build axis as the rigid or semi-rigid solidification substrate rotates about the axis of rotation from the first angle of rotation to the second angle of rotation, and the distance $\Delta z$ is related to the first and second angles of rotation as follows:

$$\Delta z = b[\cos(2\pi - \emptyset_{R1}) - \cos(2\pi - \emptyset_{R2})]$$

wherein, $\Delta z$=the distance traveled by the sagittal line along the build axis from a first position $z_1$ to a second position $z_2$;

$\emptyset_{R1}$=the first angle of rotation of the rigid or semi-rigid solidification substrate when the sagittal line is at the first build axis position $z_1$ relative to the reference angular orientation at which the sagittal plane is parallel to the build axis;

$\emptyset_{R2}$=the second angle of rotation of the rigid or semi-rigid solidification substrate when the sagittal line is at the second build axis position $z_2$ relative to the reference angle of rotation;

a=the length of the radius of curvature of the curved surface of the rigid or semi-rigid solidification substrate; and b=the distance between the sagittal line and the center of a circle of radius a defined by the curved surface along the radial direction of the circle.

5. The method of claim 1, wherein the curved surface has a mid-point along the direction of curvature, the curved surface includes a sagittal plane defining a sagittal line extending along a cross-sectional axis at the mid-point along the direction of curvature, and the method further comprises forming an object layer such that the sagittal line moves along the travel axis at a velocity that is related to a constant angular speed at which the rigid or semi-rigid solidification substrate rotates about the axis of rotation in accordance with the following relationship:

$$dx/dt = \omega(a - b[\cos(\omega t)])$$

wherein, dx/dt is the velocity of the sagittal line along the travel axis (mm/sec);

$\omega$=angular rotational velocity of the rigid or semi-rigid solidification substrate (radians/sec);

a=the length of the radius of curvature defined by rigid or semi-rigid solidification substrate (mm); and b=the distance between the center of a trochoidal circle defined by the radius of curvature of the curved rigid or semi-rigid solidification substrate and the sagittal line along the radial direction of the circle (mm); and t=time (sec) required for a trochoidal circle of radius a to rotate at the angular rotational velocity $\omega$ from a reference position at which the sagittal plane is parallel to the build axis to a current angular orientation of the sagittal plane.

6. The method of claim 5, wherein during the step of forming an object layer, the sagittal line moves along the build axis at a velocity that is related to the constant angular speed at which the build platform rotates about the axis of rotation in accordance with the following relationship:

$$dz/dt = b\omega[\sin(\omega t)]$$

wherein, dz/dt is the velocity of the sagittal line along the build axis (mm/sec);

$\omega$=the angular rotational velocity of the rigid or semi-rigid solidification substrate platform (radians/sec);

b=the distance between the center of the trochoidal circle defined by the radius of curvature of the curved surface of the rigid or semi-rigid solidification substrate and the sagittal line along the radial direction of the circle (mm); and t=the time (sec) required for the trochoidal circle of radius a to rotate at the angular rotational velocity $\omega$ from the reference position at which the sagittal plane is parallel to the build axis to the current angular orientation of the sagittal plane.

7. The method of claim 1, wherein the steps of translating the rigid or semi-rigid solidification substrate along the travel axis, rotating the rigid or semi-rigid solidification substrate about the axis of rotation, and translating the rigid or semi-rigid solidification substrate along the build axis are carried out simultaneously.

8. The method of claim 1, wherein the step of supplying solidification energy to the solidifiable material comprises traversing a linear solidification device along the travel axis while selectively supplying solidification energy to the solidifiable material along a scanning axis.

9. The method of claim 8, wherein the step of traversing the linear solidification device along the travel axis is coordinated with the step of translating the rigid or semi-rigid solidification substrate along the travel axis.

10. A method of forming a three-dimensional object from a solidifiable material, comprising:

supplying the solidifiable material between an object contacting surface of a build platform and a solidifiable material contacting surface of a rigid or semi-rigid solidification substrate that is transparent and/or translucent, wherein the build platform object contacting surface and the rigid or semi-rigid solidification substrate solidifiable material contacting surface face one another and are movable relative to one another along a build axis, one of the build platform object contacting surface and the rigid or semi-rigid solidification substrate solidifiable material contacting surface is curved when viewed along a cross-sectional axis, and the curved surface has a direction of curvature along a travel axis;

supplying solidification energy to solidify the solidifiable material between the object contacting surface of the build platform and the solidifiable material contacting surface of the rigid or semi-rigid solidification substrate; and traversing each point on the curved surface along a trochoidal path, wherein the step of traversing each point on the curved surface along a trochoidal path further comprises simultaneously translating the curved surface along the travel axis, traversing the curved surface along the build axis, and rotating the curved surface about an axis of rotation such that the axis of rotation moves along a trochoidal path.

11. The method of claim 10, wherein the curved surface has a mid-point along the direction of curvature, the curved surface includes a sagittal plane defining a sagittal line extending along the cross-sectional axis at the mid-point along the direction of curvature, and the method further comprises solidifying a single layer of solidifiable material such that the curved surface rotates about an axis of rotation from a first angle of rotation to a second angle of rotation as the sagittal line travels a distance Δx along the travel axis, and the distance Δx is related to the first and second angles of rotation as follows:

$$\Delta x = a[\varnothing_{R1} - \varnothing_{R2}] + b[\sin(2\pi - \varnothing_{R1}) - \sin(2\pi - \varnothing_{R2})]$$

wherein, Δx=change in position of the sagittal line along the travel axis from a first position $x_1$ to a second position $x_2$;
$\varnothing_{R1}$=the first angle of rotation of the curved surface when the sagittal line is at the first travel axis position $x_1$ relative to a reference angle of rotation at which the sagittal plane is parallel to the build axis;
$\varnothing_{R2}$=the second angle of rotation of the curved surface when the sagittal line is at the second travel axis position $x_2$ relative to the reference angle of rotation;
a=the length of the radius of curvature of the curved surface; and
b=the distance between the sagittal line and the center of a circle of radius a defined by the curved surface along the radial direction of the circle.

12. The method of claim 11, wherein during the step of solidifying a single layer of the solidifiable material, the sagittal line moves a distance Δz along the build axis as the curved surface rotates about the axis of rotation from the first angle of rotation to the second angle of rotation, and the distance Δz is related to the first and second angles of rotation as follows:

$$\Delta z = b[\cos(2\pi - \varnothing_{R1}) - \cos(2\pi - \varnothing_{R2})]$$

wherein, Δz=the distance traveled by the sagittal line along the build axis from a first position $z_1$ to a second position $z_2$;
$\varnothing_{R1}$=the first angle of rotation of the curved surface when the sagittal line is at the first build axis position $z_1$ relative to a reference angle of rotation at which the sagittal plane is parallel to the build axis;
$\varnothing_{R2}$=the second angle of rotation of the curved surface when the sagittal line is at the second build axis position $z_2$ relative to the reference angle of rotation;
a=the length of the radius of curvature of the curved surface; and
b=the distance between the sagittal line and the center of a circle of radius a defined by the curved surface along the radial direction of the circle.

13. The method of claim 10, wherein the curved surface has a mid-point along the direction of curvature, the curved surface includes a sagittal plane defining a sagittal line extending along the cross-sectional axis at the mid-point along the direction of curvature, and the method further comprises solidifying a single layer of solidifiable material such that the sagittal line moves along the travel axis at a velocity that is related to a constant angular speed at which the curved surface rotates about an axis of rotation in accordance with the following relationship:

$$dx/dt = \omega(a - b[\cos(\omega t)])$$

wherein, dx/dt is the velocity of the sagittal line along the travel axis (mm/sec);
ω=angular rotational velocity of the curved surface (radians/sec);
a=the length of the radius of curvature of the curved surface (mm); and
b=the distance between a center of the trochoidal circle defined by the radius of curvature of the curved surface and the sagittal line along the radial direction of the circle (mm); and
t=time (sec) required for a trochoidal circle of radius a to rotate at the angular rotational velocity w from a reference position at which the sagittal plane is parallel to the build axis to a current angular orientation of the sagittal plane.

14. The method of claim 13, wherein during the step of solidifying the single layer of the solidifiable material, the sagittal line moves along the build axis at a velocity that is related to the constant angular speed at which the build platform rotates about the axis of rotation in accordance with the following relationship:

$$dz/dt = b\omega[\sin(\omega t)]$$

wherein, dz/dt is the velocity of the sagittal line along the build axis (mm/sec);
ω=the angular rotational velocity of the rigid or semi-rigid solidification substrate platform (radians/sec);
b=the distance between the center of the trochoidal circle defined by the radius of curvature of the curved surface along the radial direction of the circle (mm); and
t=the time (sec) required for the trochoidal circle of radius a to rotate at the angular rotational velocity w from the reference position at which the sagittal plane is parallel to the build axis to the current angular orientation of the sagittal plane.

15. The method of claim 10, wherein the step of supplying solidification energy to solidify the solidifiable material comprises moving a linear solidification device along the travel axis while supplying solidification energy to the solidifiable material along a scanning axis.

* * * * *

UNITED STATES PATENT AND TRADEMARK OFFICE
CERTIFICATE OF CORRECTION

PATENT NO. : 10,589,507 B2
APPLICATION NO. : 15/329012
DATED : March 17, 2020
INVENTOR(S) : Ali El-Siblani, Alexandr Shkolnik and Chi Zhou Page 1 of 1

It is certified that error appears in the above-identified patent and that said Letters Patent is hereby corrected as shown below:

In the Claims

Column 63, Line 61, between "velocity" and "from", delete "co" and insert --$\omega$--
Column 64, Line 15, between "velocity" and "from", delete "w" and insert --$\omega$--
Column 66, Line 20, between "velocity" and "from", delete "w" and insert --$\omega$--
Column 66, Line 41, between "velocity" and "from", delete "w" and insert --$\omega$--

Signed and Sealed this
Fifth Day of May, 2020

Andrei Iancu
*Director of the United States Patent and Trademark Office*